US012726476B2

(12) United States Patent
Turner et al.

(10) Patent No.: US 12,726,476 B2
(45) Date of Patent: Sep. 1, 2026

(54) LOW LATENCY AND REDUNDANT PROOF OF POSSESSION FOR CONTENT SUBSCRIPTION WITH OUTBOUND MESSAGE SYNCHRONIZATION

(71) Applicant: Stodge Inc., Scottsdale, AZ (US)

(72) Inventors: Adam Turner, Scottsdale, AZ (US); Joshua C. Altherr, Indianapolis, IN (US); Jerry Dilan Walters, Richmond, VA (US); Kameron Ahler, Denver, CO (US); Kristine Tanya Moskalets, Sammamish, WA (US); Miles Drew Everest, Seattle, WA (US); Nicole Marie Perry, Oakland, CA (US); Thomas James Cuevas, Havertown, PA (US); Siddharth Pathela, Brampton (CA); Vanessa Nerin Katz, Portland, OR (US)

(73) Assignee: Stodge Inc., Scottsdale, AZ (US)

( * ) Notice: Subject to any disclaimer, the term of this patent is extended or adjusted under 35 U.S.C. 154(b) by 0 days.

(21) Appl. No.: 19/383,562

(22) Filed: Nov. 7, 2025

(65) Prior Publication Data

US 2026/0067274 A1 Mar. 5, 2026

Related U.S. Application Data

(60) Continuation-in-part of application No. 19/294,261, filed on Aug. 7, 2025, which is a continuation-in-part (Continued)

(51) Int. Cl.

*H04L 29/06* (2006.01)
*G06F 7/58* (2006.01)
*H04L 9/40* (2022.01)

(52) U.S. Cl.

CPC .......... *H04L 63/0838* (2013.01); *G06F 7/582* (2013.01)

(58) Field of Classification Search

None

See application file for complete search history.

(56) References Cited

U.S. PATENT DOCUMENTS 9,084,071 B2 7/2015 Lisboa
9,218,613 B2 12/2015 Dinardo, Sr. et al.

(Continued)

FOREIGN PATENT DOCUMENTS

WO WO 2025/034744 A1 2/2025

OTHER PUBLICATIONS

U.S. Appl. No. 19/321,150, Sullivan et al., filed Sep. 5, 2025.

(Continued)

*Primary Examiner* — Jeffery L Williams
(74) *Attorney, Agent, or Firm* — Fish & Richardson P.C.

(57) ABSTRACT

Methods, systems, and apparatus, including computer programs encoded on computer storage media, for mitigating computing latency associated with proving possession of network endpoints across customer domains by leveraging fingerprints associated with user devices. One system includes (i) a user device, e.g., a smartphone or a personal computer, (ii) a proof of possession service running on one or more computers, and (iii) an authorization service running on one or more computers.

26 Claims, 71 Drawing Sheets

Related U.S. Application Data of application No. 18/796,117, filed on Aug. 6, 2024, which is a division of application No. 18/419,515, filed on Jan. 22, 2024, now Pat. No. 12,101,314.

(60) Provisional application No. 63/882,254, filed on Sep. 15, 2025, provisional application No. 63/745,293, filed on Jan. 14, 2025, provisional application No. 63/680,586, filed on Aug. 7, 2024, provisional application No. 63/618,249, filed on Jan. 5, 2024, provisional application No. 63/596,605, filed on Nov. 6, 2023, provisional application No. 63/542,736, filed on Oct. 5, 2023, provisional application No. 63/578,960, filed on Aug. 25, 2023, provisional application No. 63/518,083, filed on Aug. 7, 2023.

(56) References Cited

U.S. PATENT DOCUMENTS

| | | | | |
|---|---|---|---|---|
| 11,829,508 | B2 | 11/2023 | Patel et al. | |
| 11,935,068 | B1 | 3/2024 | Long et al. | |
| 11,966,909 | B2 | 4/2024 | Foster, Jr. et al. | |
| 12,101,314 | B1 | 9/2024 | Walters et al. | |
| 12,379,903 | B2 | 8/2025 | Meyer et al. | |
| 2005/0131826 | A1 | 6/2005 | Cook | |
| 2013/0066722 | A1 | 3/2013 | Alkatib | |
| 2013/0117862 | A1 | 5/2013 | Farrell et al. | |
| 2014/0006158 | A1 | 1/2014 | Cooper | |
| 2014/0156407 | A1 | 6/2014 | Dinardo, Sr. | |
| 2015/0134752 | A1 | 5/2015 | Bledsoe et al. | |
| 2016/0012465 | A1 | 1/2016 | Sharp | |
| 2016/0099950 | A1 | 4/2016 | Cuff et al. | |
| 2017/0039597 | A1 | 2/2017 | Medina et al. | |
| 2017/0330188 | A1 | 11/2017 | Canh | |
| 2019/0265851 | A1 | 8/2019 | Andersson et al. | |
| 2019/0281454 | A1 | 9/2019 | Cheung | |
| 2021/0056500 | A1 | 2/2021 | Gilman et al. | |
| 2021/0166226 | A1* | 6/2021 | Wang | G06F 16/9535 |
| 2022/0116385 | A1* | 4/2022 | Hertrich | H04L 9/0825 |
| 2022/0198431 | A1 | 6/2022 | Foster, Jr. et al. | |
| 2022/0405152 | A1 | 12/2022 | Edamadaka et al. | |
| 2023/0021327 | A1 | 1/2023 | Doumar | |
| 2023/0281668 | A1 | 9/2023 | Friborg, Jr. | |
| 2023/0289425 | A1 | 9/2023 | Doumar et al. | |
| 2023/0291570 | A1 | 9/2023 | Doumar et al. | |
| 2023/0376987 | A1 | 11/2023 | Doumar et al. | |
| 2024/0015806 | A1 | 1/2024 | Kahn | |
| 2024/0061957 | A1 | 2/2024 | Morales et al. | |
| 2024/0086970 | A1 | 3/2024 | Thompson et al. | |
| 2024/0112188 | A1* | 4/2024 | Bedi | G06Q 20/326 |
| 2024/0113990 | A1 | 4/2024 | Palarj et al. | |
| 2024/0121236 | A1 | 4/2024 | Buchler | |
| 2024/0126514 | A1 | 4/2024 | Meyer et al. | |
| 2024/0161140 | A1 | 5/2024 | Doumar et al. | |
| 2024/0422540 | A1 | 12/2024 | Hopper | |
| 2025/0055840 | A1 | 2/2025 | Walters et al. | |
| 2025/0335324 | A1 | 10/2025 | Donnelly | |
| 2025/0356365 | A1 | 11/2025 | Ginsberg | |
| 2026/0067274 | A1* | 3/2026 | Turner | H04L 63/0838 |

OTHER PUBLICATIONS

GetFondue.com [online], "CashBack 101: What is CashBack?," Sep. 14, 2022, retrieved on Feb. 13, 2024, retrieved from URL<https://www.getfondue.com/blog/cashback-101-what-is-cashback>, 6 pages.

International Preliminary Report on Patentability in International Appln. No. PCT/US2024/041105, mailed on Feb. 19, 2026, 14 pages.

International Search Report and Written Opinion in International Appln. No. PCT/US2024/041105, mailed on Oct. 11, 2024, 15 pages.

Postscript.io [online], "Why Fondue CashBack is the Better Coupon Alternative," Jul. 11, 2023, retrieved on Feb. 13, 2024, retrieved from URL<https://postscript.io/blog/why-cashback-is-the-better-coupon-alternative>, 10 pages.

Twilio.com [online], "Verify Silent Network Auth Technical Overview," available on or before Aug. 9, 2022, via Internet Archive: Wayback Machine URL<https://web.archive.org/web/20220809035742/https://www.twilio.com/docs/verify/sna/tech-overview>, retrieved on Feb. 13, 2024, URL<https://www.twilio.com/docs/verify/sna/tech-overview>, 5 pages.

Twilio.com [online], "What is Silent Network Authentication?," Aug. 2, 2022, retrieved on Feb. 13, 2024, retrieved from URL<https://www.twilio.com/blog/silent-network-authentication-sna-overview#technical-overview>, 11 pages.

Whatwg.org [online], "DOM Living Standard," available on or before Jan. 11, 2012, via Internet Archive: Wayback Machine URL<https://web.archive.org/web/20120111115233/https://dom.spec.whatwg.org/>, retrieved on Feb. 13, 2024, URL<https://dom.spec.whatwg.org/>, 147 pages.

* cited by examiner

Proof-of-possession server 102

Content provider support server 103

Registrar server 104

Content-provider-platform server 106

Content provider website 106-m

Client-side onsite code 106-c

Step 1

The visitor sees the popup, email address is not filled.

FIG. 7B
BUB SNA
Get 10% OFF
your order
bub@bubsnax.com
By entering your email address, you agree to receive marketing communications including promotions and special offers. You also consent for your contact information to be used to identify and personalize your experience. Terms and Privacy here.
Sign up
No Thanks

Step 2

Visitor enters email address, taps submit button.

Step 3

The visitor's phone number will be prefilled, partially obscured.

The visitor taps the submit button.

Step 4

The visitor is subscribed.

FIG. 8A
Get 10% OFF
your order
Sign up
No Thanks

Step 1

The visitor sees the popup, email address is not filled.

Step 2

Visitor enters email address, taps submit button.

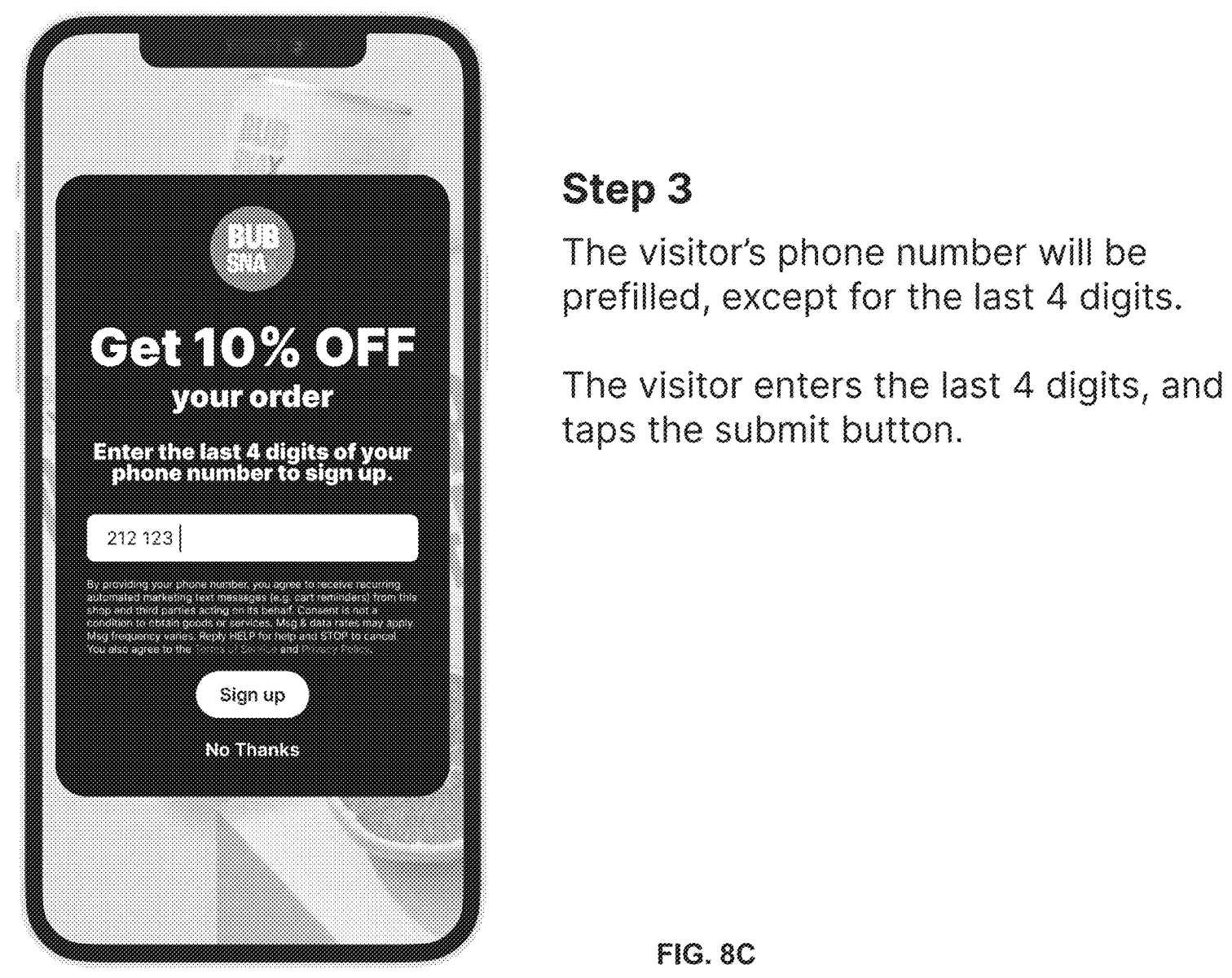

BUB SNA

Get 10% OFF
your order

Enter the last 4 digits of your phone number to sign up.

212 123

By providing your phone number, you agree to receive recurring automated marketing text messages (e.g. cart reminders) from this shop and third parties acting on its behalf. Consent is not a condition to obtain goods or services. Msg & data rates may apply. Msg frequency varies. Reply HELP for help and STOP to cancel. You also agree to the Terms of Service and Privacy Policy.

Sign up

No Thanks

Step 3

The visitor's phone number will be prefilled, except for the last 4 digits.

The visitor enters the last 4 digits, and taps the submit button.

FIG. 8C

Step 4

The visitor is subscribed.

Step 1

The visitor sees the popup, email address is not filled.

FIG. 9B
BUB
SNA
Get 10% OFF
your order
bub@bubsnax.com
By entering your email address, you agree to receive marketing communications including promotions and special offers. You also consent for your contact information to be used to identify and personalize your experience.
Sign up
No Thanks

Step 2

Visitor enters email address, taps submit button.

Step 3

The visitor is automatically sent an OTP to their associated phone number.

FIG. 9C

Step 4

The visitor enters the code and taps submit.

FIG. 9D

FIG. 9E
BUB SHA
CHECK
your texts!
You've successfully subscribed!

Step 5
The visitor is subscribed.

Step 1

The visitor sees the popup, phone number is not filled.

Step 2

The visitor inputs their phone number and taps the submit button.

Step 3

The visitor receives an OTP.

Step 4

The visitor enters the OTP and taps the submit button.

Step 5

The email step appears, with the visitor's email address prefilled.

The visitor taps the submit button.

Step 6

The visitor is subscribed.

Step 1

The visitor sees the popup, email address is pre-filled. The visitor taps the submit button.

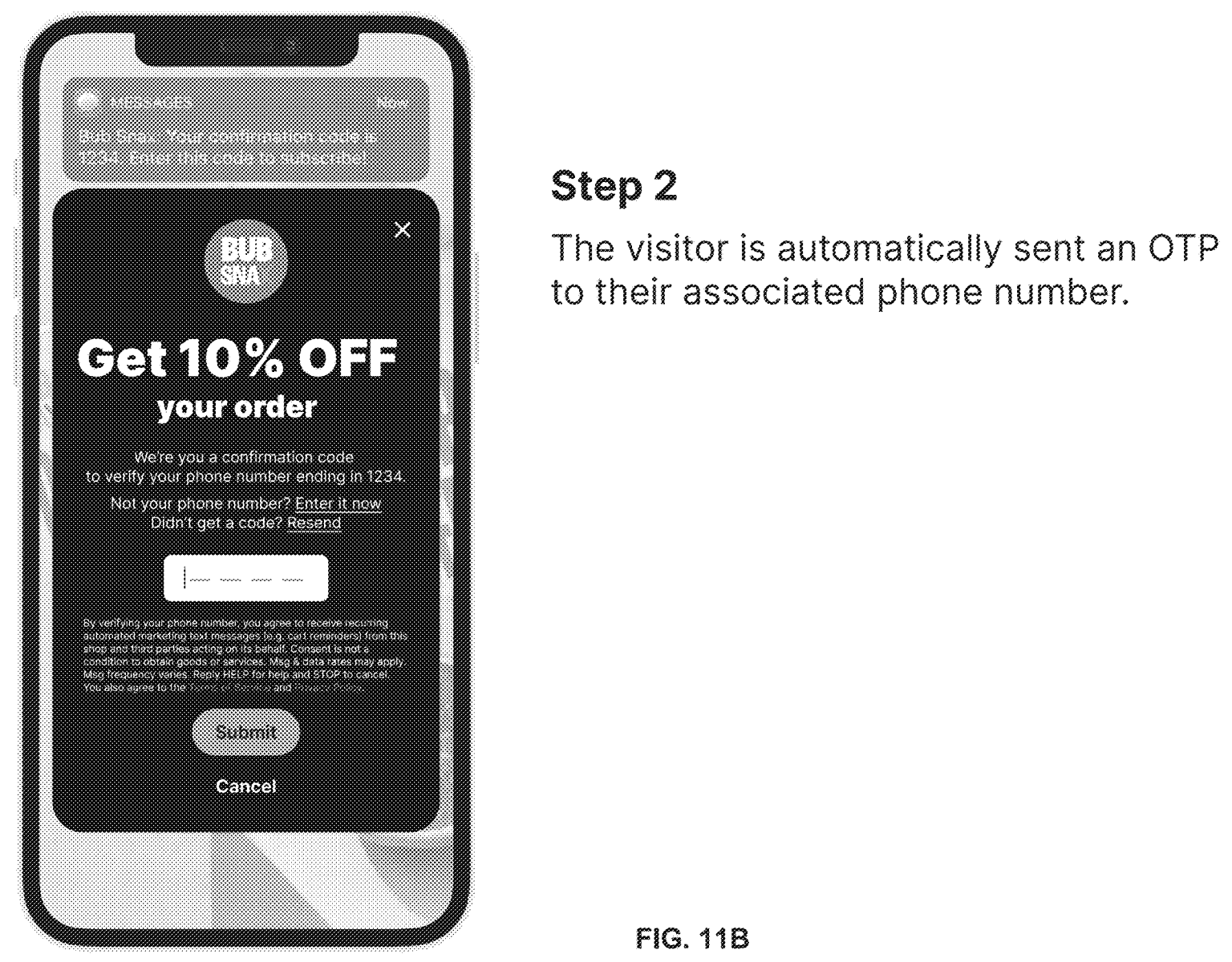

MESSAGES Now

Bub Sna: Your confirmation code is 1234. Enter this code to subscribe!

BUB SNA

Get 10% OFF your order

We're you a confirmation code to verify your phone number ending in 1234.

Not your phone number? Enter it now

Didn't get a code? Resend

By verifying your phone number, you agree to receive recurring automated marketing text messages (e.g. cart reminders) from this shop and third parties acting on its behalf. Consent is not a condition to obtain goods or services. Msg & data rates may apply. Msg frequency varies. Reply HELP for help and STOP to cancel. You also agree to the Terms of Service and Privacy Policy.

Submit

Cancel

Step 2

The visitor is automatically sent an OTP to their associated phone number.

FIG. 11B

Step 3

The visitor enters the code and taps submit.

Step 4

The visitor is subscribed.

Step 1

The visitor sees the popup, phone number is pre-filled. The visitor taps the submit button.

Step 2

The visitor will get a text message containing a one time passcode

Step 3

The visitor enters the code and taps submit.

Step 4

Email step appears, visitor's email address is prefilled. The visitor taps the submit button.

Step 5

The visitor is subscribed.

Step 1

The visitor may see an intro step

Step 2

The visitor sees a step with their email address and phone number prefilled.

Step 3

The visitor will get a text message containing a one time passcode

Step 4

The visitor enters the code and taps submit.

Step 5

The visitor is subscribed.

Step 1

The visitor sees the popup, email address is not filled.

Step 2
Visitor enters email address, taps submit button.

Step 3

The visitor will be prompted to enter their phone number.

Step 4

The visitor enters their phone number and taps the submit button.

Step 5

The visitor is automatically sent an OTP to their associated phone number. This OTP comes from a Postscript phone number, NOT from the brand's phone number.

This way the message goes to the iOS Transactional Inbox, but preserves the option for the first message between visitor and brand to be from the visitor so it lands in the known sender inbox.

The visitor enters the code and taps opt-in, which subscribes the visitor.

FIG. 16A-5

Step 6

From the same submit button on the previous slide - after the subscriber is added to the list, the visitor is prompted to initiate a pre-populated message to the brand.

The visitor's pre-populated message needs to initiate the first message of a conversation for it to land in the Known Sender Inbox.

First this will be:

- Please send me my offer!

Future explorations:

- What products would you recommend for me? (Shopper convo starter)
- Extra surprise! Send this text for 10% more cash back.

If the message is sent within 60 seconds, the subscriber will go to step 7A.
If the message isn't sent within 60 seconds, a default opt-in message will be sent to the subscriber, step 7B.

FIG. 16A-6

Step 7A

After the visitor sends the pre-populated message to the brand, the visitor receives the compliance message.

Then, could then reply with: "What are you shopping for? Or you can continue shopping here: (link)" - tbd if Welcome Msg or Welcome series?

Step 7B

If the visitor doesn't send the pre-populated message to the brand after 20 seconds, the compliance message is sent and normal welcome series starts Then, could then reply with: "What are you shopping for? Or you can continue shopping here: (link)" - tbd if Welcome Msg or Welcome series?

Step 7c

After the visitor sends the pre-populated message to the brand, the visitor receives the compliance message.

Then, could then reply with: "What are you shopping for? Or you can continue shopping here: (link)" - tbd if Welcome Msg or Welcome series?

Step 1

The visitor sees the popup, email address is not filled.

Step 2

Visitor enters email address, taps submit button.

Step 3

The visitor's phone number will be prefilled, partially obscured.

The visitor taps the submit button.

One backspace in the field will clear the field.

If the number submitted is not recognized, the next step will be OTP verification. If the number is consistent with what we expect, the next step will be the confirmation screen.

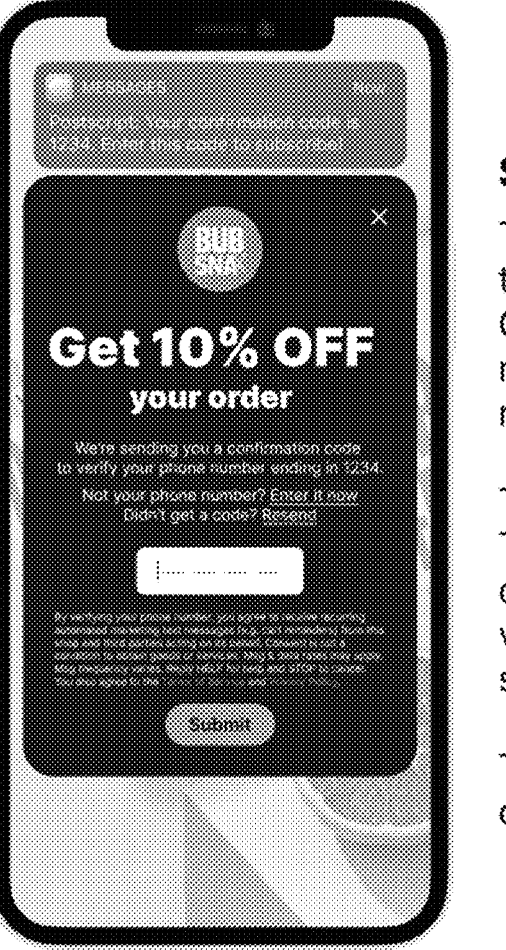

Step 4

The visitor is automatically sent an OTP to their associated phone number. This OTP comes from a Postscript phone number, NOT from the brand's phone number.

This way the message goes to the iOS Transactional Inbox, but preserves the option for the first message between visitor and brand to be from the visitor so it lands in the known sender inbox.

The visitor enters the code and taps opt-in, which subscribes the visitor.

FIG. 16B-4

Step 5

Step 6A

After the visitor sends the pre-populated message to the brand, the visitor receives the compliance message.

Then, could then reply with: "What are you shopping for? Or you can continue shopping here: (link)" - tbd if Welcome Msg or Welcome series?

Step 6B

If the visitor doesn't send the pre-populated message to the brand after 20 seconds, the compliance message is sent and normal welcome series starts Then, could then reply with: "What are you shopping for? Or you can continue shopping here: (link)" - tbd if Welcome Msg or Welcome series?

Step 1

The visitor sees the popup, email address is not filled.

Step 2

Visitor enters email address, taps submit button.

Step 3

The visitor will be prompted to enter their phone number.

Step 4A

The visitor enters their phone number and taps the submit button.

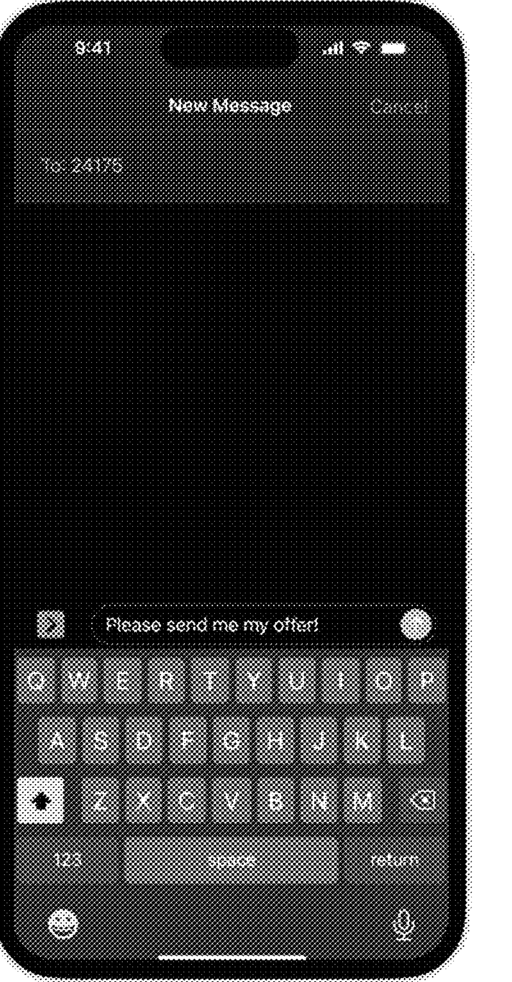

Step 5

From the same submit button on the previous slide - after the subscriber is added to the list, the visitor is prompted to initiate a pre-populated message to the brand.

The visitor's pre-populated message needs to initiate the first message of a conversation for it to land in the Known Sender Inbox.

First this will be:

- Please send me my offer!

Future explorations:

- What products would you recommend for me? (Shopper convo starter)
- Extra surprise! Send this text for 10% more cash back.

If the message is sent within 60 seconds, the subscriber will go to step 6A.
If the message isn't sent within 60 seconds, a default opt-in message will be sent to the subscriber, step 6B.

FIG. 16C-5

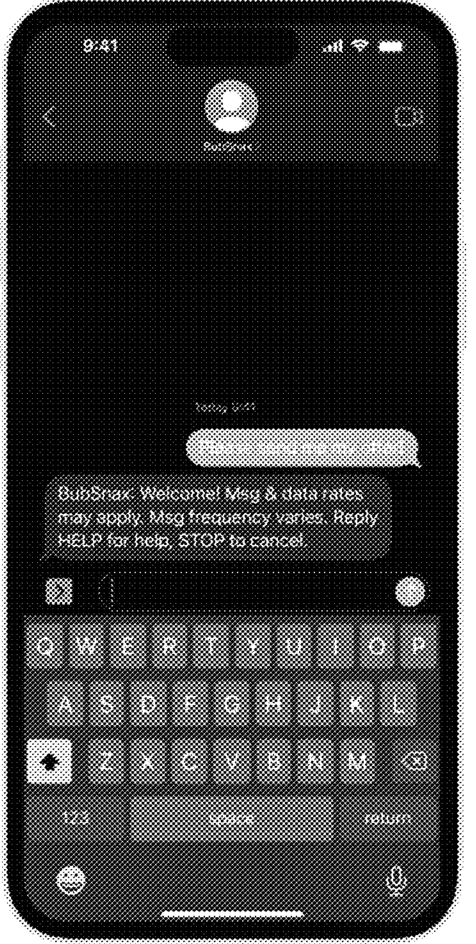

Step 6A

After the visitor sends the pre-populated message to the brand, the visitor receives the compliance message.

If the visitor doesn't send the pre-populated message to the brand after 25 seconds, the compliance message is sent and normal welcome series starts Then, could then reply with: "What are you shopping for? Or you can continue shopping here: (link)" - tbd if Welcome Msg or Welcome series?

FIG. 16C-6a

Step 6B

If the visitor doesn't send the pre-populated message to the brand after 20 seconds, the compliance message is sent and normal welcome series starts Then, could then reply with: "What are you shopping for? Or you can continue shopping here: (link)" - tbd if Welcome Msg or Welcome series?

Step 2
Visitor enters email address, clicks submit button

Step 4
The visitor enters their phone number and clicks the submit button.

Step 5

The visitor is automatically sent an OTP to their associated phone number. This OTP comes from a Postscript phone number, NOT from the brand's phone number.

This way the message goes to the iOS Transactional Inbox, but preserves the option for the first message between visitor and brand to be from the visitor so it lands in the known sender inbox.

The visitor enters the code and clicks the submit button, which subscribes the visitor.

FIG. 16D-5

Step 6

The visitor is taken to a final step of the popup that prompts them to scan a QR code to open a pre-populated text message.

Step 7

When the QR code is scanned, the visitor will see a pre-populated text message on their mobile device. When they send the message, the merchant will send a welcome message. If after 20 seconds, they don't send the pre-populated message, the welcome message will be sent.

LOW LATENCY AND REDUNDANT PROOF OF POSSESSION FOR CONTENT SUBSCRIPTION WITH OUTBOUND MESSAGE SYNCHRONIZATION

CROSS-REFERENCE TO RELATED APPLICATIONS

This application is a continuation-in-part of pending U.S. patent application Ser. No. 19/294,261, for "Low Latency and Redundant Proof of Possession for Content Subscription in a Network of Content Providers," filed Aug. 7, 2025, which is a continuation-in-part of U.S. patent application Ser. No. 18/796,117, for "Low latency and redundant proof of possession for content subscription," filed Aug. 6, 2024, which is a divisional application of U.S. patent application Ser. No. 18/419,515, now U.S. Pat. No. 12,101,314, for "Low latency and redundant proof of possession for content subscription," filed Jan. 22, 2024, which claims the benefit under 35 U.S.C. § 119(e) of the filing dates of U.S. Patent Applications No. 63/518,083 filed on Aug. 7, 2023; No. 63/578,960 filed on Aug. 25, 2023; No. 63/542,736 filed on Oct. 5, 2023; No. 63/596,605 filed on Nov. 6, 2023; and No. 63/618,249 filed on Jan. 5, 2024. U.S. patent application Ser. No. 19/294,261 also claims the benefit under 35 U.S.C. § 119(e) of the filing dates of U.S. Patent Applications No. 63/680,586, filed on Aug. 7, 2024, as well as No. 63/745,293, filed on Jan. 14, 2025. This application also claims the benefit under 35 U.S.C. § 119(e) of the filing date of U.S. Patent Application No. 63/882,254, filed on Sep. 15, 2025. All of the foregoing patent applications are incorporated herein by reference.

BACKGROUND

This specification relates to information management and latency mitigation during HTTP sessions of networked devices.

Network devices exchange computing resources using an application layer protocol known as HTTP (Hypertext Transfer Protocol), usually in a client-server relationship where the client is generally a device that has software requesting computing resources, which may collectively be referred to as a client, and a server is generally one or more computers programmed to interact with clients and to provide computing resources. One device can be both a server and a client, depending on the computing process it is performing. A client can request resources from multiple servers, and a server can provide resources to multiple clients. Computing resources can include data and/or logic that provides functionality, information, amongst other benefits.

In the context of web applications, mobile and desktop devices are generally client devices, having client-side software installed or running on them, and computing processes executing on mobile and desktop devices may be called client-side processes. Mobile applications can perform one or more computing processes to provide various practical applications. Examples of mobile applications include web browsers, email applications, social media applications, and text messaging applications.

One example of a computing resource stored on and provided by a server is an HTML document, which may be stored as or in a file, which document a web browser running on a user device, e.g., a mobile device, an electronic tablet, or a desktop computer, can render and generally display as a web page. Here, the web browser and any HTML code is the client and the user device is a client device.

An HTML document includes HTML elements, examples of which include an iFrame element and a script element. The iFrame element embeds one HTML document within another, which in turn allows the display, on screen of a mobile device, of one web page within another web page. Popups are common implementations of window embedding. Generally, a popup is a pane or banner, generally a small one, that appears in the foreground of a parent web page.

The script element is another HTML element. It generally contains browser-interpretable instructions and data that make the HTML document more dynamic. Besides its local instructions, a script element may reference, by URL or more generally URI, instructions as well as other resources that are remote, typically server-side.

Another example of a computing resource is library code from a software development kit (SDK), which provides development tools helpful to application developers of a particular platform. This library code usually includes one or more application programming interfaces (APIs) and calls to one or more APIs for a service corresponding to the SDK. At development time, SDK code is included in HTML documents or, for mobile applications other than browsers, their code base. The library code enhances the functionality of the mobile applications, often by leveraging server-side resources using one or more APIs of the server-side resources. SDK code may, for example, supplement an HTML document with new iFrame elements and/or new script elements.

As used in this specification, the term "digital address" refers to a user's network accessible endpoint at which information sent to the user is received. Examples of a digital address include, e.g., a mobile phone number, an email address, an account identifier of a text messaging application, and account identifiers of social media applications, which can have text messaging functionality, e.g., a direct message.

Users can provide their endpoints to services to subscribe to receive content from the services. For example, one can subscribe to receive notifications that there is new content on a social media platform or there is a new email message.

Moreover, endpoints can be used for information security. Proof of possession of a network endpoint, e.g., a mobile phone number, by a user means, in general, that the user has the right to receive messages at the end point in question, e.g., she has control or ownership over the endpoint. This proof is sometimes necessary to prevent fraud, e.g., subscribing another person's digital address to register for an imposter social media account or registering another person's mobile phone number to receive notifications.

SUMMARY

Proving that a user has ownership or control over an endpoint, called "proof of possession," is a best practice or requirement under many circumstances, for example, for information security, or for compliance with industry standards or legal obligations, e.g., when a user requests notifications and alerts for a social media platform, requiring proof that the user has ownership or control of the relevant platform. The term "proof of possession" encompasses, for example, proof of possession by a user of a network endpoint, e.g., a static network address of a user device or a mobile phone number.

A system implemented in accordance with this specification provides proof of possession along with other online services for which the former is required or recommended, e.g., e-commerce, advertising, social media, as well as other forms of content distribution and information retrieval. The other online services include those that facilitate sending user selected content, e.g., subscribed content, to user-specified endpoints. Examples of these online services include contact card management and outbound message synchronization. The system improves computing efficiency and mitigates latency caused by computing tasks related to proof of possession and optionally the other online services, an example of which is mitigation of subscribed content being unintentionally filtered. The system optionally can start the process before user selection by inferring user intent based on user engagement, as will be further described below.

The system can perform proof of possession deterministically or, as an option, heuristically. An example of a deterministic process includes providing a one-time password ("OTP") that is sent to the digital endpoint in question, in response to a proof-of-possession challenge. Here, the system provides, to an appropriate registrar, device or session information that has been registered and stored with the endpoint in question. If the device or session information and the endpoint matches those of record, then the registrar returns a confirmation to the system.

A heuristic process, which can optionally supplement or replace a deterministic one, where permitted by law, leverages multiple signals to infer that a user in question does have possession of the endpoint in question. Signals include, for example, one or more of geolocation as determined by GPS, cellular station, or other geolocation information, TCP/IP and/or MAC address of mobile device or WiFi router, account identifiers, session information, contact information, and/or logs of previous engagements. The system implements rule-based as well as machine learning models, generally classifiers and/or regression models, to heuristically perform proof of possession.

The system optionally includes different criteria to accommodate the varieties of industry self-regulatory and legal requirements across legal jurisdictions. For example, one set of criteria implements strictly deterministic processes, a second set of criteria implements only heuristic processes, and a third set implements both. Moreover, more than one attempt to complete proof of possession can be made. If heuristic processes cannot be made with sufficient confidence, for example, then deterministic processes can be used as backup.

The technology described in this specification can be implemented to realize one or more of the following advantages. Proof of possession happens in session and onsite and hence does not require the user to switch away from a web page generated by the browser or a mobile application, e.g., to switch away in order to send a text message. Latency is mitigated, and so the risk of a user losing interest in, or being interrupted in, a transaction or activity that requires proof of possession is mitigated. Proof of possession does not rely on just one registrar and hence works when the mobile device is connected to either a cellular network or through WiFi. Content of interest, e.g., subscribed content, are less likely to be filtered.

BRIEF DESCRIPTION OF THE DRAWINGS

FIGS. 8A-D show another example method for content subscription across different domains.

Figure 9C:
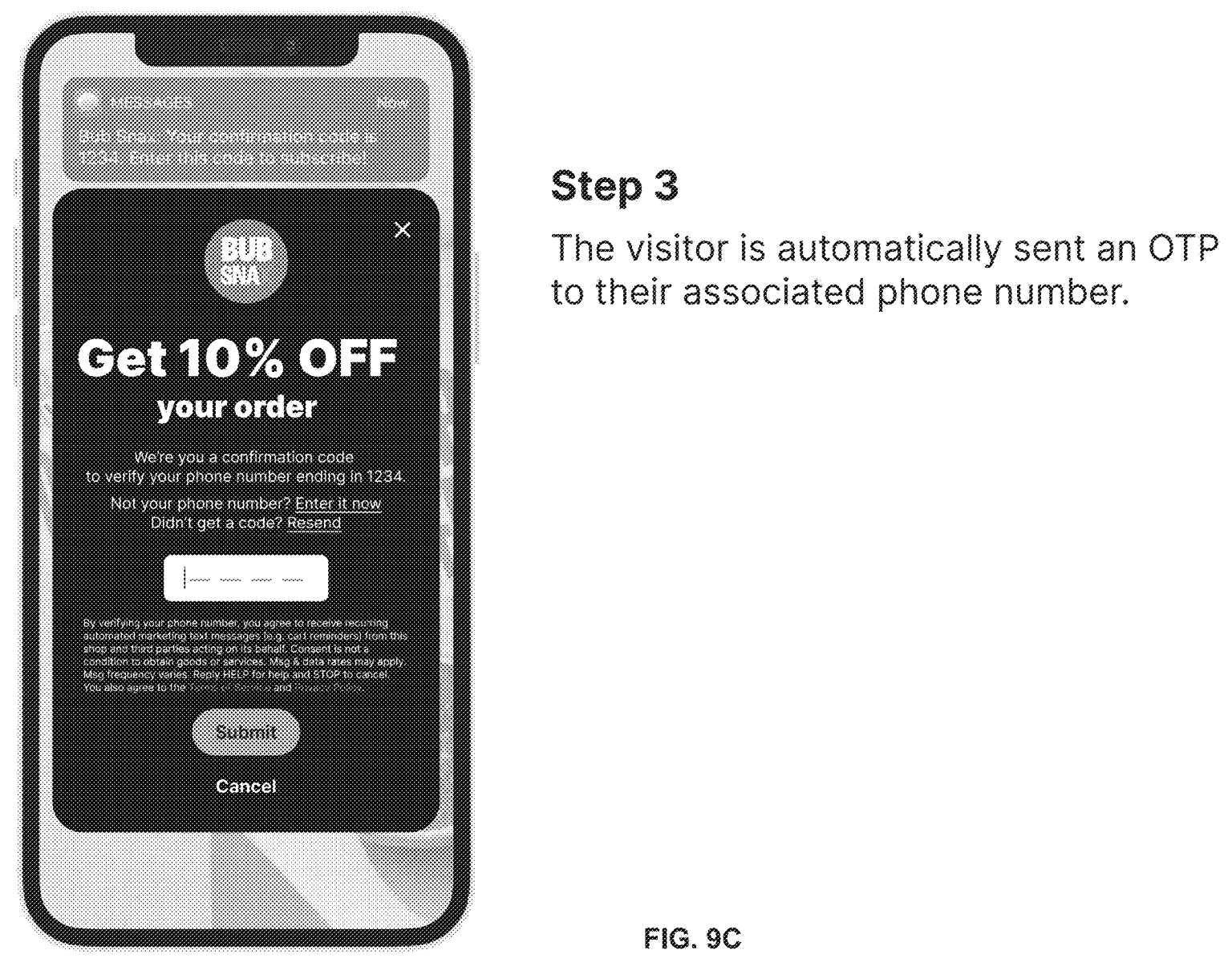
Figure 9D:
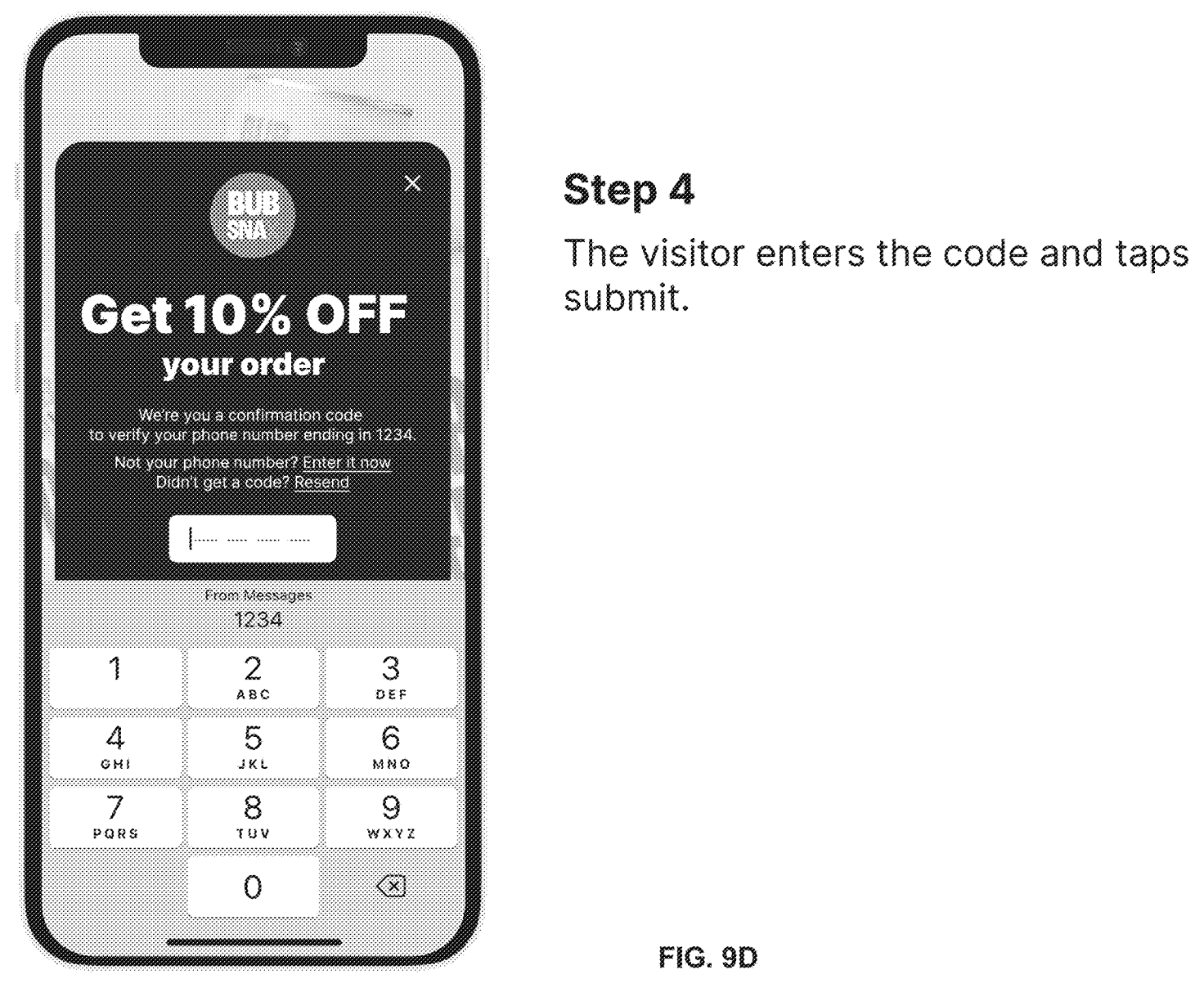

FIGS. 9A-E show another example method for content subscription across different domains.

FIGS. 11A-D show another example method for content subscription across different domains.

Like reference numbers and designations in the various drawings indicate like elements.

DETAILED DESCRIPTION

Figure 1:
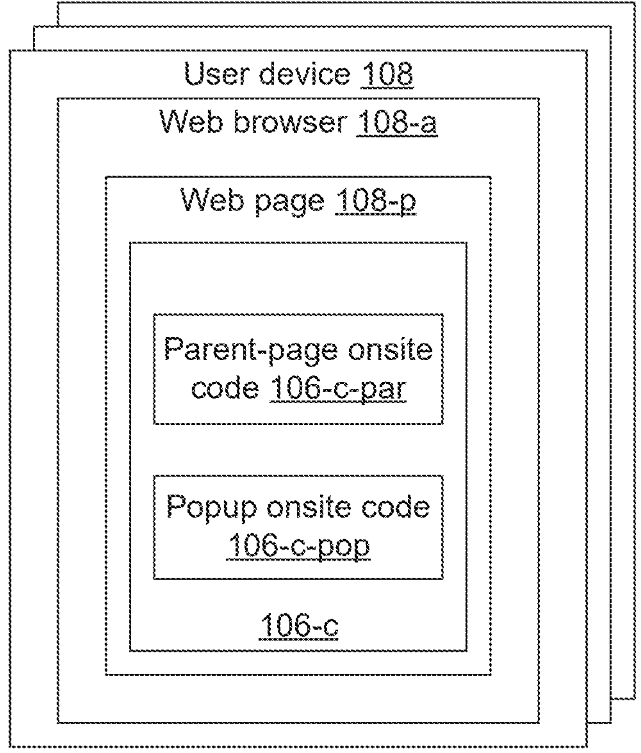
FIG. 1 shows an example system implementing technology described in this specification.

As shown in FIG. 1, an example system includes a proof-of-possession server ("POP server") 102, a content provider support server ("support server") 103, a registrar server 104, a content-provider-platform server 106, all for interacting with clients, i.e., client software running on user devices 108. An example of a registrar server 104 is the server operated by any cellular service provider. An example of a content-provider-platform server 106 is a server supporting content-providing websites operated by content providers, e.g., ones operated by a news organization, a social media company, a company that does information retrieval, a merchant, or an e-commerce company. In some implementations, the proof of possession function and the content provider support functions of the POP and support servers 102 and 103 are provided by a combined server. Each of the foregoing servers can be implemented on one or more computers in one or more locations, and multiple computers implementing a server can be coupled to communicate over a digital data communication network.

Examples of a user device 108 includes a smartphone that has a web browser and a desktop computer that has a web browser.

The content-provider-platform server 106 is a platform that hosts one or more, and generally hosts many, content provider websites 106-*m*. One or more of the respective web pages, i.e., HTML documents, of each website 106-*m* each include what this specification will refer to as onsite code 106-*c*. The onsite code 106-*c* implements processes that are performed when the web pages that contain the code are rendered by web browsers 108-*a* on their respective user devices 108. The onsite code 106-*c* may have been provided to the content-provider-platform server 106 and by that server added to the website pages. Or the onsite code may have been provided to the respective content provider operators and included by them in their web pages. The respective onsite code 106-*c* of web pages 108-*p* is run, i.e., is executed or interpreted, on the respective user device 108 by its web browser 108-*a*. The onsite code 106-*c* generally includes code 106-*c*-par embedded in a parent HTML page, and code 106-*c*-pop embedded in a popup HTML page. For simplicity, these may be referred to as parent onsite code and popup onsite code when it is necessary to distinguish them. The parent onsite code and the popup onsite code may be referred to collectively as the onsite code.

The onsite code can be implemented in JavaScript or other suitable language and can be provided to the content providers for their respective websites 106*m* or to the content-provider-platform server 106 in the form of library code of an onsite SDK. JavaScript code can be included in an HTML document as one or more of inline JavaScript, internal JavaScript, or external JavaScript, which is JavaScript obtained by the page from an external resource, e.g., a network-accessible JavaScript file.

The onsite code contains instructions that, when executed and/or interpreted, work in conjunction with a corresponding server using APIs of the server to perform their respective tasks. For example, the onsite code works with the POP server 102 to detect one or more user engagements that trigger a call-to-action popup and, furthermore, to complete a related transaction with the content provider in response to a user selection of a call-to-action icon on the popup. The onsite code also works with the registrar server 104 to complete proof of possession.

Generally speaking, a call to action to subscribe to content will usually but not necessarily include one or more incentives, e.g., VIP status, free subscription for a limited time, a discount, or cashback, that a content provider offers in exchange for subscription. A popup is a pane or banner, generally a small one, that is launched from and appears in the foreground while a user is viewing an underlying web page, which will be referred to as the parent web page. The call-to-action popup can be any form of popup, e.g., a bar popup, a popup box, a lightbox popup, a full-screen popup, or a slide-in box. The call-to-action popup presents, among other things, a call-to-action icon, e.g., a user interface button or other element that a user can select to respond affirmatively to the call to action presented in the call-to-action popup, e.g., to accept a transaction presented on the popup.

The system or a server on the system optionally includes tools, e.g., a popup editor, for receiving input specifying popup criteria, functionalities, or appearance. One can also add a contact card to be attached to the popup here. The contact card specifies endpoints associated with content providers, for example, those from which subscribed content is sent to user endpoints. Optionally, the card includes multiple endpoints, which can vary depending on geolocations as well as other session information.

The transaction with the content provider can result from an engagement by a user using the user device 108 with a digital resource of the content provider, e.g., with a content provider website 106-*m* hosted on the content provider 106 or elsewhere.

Figure 2:
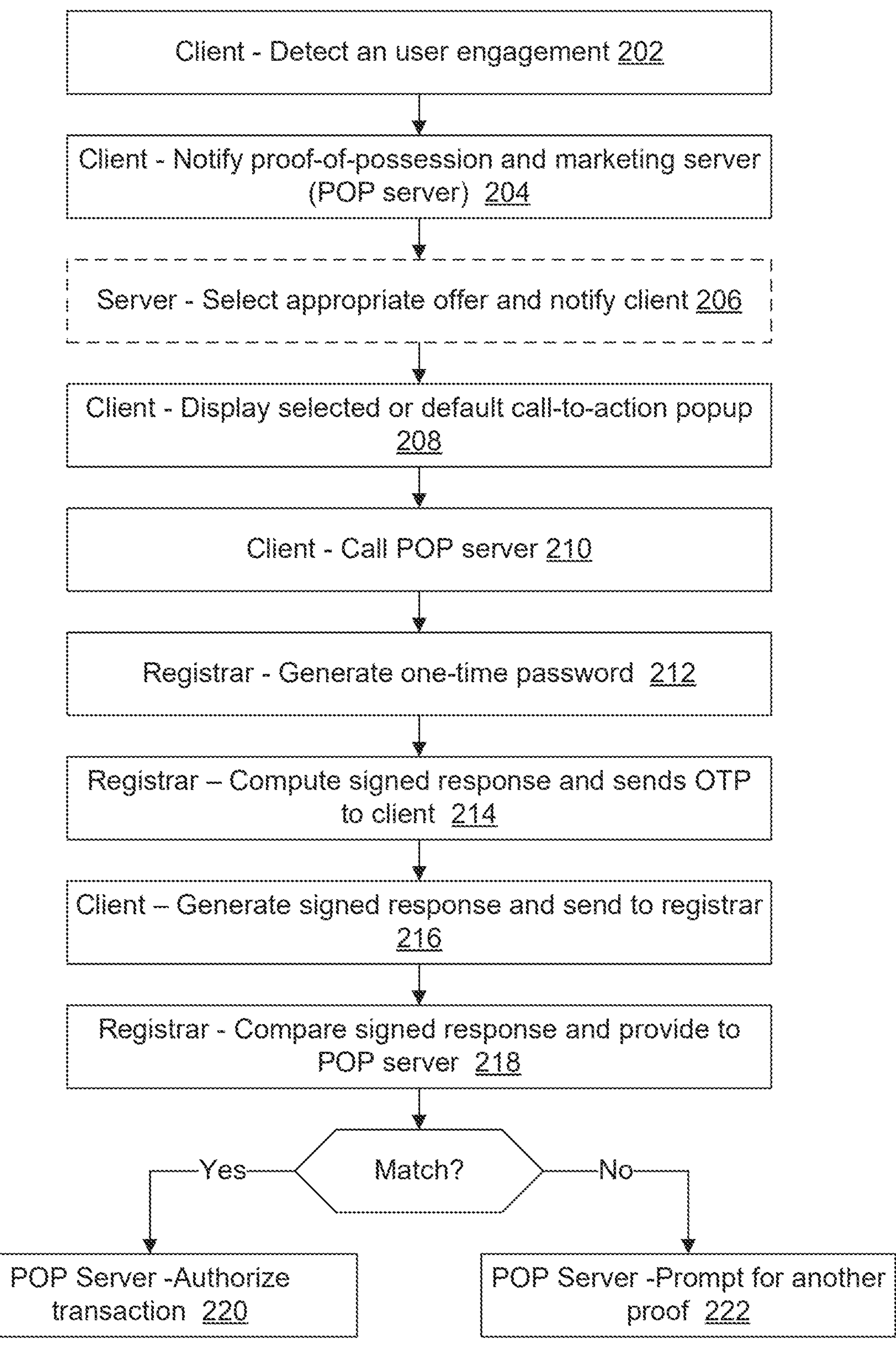
FIG. 2 shows an example method for proving endpoint possession in accordance with technology described in this specification.

FIG. 2 shows an example method that implements technologies described in this specification to prove possession of a network endpoint, e.g., a mobile phone number, for content subscription while mitigating latency. For example, a user may use a web browser on her user device 108 to browse a shopping website or other content provider website 106-*m* hosted by the content-provider-platform server 106. During this session the user navigates to various web pages of the website to seek items of interest.

In this context, this specification uses the term "client," when no other meaning is specified, to refer to the onsite code and any other code, e.g., JavaScript code, included in the web pages provided to a web browser by the relevant content provider website 106-*m*.

The client detects (step 202) a user engagement that qualifies for a call-to-action popup, e.g., the placement of an item into a shopping cart of a merchant. Other user engagements may also qualify, e.g., simply navigating to a particular content provider web page of interest.

The client notifies (step 204) the POP server 102 that it has detected a qualifying user engagement event and also grabs and sends to POP server 102 session identifying and other information, e.g., one or more of a device ID of user device 108, a session ID of the current HTTP session, and session cookies, and optionally geolocation information of the user device 108, a user name of the user of the user device 108, and/or shopping cart information or the like.

Optionally, the client requests, on page load, data describing all available popups for a current web page from the POP server 102 and then, once the data is received, evaluates user engagements and selects the appropriate popup to show. Alternatively, the POP server 102 selects (step 206) an appropriate offer, based on the session information, and notifies the client about its selection so that the latter can render a popup presenting a transaction corresponding to the offer for the user to accept.

The client displays the selected call-to-action popup (step 208), which may offer, for example, a discount of 10% in exchange for a subscription to receive SMS marketing messages on the user device 108. If optional step 206 was not performed, then the user device 108 selects a popup and transaction to present.

Upon detection of a user selection of the call-to-action icon, the client calls a proof of possession service (step 210), which can be provided by an appropriate registrar, for example, a cellular service provider. In this case, the client provides a SIM or eSIM ID (identifier) of the user device 108 along with the call. Here, the onsite code on the user device 108 has instructions to receive an OTP that will be provided, e.g., by a registrar, retrieve the ID from the onboard SIM, and use it to generate a signed response using the same one-way hash function that the registrar uses. Alternatively, the proof of possession service is implemented on the POP server 102.

Optionally, the client calls the proof of possession service speculatively, i.e., before detecting a user selection, which the client does based on a prediction that a likelihood that the user will make the user selection satisfies a prediction threshold. In one implementation, the prediction is performed by a machine learning model that predicts the probability of user selection based on current session information as well as logged information, anonymized where necessary. Input signals to the model include previous selections made by the user, previous selections made by users determined to be similar by collaborative filtering, and/or user engagements in the current browsing session indicative of intent to subscribe.

Responsive to the call, the registrar uses the SIM ID to retrieve a security key linked to the user's account—both were assigned when the user registered the mobile device— and generates an OTP (step 212). The OTP can be a 128-bit or larger random or pseudo-random number. The registrar computes a signed response by inputting the OTP and the security key into a one-way hash function (step 214).

The registrar sends (step 214) the OTP to the user device, which then uses (i) the security key onboard its SIM and (ii) the OTP as input to the one-way hash function, to generate its own signed response, which it sends (step 216) to the registrar.

The registrar compares (step 218) its signed response with the signed response received from the user device 108 and provides the POP server 102 with the result. If the result was a match, which indicates that the security keys are the same, then the POP server 102 authorizes the transaction and subscribes the user's network endpoint, e.g., phone number, to receive promotional messages from the merchant (step 220). Otherwise, the POP server 102 prompts the user device 108 to try again or use another proof of possession method (step 222).

If the result was a match, the POP server 102 then (1) stores the user's opt-in information for compliance purposes and (2) opts the user into an SMS marketing program of the merchant or other content provider, which generally includes sending the user an introductory text, which can be configured by the merchant or other content provider on the POP server 102 platform. Otherwise, the user is not registered as a subscriber.

Figure 3:
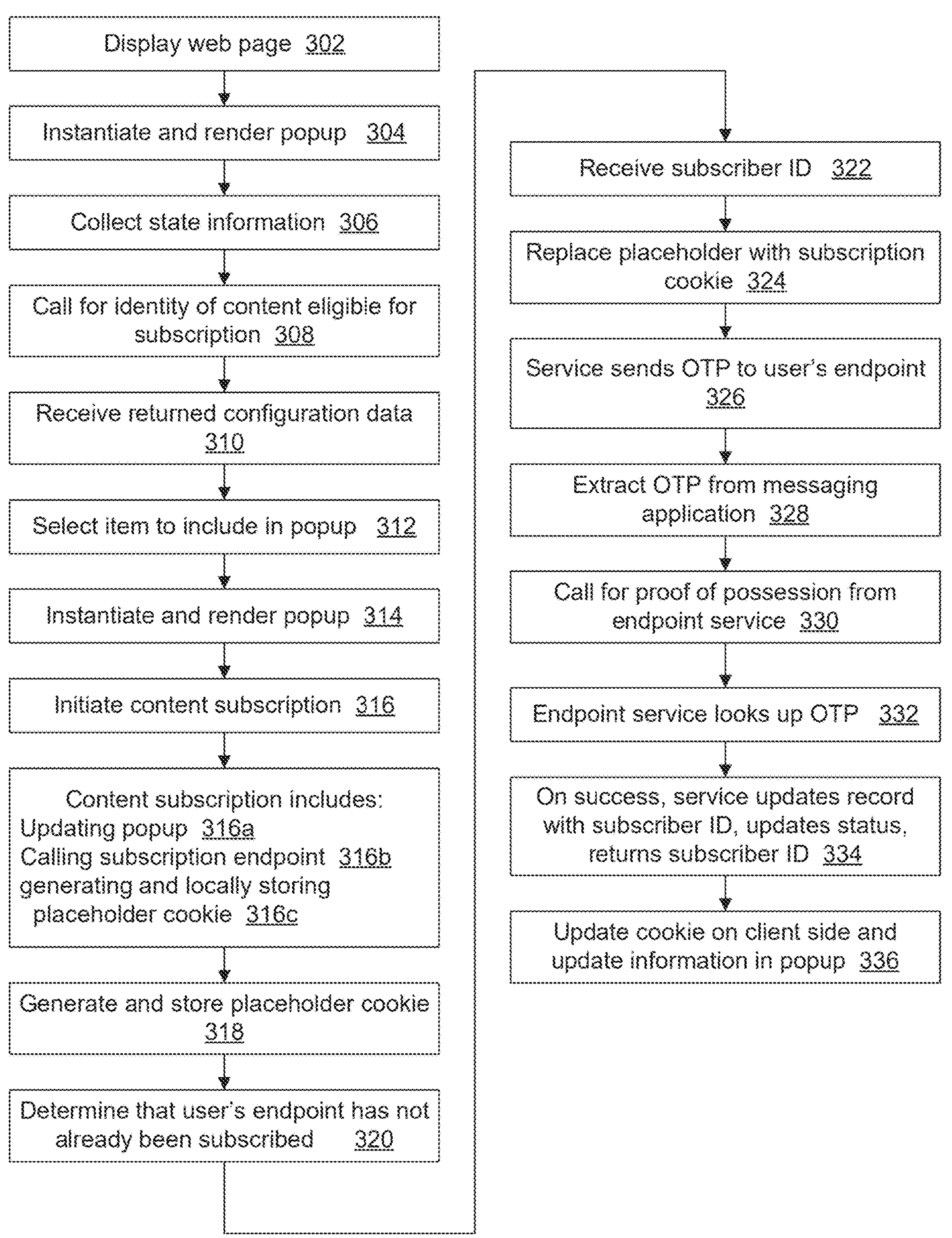
FIG. 3 shows an example method for proving possession as part of content subscription.

FIG. 3 shows an example computer-implemented method for proving consent and end-point possession for a user to subscribe to content during an online browsing session, responsive to a generation and display of a popup.

In this example, the popup is a window that overlays a parent window in a display of a user device. The parent window can be a content provider's rendered web page, which can be generated and rendered, e.g., by a client-device web browser retrieving and interpreting an HTML document of the content provider. The popup can be rendered in an iFrame implemented with an iFrame element included in script tags that are embedded in the HTML document.

Included in the iFrame element and/or script tags are computer instructions executable and/or interpretable by the browser, some or all of which instructions can be referenced and accessed over a network from sources external to the HTML document, e.g., from the support server 103. The instructions can include ones that implement cookie logic, e.g., rule-based decisions based on the presence or absence of cookies or decisions to generate or not to generate a cookie, ones that call services needed to effectuate the content subscription, e.g., proof of consent and proof of possession, ones for receiving and forwarding user input, e.g., a mobile phone number and an OTP, and/or ones that effectuate rewards and other incentives. Optionally included are parameters, e.g., content provider ID, cookie values, merchant ID, feature flags, and/or UTM (Urchin Tracking Module) parameters, which are usually appended to resource references, e.g., to the URLs, of content and/or other computing resources called by the instructions. UTMs can describe its resource reference's purpose, source, content, and/or placement, among other information. In some implementations, onsite code uses query string parameters to share data between parent onsite code processes and popup onsite code processes.

These instructions and parameters, as well as other resources included in the iFrame element and/or the script tags, together define the one or more processes that the browser performs, e.g., executes and/or interprets, to offer and complete the content subscription specified in the popup. Because the processes are able to complete content subscription without navigating away from the parent web page and/or the popup, they are said to execute onsite. They can be completed, for example, without the browser having to navigate away from the parent web page and the popup, or without the user having to switch from the browser to another application, even if the process to complete the subscription includes a call to remote endpoints for services. Being able to complete content subscription onsite reduces confusion the user may endure when too many windows and/or tabs are displayed during the process or when having to swap between them.

Moreover, HTML parameters can be lost when the user navigates the web browser away from a web page, e.g., the parent web page or the popup, which can happen when another URL is inputted into the browser address bar or when a link is clicked. With onsite processes, UTM parameters, as well as other HTML parameters and session information, are preserved, at least until completion of processes needed to complete content subscription, which is usually the period when they are needed or can be useful to provide context, among other things. Preserving this information advantageously enables the customization and specificity of information displayed in the popup, e.g., a message like "You have successfully subscribed to receive alerts and score updates," after the user has responded to "Subscribe here to receive alerts of score updates;" or "You will now get notifications for trending posts" after the user has responded to "Get notifications for trending posts;" or "Success and the 10% discount has been applied to your shopping cart" after the user has responded to "Subscribe to get notifications for sales and get 10% off now," which messages otherwise would usually be a conventional and generic "You have subscribed."

As shown in FIG. 3, the browser running on the user device executing and/or interpreting computer instructions of an HTML document displays (step 302) a web page 108-*p* of the content provider. The HTML document includes onsite code, which was described above. The onsite code instructions perform onsite processes to provide functionality for the parent web page. In some implementations, the onsite code is provided by the support server 103 to the content-provide-platform server 106 or to content providers to include in content provider web pages. The onsite code may include an iFrame element to instantiate a popup. The popup onsite code instructions perform processes to provide functionality for the popup. Parent-page onsite code instructions of the HTML documents, perform processes of the parent web page.

These onsite code processes, during the performance of their respective functions, will make one or more API calls to various endpoints of servers and, furthermore, will usually generate cookies to reflect a current state of progress or completion of the processes, as further described below. Moreover when an iFrame element is used to implement the popup, onsite processes of the parent web page and those of the popup onsite code usually need to exchange information with each other, which cross-domain communication can be safely implemented, for example, by using the window.postMessage( ) method of HTML 5.

Notably, there are suitable alternatives to iFrame elements, e.g., HTML <embed> and <object> tags or web components. With these alternatives, onsite code performs its processes on just one domain rather than two, i.e., just the parent web page URL rather than the popup URL and the parent web page URL. There is thus no need for the processes to share data across domains, and one advantageously need not rely on the window.postMessage( ) method of HTML 5 or other similar tools. However, with just one domain, encapsulation may be necessary to ensure the popup has the styling preferences and rules specified by the content provider, which otherwise can be affected by those of the parent web page. Encapsulation further ensures that these style preferences and rules do not leak into the parent web page or other HTML components and taint their appearances. One suitable technique for encapsulation is a shadow DOM (domain object model), details of which are described in the DOM Living Standard document published by the Web Hypertext Application Technology Working Group (WHATWG) and found at https://dom.spec.whatwg.org/.

In response to detecting one or more predetermined events, for example, the user navigating to the web page of the content provider, a mouse over content of interest, and/or a user action to put a product into a shopping cart, the processes of the parent web page performed by the browser launch one or more onsite processes to instantiate and render a popup for display (step 304) that includes a call to action, for example, to subscribe to content.

The onsite processes performed by the browser collect appropriate state information that is currently available, either locally or remotely (step 306). State information can include current browsing session information, for example, session cookies, URL, HTML parameters, including UTM parameters identifying the content provider, device ID, content ID, other IDs, and/or traffic sources to a current web page. Here, appropriate state information is information that is needed to complete content subscription and its related transactions, and for which there is proper user consent to collect, as specified in browser and mobile device settings.

The onsite processes call an endpoint of the server for a service that generates, dynamically or otherwise, data identifying eligible content available for subscription (step 308). State information collected can be sent as part of the call to the service, if needed. The service may be implemented by, for example, the content-provider-platform 106, or by the individual content providers, e.g., on their respective websites 106-*m*. Optionally, there are two endpoints that can be called, one that provides services for desktop devices and the other that provides services for mobile devices.

Server-side, the called endpoint service generates configuration data, which includes availability data describing content currently available for subscription by the user, which is then returned to the onsite processes (step 310). The endpoint service can identify, from all the available content, the particular content that is available to the user, based on the state information received with the call from the browser, rules for content distribution, e.g., those specifying the what, when, and how of distribution, and/or information in logs stored server-side, e.g., user engagement logs. Generating the availability data can further be based on information provided by the content provider in one or more content status resources that specify, e.g., what content is currently available from the content provider for subscription. The content status resources are generated by, or based on input from, the content provider.

As an example of content availability and selection, if the user had previously subscribed to a first set of content, but not a second or third set currently available for subscription, and the second set is unavailable to the user based on geolocation or because of another reason, then the endpoint service would include only the third set of content in the configuration data. Examples of content sets include notifications of trending topics, alerts of events in sports, or different marketing campaigns. In another example of content availability and selection, the endpoint service checks specific content availability by looking up the URL of the parent web page against a list of prohibited URLs. One example of specific content is a particular popup of a particular content provider that specifies a particular content subscription. If the URL is on the prohibited list, then the endpoint service excludes this specific content from the configuration data.

Depending on scale, content selection can impose too heavy a burden on computing resources if done server-side. In this case, the called endpoint service returns all content available from the content provider for subscription, and the onsite code selects the content to be presented in the popup.

Figure 14:
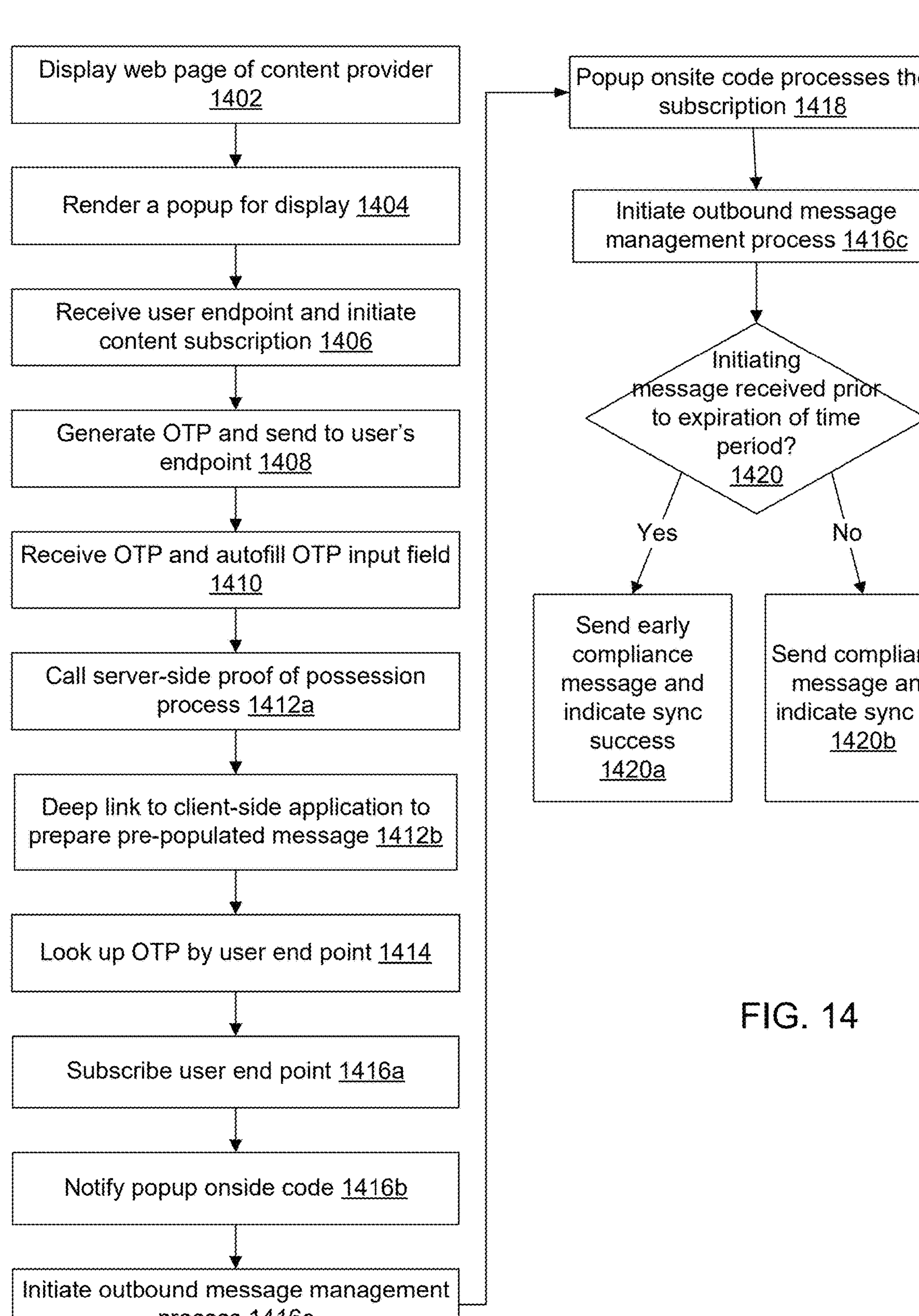
FIG. 14 shows a method for content subscription with outbound message management

Latency can also be a factor to consider in the decision to perform computing tasks server side or client side. For a given computing task that can be accomplished either server side or client side, one of these options may require system calls that have an aggregated latency greater than the other, given current infrastructure and resources. (API calls to lookup phone numbers, as described below in reference to FIG. 14, are example causes of latency.) It may be necessary to perform the computing task where latency is not prohibitive, especially as perceived by users.

The configuration data may also include preferences of the content provider, e.g., the style and other appearance of the popup, messages customized by the content provider, e.g., notifications and alerts, as well as messages for a particular marketing campaign, and rules defined by the content provider, any or all of which can be returned to the browser with the availability data describing content available for subscription.

Optionally, the configuration data includes information about one or more rewards that the content provider currently offers as an incentive for the user to subscribe to its content or otherwise respond to its call to action. A reward can be, for example, free subscription for a limited time, VIP status that unlocks exclusive benefits, a discount code, and/or cashback with a purchase. With this option, there are now two transactions that will be described in the popup and, furthermore, that are to be completed onsite by the onsite processes. Specifically, the two transactions are (i) the subscription to content and (ii) the proffering and giving of the reward. Under this option, the called endpoint service would include information describing the rewards when it returns the list to the onsite processes. To prevent fraud, the actual codes for the rewards, e.g., the redeemable discount code or cashback code, are not returned until content subscription is completed.

Notably, the configuration data can be made available in networked resources that can have their respective URLs and HTML parameters. Moreover, these resources can include references to external networked resources, including remote endpoints hosted on third-party servers. The above mentioned customized notifications, alerts, and messages, as well as reward information, hence can be network accessible files that in turn have their own respective URLs and HTML parameters that can be called by the onsite processes.

All or a portion of the configuration data can be provided through user interface and other tools, e.g., a popup editor, implemented on the support server 103. These tools can be used by content providers to define elements of the configuration data and define the messages, the rewards, and the calls to action of the popups on their websites, add contact cards, enable post-subscription message synchronization, and to format and store this data for use by the onsite code 106-*c*.

Responsive to receipt of the configuration data and any related information returned by the called endpoint service, the onsite processes select an item on the list to include in the popup (step 312). Specifically, the onsite processes select the content to be offered for subscription. Selection is based on the collected state information, which may have been updated because cookies may have changed since the loading of the page, as well as other information depending on availability and latency. Optionally, the onsite processes can also select one or more rewards to be offered in exchange for content subscription. When more than one reward is selected, they are presented in the popup for user selection.

The onsite processes instantiate and render, for display on a user interface of the mobile device, a popup that describes the call to action to subscribe to content, and, optionally, any associated reward, all done as specified by the configuration data (step 314). Alternatively, the call to action can request the actions of providing feedback or completing a survey. Initiated by popup instantiation, popup onsite code processes perform their respective tasks onsite to complete content subscription, which includes proof of consent and requires proof of possession. Optionally, the popup onsite code processes also complete the giving of any reward, which is conditioned on completion of content subscription.

The instantiated and rendered popup is dynamic and customized. The popup hence can include multiple customized messages, including one that describes the particular content available for subscription and, optionally, any associated rewards currently offered by the content provider in exchange for subscription, ones that requests under input, and ones that indicate completion of content subscription and reward giving. The parameters underlying this customization are preserved because the parent web page and the popup are preserved during the onsite subscription and proof of possession processes described in this specification.

The popup generally also includes an input field to receive user input specifying an endpoint at which subscribed content can be received, e.g., a social media account ID, an email, and/or a mobile phone number. For the latter, there is an optional autofill attribute included with instructions of the iFrame element from which the popup is instantiated. Having the autofill, also known as autocompletion, attribute saves the user from having to key in the user's phone number digit by digit.

If latency is of concern, information needed for the popup can be pre-fetched, e.g., when the parent web page starts to load, rather than waiting for loading to complete or for other qualifying events.

As shown in FIG. 3, responsive to receiving the user's endpoint, the popup onsite code processes initiate content subscription (step 316). Content subscription includes: (i) updating the popup (step 316*a*), which now optionally has an input field to receive an OTP, e.g., from the user, (ii) calling an endpoint of the server that provides content subscription service (step 316*b*) and (iii) optionally generating and storing locally a place-holder cookie that indicates content subscription has been requested, but not yet completed (step 316*c*). Content subscription is conditioned on proof of endpoint possession. Optionally, content subscription also includes giving a reward as specified in the popup, which can be strictly conditioned on completion of content subscription.

The call to the endpoint service for content subscription includes the user's endpoint and the content provider ID. The user's endpoint can be obtained as user input in the popup. The content provider ID is obtained from the parent web page, e.g., from a query string parameter in the web page document, e.g., in a script that loads the onsite code. The popup onsite process can extract the parameter from the web page and set it as a query string parameter on the popup iFrame. Then the popup onsite code can extract the provider ID and use it for the verification call.

Optionally, also included with the call is a content ID for a first set of content if the content provider currently offers multiple popups that respectively call for subscription to different sets of content, and the user has already subscribed to the first set. Including content IDs for subscribed content precludes the content subscription service form including subscribed content in the configuration data it returns to the call, which prevents popups that call for subscription to already subscribed content.

Note that parameter extraction can be done anytime during the content subscription process because there is no need to navigate the browser away from the parent web page and hence parameters are preserved. For example, the popup onsite code can extract all the parameters needed for content subscription only once at the time the popup is instantiated. Alternatively, the popup onsite code can extract parameters multiple times, on an as-needed basis. The onsite code can extract the content provider ID, for example, right before making the call to the server endpoint.

Responsive to receiving the call from the popup onsite code processes, the called endpoint service for content subscription that runs server-side checks its lists of endpoints subscribed to the content provider to determine whether the user's endpoint has not already been subscribed to receive the content specified by the popup (decision step 318). If the user has already been subscribed, the called service retrieves the subscriber ID from its lists and returns it to the popup onsite code processes (step 320), which then generates a subscription cookie (step 322) and proceeds with its other tasks, including instantiating and rendering a notification that the user has already been subscribed (step 324).

If the user has not already been subscribed, the called service: (i) generates a temporary record of the user endpoint in its lists of endpoints subscribed to the content provider, which status is pending, and which can include session information that proves consent, (ii) generates an OTP that is stored and linked to the user endpoint and the content provider ID, and (iii) sends the OTP to the user endpoint (step 326). Optionally and as an alternative to generating a place-holder cookie in step 316*c*, the called service returns a token to the onsite code when it sends the OTP to the user endpoint. The onsite code then uses this token to set the place-holder cookie to indicate that content subscription has been requested.

When the endpoint is a mobile number that can receive SMS messages and content being subscribed to is sent via SMS messages, the source phone number from which the OTP is sent to the endpoint is optionally a particular phone number consistently used to send and receive text messages, which consistent use mitigates problems caused by false-positive spam filtering. Sending text messages to the user from different phone numbers results, for example, in a greater chance that a SMS messaging application on the mobile device would erroneously filter the OTP message or other messages needed to complete proof of consent and/or possession as spam, which would prevent completion of complete content subscription and/or reward implementation.

On receipt of the OTP at the application associated with the user endpoint, e.g., a SMS messaging application, the popup onsite code process—leveraging functionalities of the browser and its underlying operating system—extracts the received OTP from the messaging application and autofills the OTP input field, optionally without user action (step 328). When user input is preferred, submission can be completed with a simple user click on the OTP displayed in a suggest bar on top of a virtual keyboard. Here, there is no need for the user to navigate away from the browser to the mobile application to retrieve the OTP.

Alternatively, no OTP input field is displayed, and the popup onsite code process obtains the received OTP by leveraging the autofill functionality as described above, except that the popup does not display an OTP input field that needs to be filled.

In the event that autofill does not work, the user may need to swap applications to retrieve the OTP, specifically from the browser to the mobile application associated with the user's endpoint. The user must then manually input the OTP, by key entry or by cut and paste, into the input field of the popup. But even under these unhappy circumstances, there is still no need for the browser to navigate to a URL different from that of the parent web page and/or the popup and thus HTML parameters, properties, and attributes would be preserved and available for extraction by the popup onsite code processes.

Once it has the OTP, extracted programmatically or manually provided, the popup onsite code processes call a server-side endpoint service for proof of possession (step 330). The call includes the user's endpoint, the content provider ID, and the OTP code that was extracted from the mobile application.

Responsive to the call, the called service looks up the OTP by user endpoint and content provider ID (step 332), which was stored in step 326. If the generated code does not match the submitted code, the service returns an error code to the calling popup onsite code processes, which then can select other options to prove possession. Otherwise, the called service updates the temporary record with a subscriber ID, updates its status from pending to completed, and returns the subscriber ID to the calling popup onsite code processes (step 334). When an optional reward is given in exchange for subscription, the called service also returns a code needed to redeem the reward. This code can be randomly or pseudo-randomly generated or otherwise so as to be unique. Moreover, the called service can start sending the subscribed content, e.g., a welcome message, to the user's verified endpoint, which can be done as specified by the content provider and synchronized so that the welcome message is sent only after the popup onsite code has displayed the success message for content subscription or, if there is a reward, after auto application of the reward.

Upon receipt of the subscriber ID, which indicates successful proof of possession and content subscription, the popup onsite code processes (i) replace the placeholder cookie with one that includes the subscriber ID thereby updating subscription status; (ii) provide the code needed to redeem the reward to the user, when there is a reward; and (iii) update information displayed in the popup to indicate successful subscription to the particular content specified in step 314 and optionally to also indicate successful application of the optional reward specified in step 314 (step 336).

Note that sometimes the popup onsite code processes do not receive the generated and sent OTP within a certain time limit (which is usually when the OTP that was generated expires for security reasons, usually 10 minutes after generation). The failure to receive the sent OTP before it expires occurs because, for example, (i) the SMS message carrying the OTP fails to reach its destination, (ii) the autofill function on the mobile device is turned off, or (iii) the user is distracted and forgets to provide the OTP to the popup onsite code processes. In this case, the popup onsite code processes cannot send what it does not have, and so the called service for content subscription cannot complete its tasking for proof of possession and times out. Hence, the temporary subscription record does not get converted to a permanent subscription record (i.e., the subscription request is pending and not completed).

To resolve this problem, the system can send a reminder message to the user's endpoint (e.g., sending an SMS message to the mobile phone number that was received in step 316). The reminder message includes instructions for the user to complete content subscription (e.g., by replying to the reminder message with a "Y"). The following is an example reminder message:

```
'Remember, you can still reply "Y" to confirm and agree to terms
{postscript_terms_link}'
'Privacy at {postscript_privacy_link}'
```

Upon receipt of the user's response to the reminder message (the reply Y message), the system uses the endpoint of the response to look up the temporary subscription record to complete proof of possession. If there is a record found, then proof of possession has been satisfactorily proven because the endpoint of the response and the endpoint stored in the record necessarily match (which is how the record was found). Once proof of possession has been proven, the system can proceed with content subscription and related tasks as described above in steps 334 and 336.

In one implementation, the system includes a CRON process that runs every 15 minutes. It checks the temporary subscription records for those: (i) that are more than 4 hours old (at this point the generated OTP has expired can hence can no longer be used to prove endpoint possession); (ii) that are not older than one day; and (iii) for which the system has not already sent a reminder message (which precludes sending more than one reminder messages). Generally, a reminder message should be sent before the call to action becomes stale and the user loses interest, but not before the OTP expires so as to cause inefficiencies as the reminder may not have been needed. Generally, a CRON process is a computing process that can initiate and run periodically. The CRON process then generates a reminder message for each record found that meets conditions (i)-(iii), optionally queues, and then sends these messages. Each of the temporary records is updated to indicate that a reminder has been sent. Note that queuing is advantageous because it allows sufficient time for computing resource management.

As an alternative to CRON processing, the system can generate a reminder message when the OTP expires and then schedule send the message to meet the 4 hours to one-day timing requirements (or whatever timing requirements are in force). Where necessary to ensure only one reminder is sent, the system can check the temporary subscription record to determine whether a reminder message was already sent.

Optionally, the reminder message can also include other information besides the instructions to complete subscription. For example, the content provider ID (received in step **316*b*) and/or the content ID (also received in step 316*b*) can be included, either or both of which can be used for assessing success metrics of marketing, record keeping tasks, and helping look up the temporary subscription record (created in step 326**). In lieu of the provider content ID and the content ID, the reminder message can include a reference number that can be used to help look up the temporary subscription record.

Optionally, the reminder message can be customized for each customer. The reminder can include incentives not yet proffered to entice completion. The time limit mentioned above can be set for and by each customer.

Optionally, the above-described proof of endpoint possession steps can be skipped. In this implementation, the lists of subscribed endpoints can include one or more records of the subscribed endpoints and associated browser and/or device fingerprints. Each record includes (i) a subscribed endpoint that has completed proof of possession and (ii) the browser and/or device fingerprints obtained at the time of subscription (with proper consent as required by applicable laws and regulations). These records can be stored in a datastore of subscriber network for multiple or all customers of the system (e.g., there are subscription records for two different content providers or two different merchants). Such a cross-domain subscriber network is advantageous because proof of endpoint possession by one content provider or one merchant can be used for other customers, and the number of times the system needs to prove endpoint possession for a user endpoint can be technically reduced to one, thereby saving computing resources and improving computing efficiency of the system.

To skip the above proof of endpoint possession steps, the called endpoint service for content subscription can obtain the fingerprints with proper notice and consent as required by applicable laws and regulations, which can be done as soon as the user navigates to the website of step 302. The system can look up the fingerprints in these records to determine (even without the endpoint, where permitted by law and regulations) whether the user's device has been subscribed, which necessarily means that proof of possession for the endpoint has been successfully completed. If there is a record of the fingerprints, then the user's endpoint is likely to be one that has already subscribed. The inference made here is that the endpoint associated with the device has not changed since the subscription recorded in the datastore. To avoid any doubts, however, the system can additionally or alternatively check if the endpoint received as part of the call of step 316*b* matches an endpoint stored on the datastore. If the two endpoints do match and where permitted by applicable laws and regulations, the called endpoint subscriber service can skip proof of possession and complete applicable tasks for the call to action.

Note that unlike single-domain subscription records, where proof of endpoint possession is completed for each domain (i.e., each customer), proof of possession using cross-domain subscription records is done only once and can be used in other domains (i.e., for other customers).

Note that FingerprintJS and similar services provide suitable browser and device fingerprints. Alternatively, cookies can be leveraged where permitted with consent. Here, the cookies persist beyond browsing sessions and hence can be leveraged to detect and identify user devices that have been used for successful proof of endpoint and content subscription. The persistent cookies can be configured only to indicate and identify user devices. With this option, the persistent cookies store and provide no other information. Information stored in the persistent cookie can be secured, e.g., by encryption, keys, and/or passwords, so that it is not accessible to servers-side or any other processes external to the user device.

Advantageously, latency can be mitigated since tasks to complete content subscription can be initiated before and/or without performing lookup operations on records of endpoints and content provider ID. Moreover, records of endpoints and associated browser and/or device fingerprints provide system redundancy so even when the records of endpoints and content provider ID are not available or include errors, the system can still determine with acceptable accuracy whether the user endpoint received in step 316*b* has already subscribed and whether it has not already been subscribed.

FIGS. 7A-D, 8A-D, 9A-E, and 10A-F show examples of computing processes that leverage previously completed proof of endpoint possession to streamline subsequent content subscription, including subscriptions across customer domains (e.g., across different merchants). Specifically, once proof of possession has been successfully completed for an endpoint for content subscription with a first merchant, the endpoint and its associated information can be used to streamline subsequent subscription to content, even for a merchant who is not the first merchant and is not affiliated with the first merchant. (These two merchants are customers in a network of customers who use the system described in this specification for proof of endpoint possession and content subscription.) In these examples, the endpoint for which there has been successful proof of possession and its associated information, e.g., endpoint and/or email can be stored on a server-side list of completed proof of possession along with subscriber ID, content ID, one or more device fingerprints, and/or one or more persistent cookies, etc.

With the example shown in FIGS. 7A-D and FIGS. 8A-D, the stored information is used to bypass the use of an OTP. For example, given an email endpoint, the system can look up a phone number endpoint for which content subscription is currently requested and, furthermore, that has already been previously used to subscribe to other content (and hence already proven to be in the possession of the user). As shown, the stored information can further be leveraged to prefill information the user would otherwise have to manually key into an input box. Notably, device fingerprinting and/or persistent cookies can be used in these computing processes for extra security, but are not otherwise needed since the device can be identified with the email endpoint.

With the examples shown in FIGS. 9A-E and FIGS. 10A-F, the stored information is leveraged only to prefill information the user would otherwise have to key in manually. An OTP is still sent to the endpoint for which content subscription is requested. Where applicable, onsite process of the popup can retrieve the OTP from the endpoint application (e.g., messaging application) which saves the user from having to manually key in the OTP.

Similarly, the examples shown in FIGS. 11A-D and FIGS. 12A-E each leverages the stored information only to prefill, and an OTP is still used for proof of endpoint possession before content subscription. However, fingerprinting and/or persistent cookies are leveraged in these examples and so no endpoint needs to be provided by the user. (The fingerprint and/or persistent cookies identify the user device and its associated endpoints.)

The example shown in FIGS. 13A-E leverages fingerprinting and/or persistent cookies to identify the user device and its associated endpoint and relies on previously completed proof of endpoint possession to implement a one-touch content subscription process. This example is available only where permitted by law and user consent has been obtained.

Figure 4:
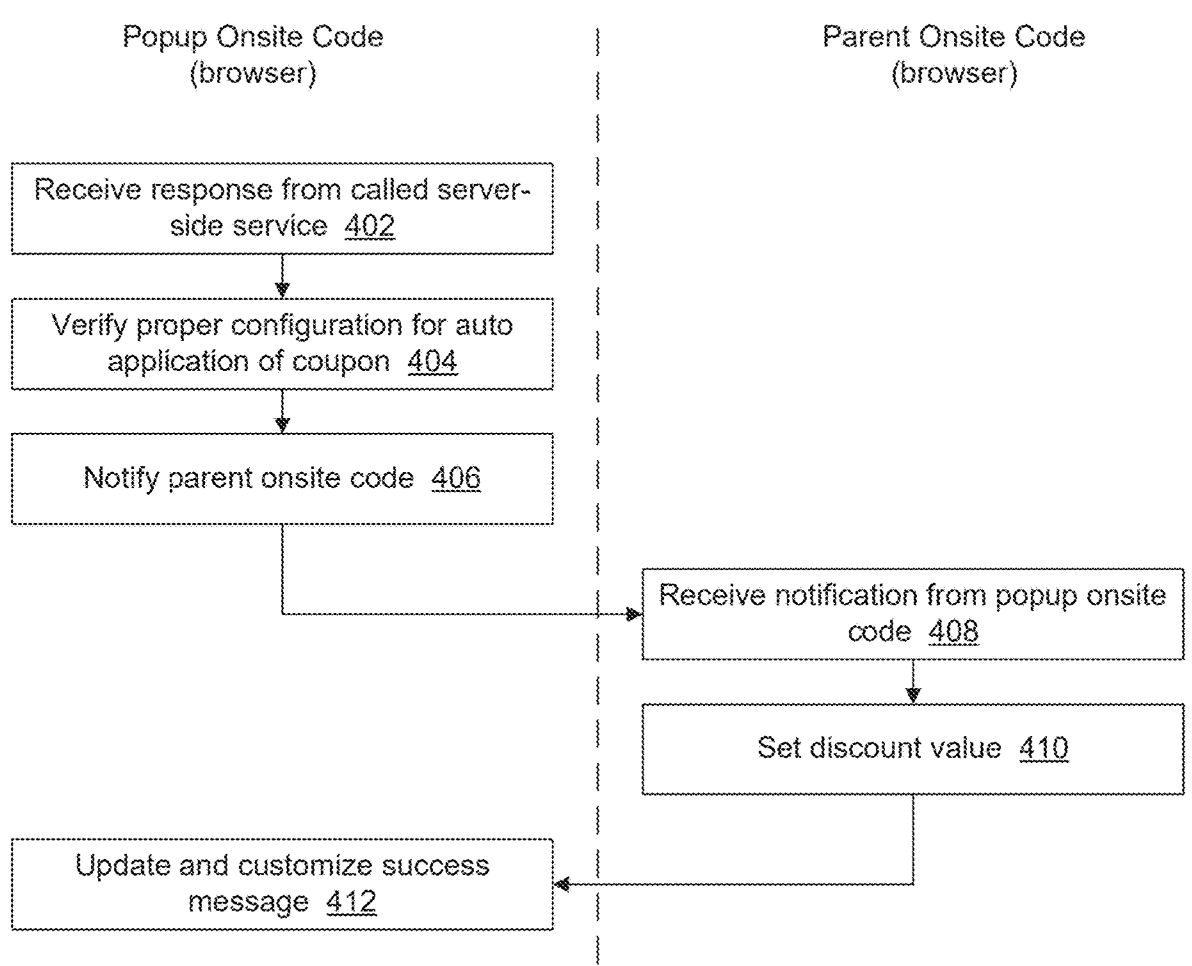
FIG. 4 shows an example client-side method for programmatically applying rewards responsive to onsite content subscription.
Figure 5:
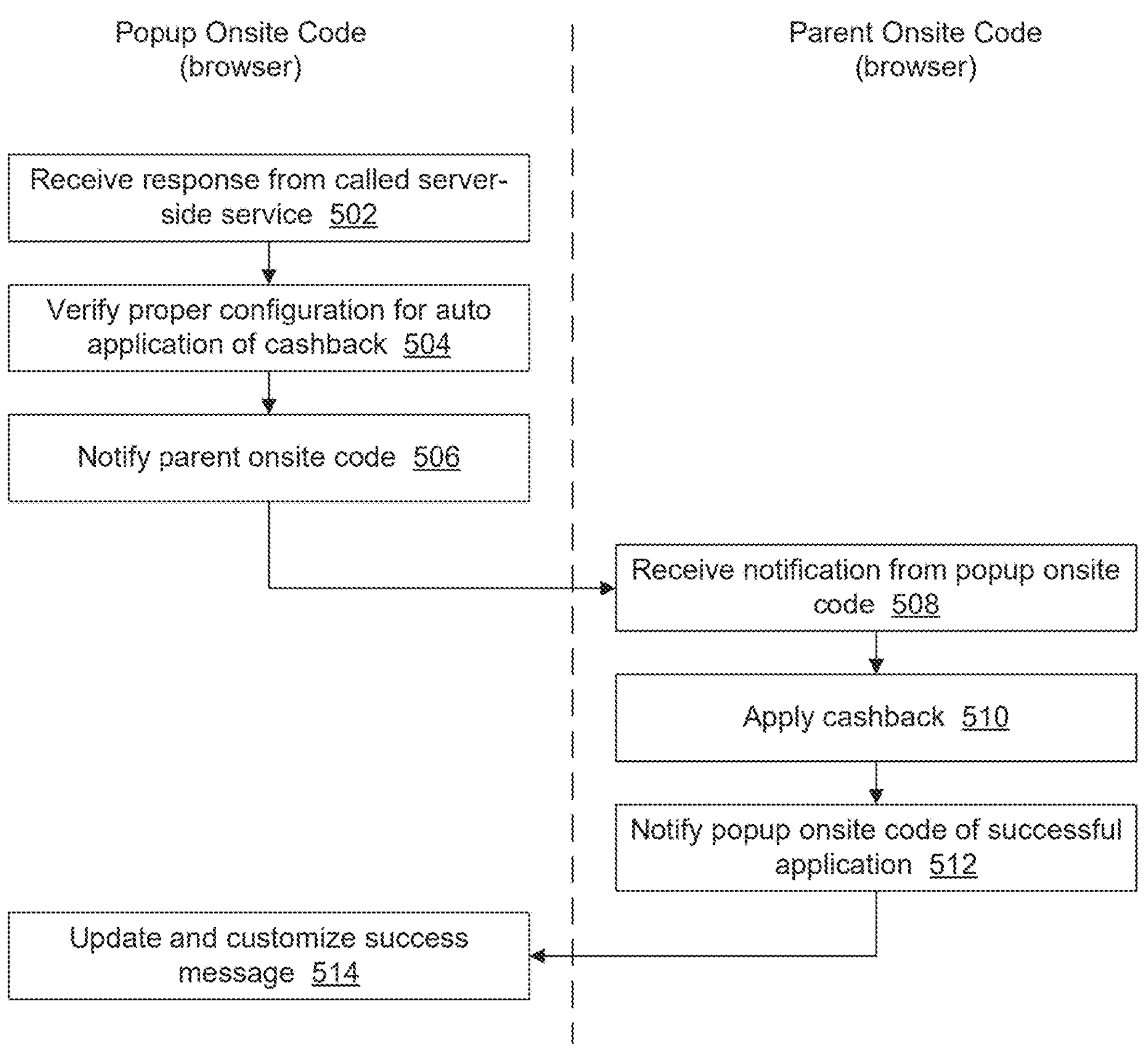
FIG. 5 shows another example client-side method for programmatically applying rewards responsive to onsite content subscription.

FIGS. 4 and 5 are sequence diagrams that respectively depict examples of auto application of discounts and cash-back responsive to successful proof of possession, both of which can be completed onsite and, furthermore, included as part of the method described above in reference to FIG. 3. In these examples, popups are implemented with iFrames, and so onsite processes are performed across two domains, that of the parent web page and that of the popup. Auto application, or automatic application, means that the application of the reward or cashback occurs without requiring further user action, so that when the user navigates to the cart, for example, she would see that the discount has been applied or that the cashback is available.

For circumstances when the reward is a discount that needs to be applied to a shopping cart on the parent web page, the popup onsite code processes provide the discount code to the processes of the parent web page that performs shopping cart functions, which can be done, e.g., with the postMessage( ) method. The latter processes can then validate the discount code and automatically apply it to the shopping cart, i.e., without requiring further user action for the user to get the discount, so that when the user navigates to the cart, she would see that the discount has been applied. Notably, auto application of the reward can be initiated without having to wait for a next page refresh.

And under circumstances when it would be necessary or useful for the content provider to know from which digital property the user navigated to the parent web page, e.g., for traffic and/or advertising analytics, the popup onsite code processes can extract the appropriate UTMs from the parent web page, which is possible because the content subscription was completed onsite, and send it to the server to append to its content subscription lists.

As shown in FIG. 4, the popup onsite code receives a response from the called server-side service for content subscription, which response indicates successful proof of possession and includes a discount code (step 402). The popup onsite code verifies proper configuration for auto application of the discount (step 404). Verification includes, for example, checking the popup configuration data for an indication that the content provider has authorized auto application, as well as ensuring that the coupon can be applied in the current session. The coupon can be applied, for example, when there is a shopping cart or another resource to purchase. The popup onsite code notifies the parent onsite code of the discount code, which can be done using the window.postMessage method (step 406). The discount code includes information that specifies the value of the discount. The parent onsite code receives the notification through an event listener (step 408) and sets the value of the discount in accordance with the information received (step 410), which value can be set, for example, by generating a discount cookie with the specified value. The discount can then be applied to the shopping cart, optionally by a remote service that performs shopping cart functions. When the parent web page is one that shows items that can be purchased and their pricing, the parent onsite code can optionally update the pricing shown to reflect the discount, which option can be helpful when there is no shopping cart displayed on the page, but can be performed regardless of whether there is a shopping cart displayed or not. Responsive to generating of the discount cookie, the popup onsite code updates the success message of the popup to indicate that the particular discount, including the amount, has been auto applied (step 412). Alternatively, the popup onsite code updates the success message only after receiving notification from the parent onsite code that the discount has been applied.

As shown in FIG. 5, the popup onsite code receives a response from the called server-side service for content subscription, which response indicates successful proof of possession and includes a cashback code (step 502). Optionally, cashback can be implemented as a zero-cost item that can be generated and placed into the shopping cart once content subscription has been completed. The popup onsite code verifies proper configuration for auto application of the cashback (step 504). Verification includes, for example, checking the popup configuration data for an indication that the content provider has authorized auto application, as well as ensuring that the cashback can be applied in the current session. The cashback can be applied, for example, when there is a shopping cart or another resource available to benefit from the cashback. The popup onsite code notifies the parent onsite code of the cashback code, which can be done using the window.postMessage method (step 506). The parent onsite code receives the notification about the cashback through an event listener that was registered upon instantiation of the popup (step 508). Responsive to receipt of the notification, the parent onsite code applies the cashback (step 510). Auto application of cashback, in one implementation, is the generation and addition of a zero-cost item to a shopping cart. The zero-cost item can be generated as an instance for the present user of a zero-cost item class. This digital item represents the cashback and includes a unique code that is redeemable in accordance with reward rules, which are described below. Once auto application of the cashback has been completed, the parent onsite code notifies the popup onsite code that cashback has been auto applied (step 512), and responsive to this notification, the popup onsite code updates the success message of the popup to indicate that the particular cashback, including the amount, has been auto applied (step 514).

Figure 6:
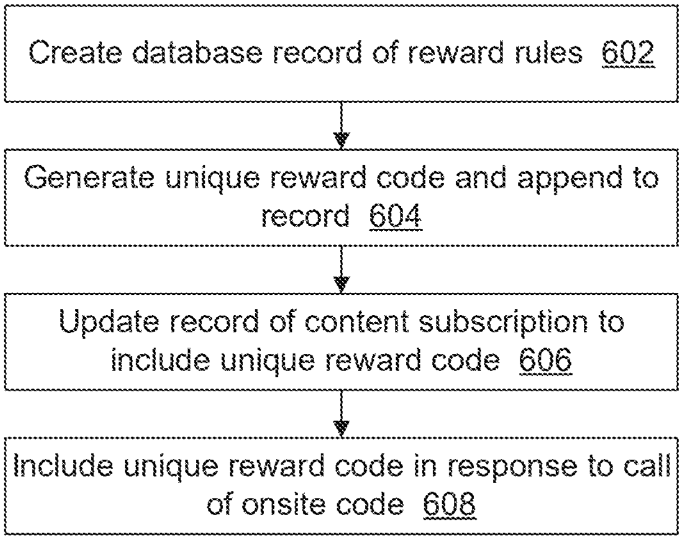
FIG. 6 shows an example server-side method for content subscription and programmatic application of rewards.
Figure 7A:
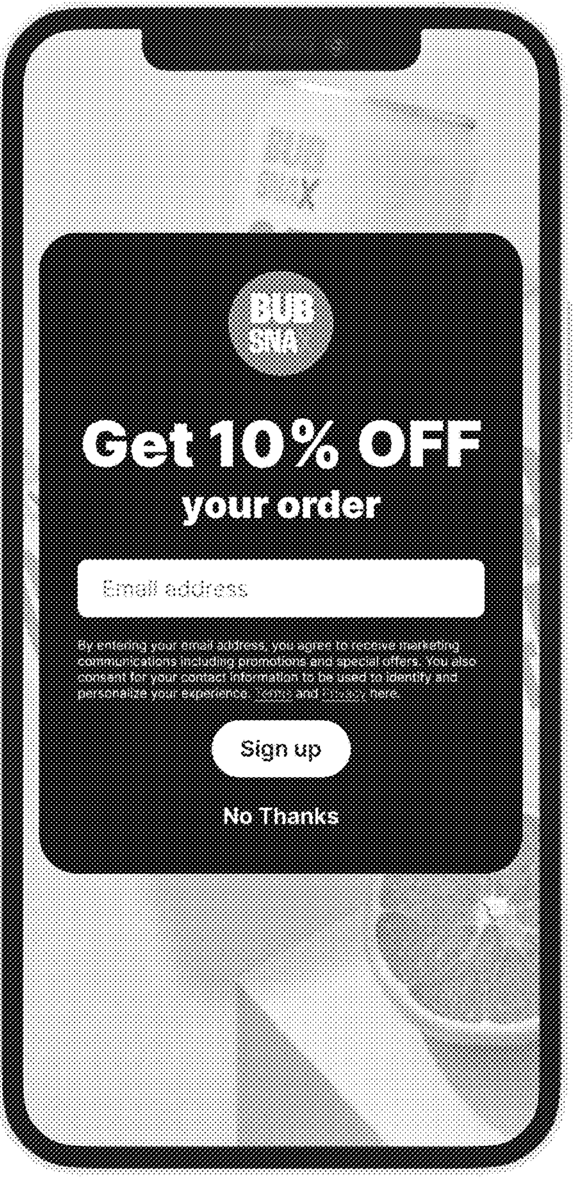
FIGS. 7A-D show an example method for content subscription across different domains.
Figure 7B:
Figure 7C:
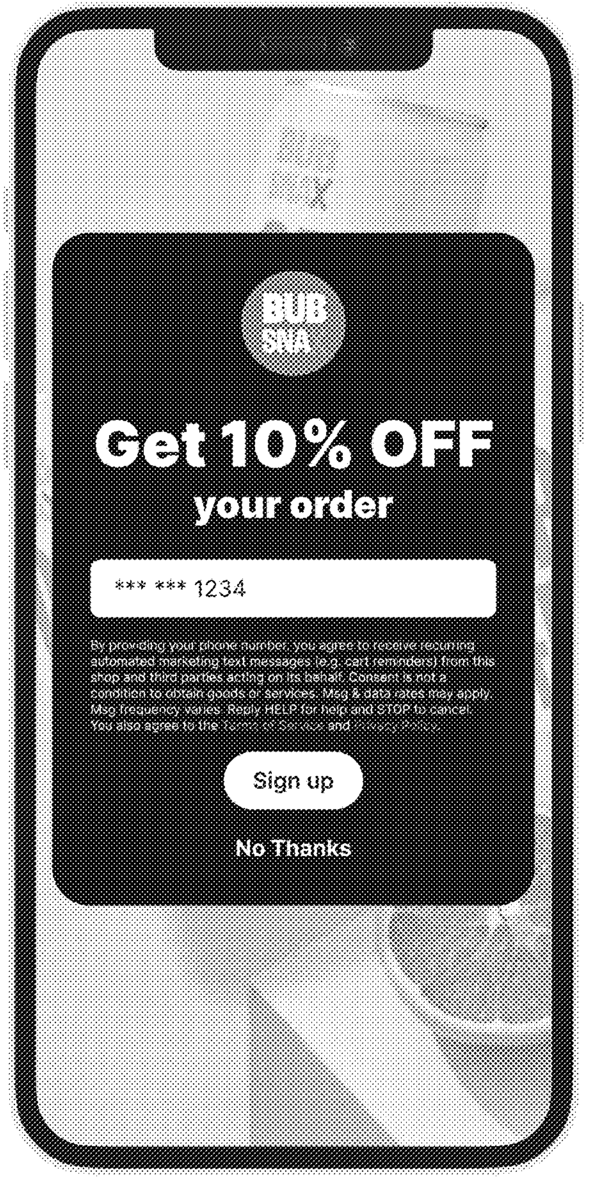
Figure 7D:
Figure 8A:
Figure 8B:
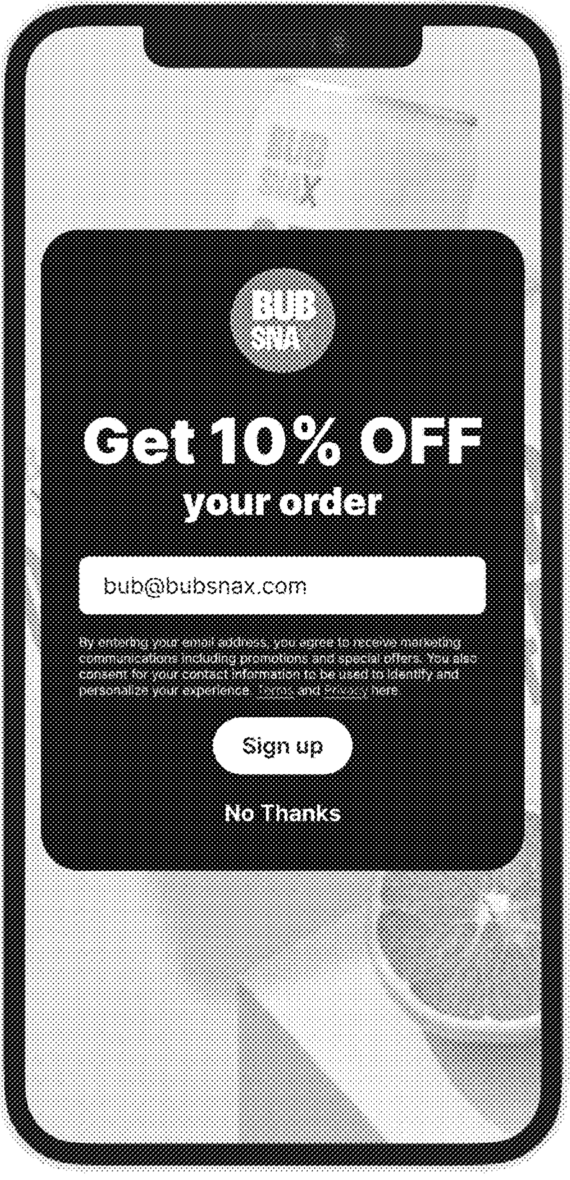
Figure 8D:
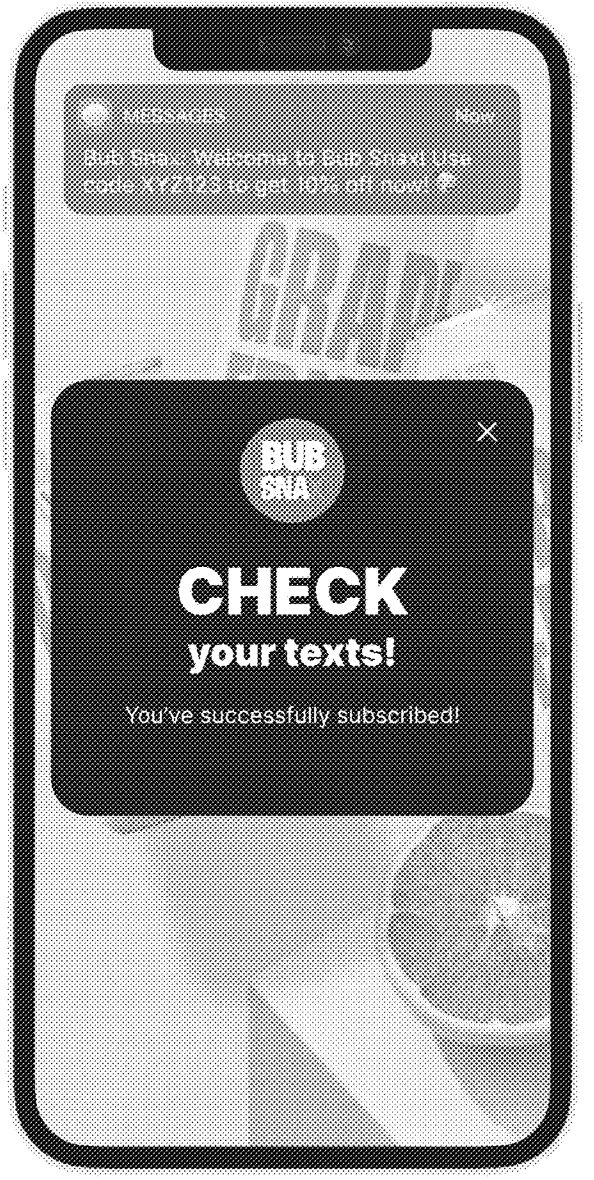
Figure 9A:
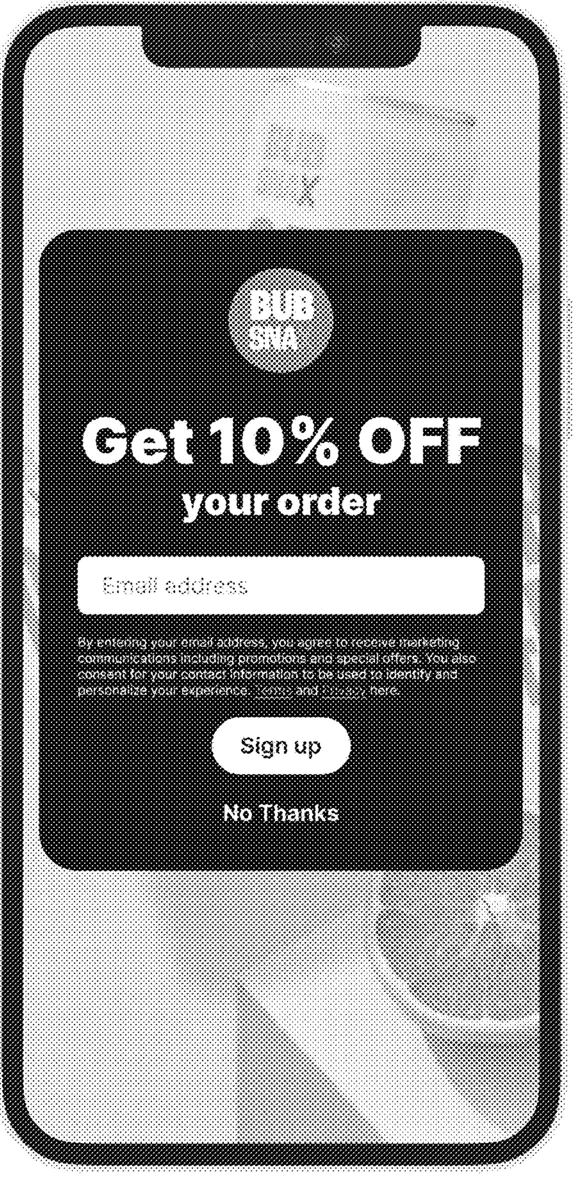
Figure 9B:
Figure 9E:
Figure 10A:
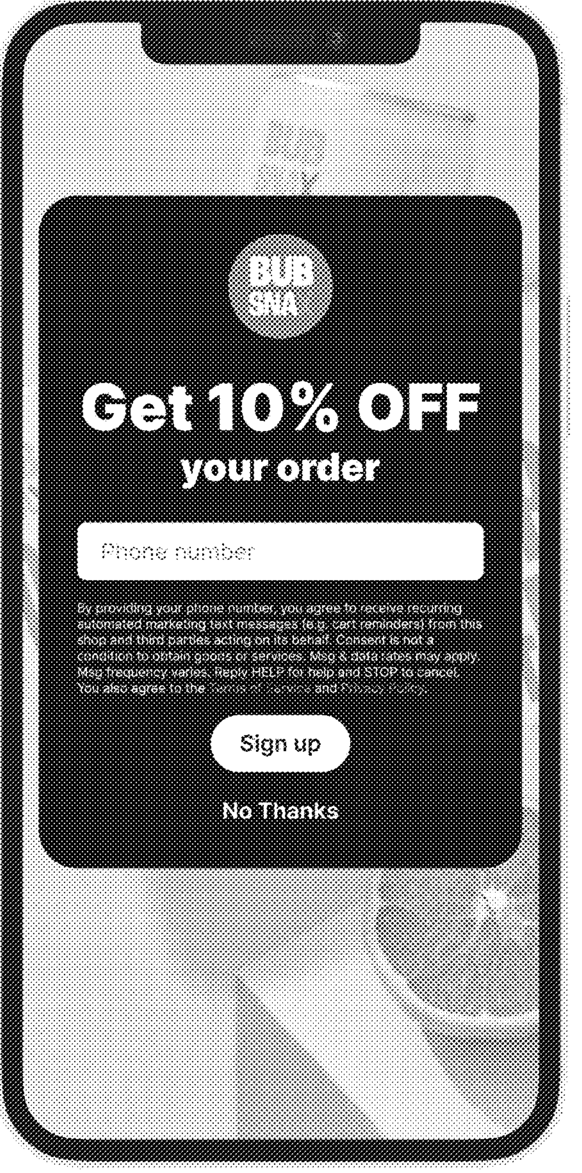
FIGS. 10A-F show another example method for content subscription across different domains.
Figure 10B:
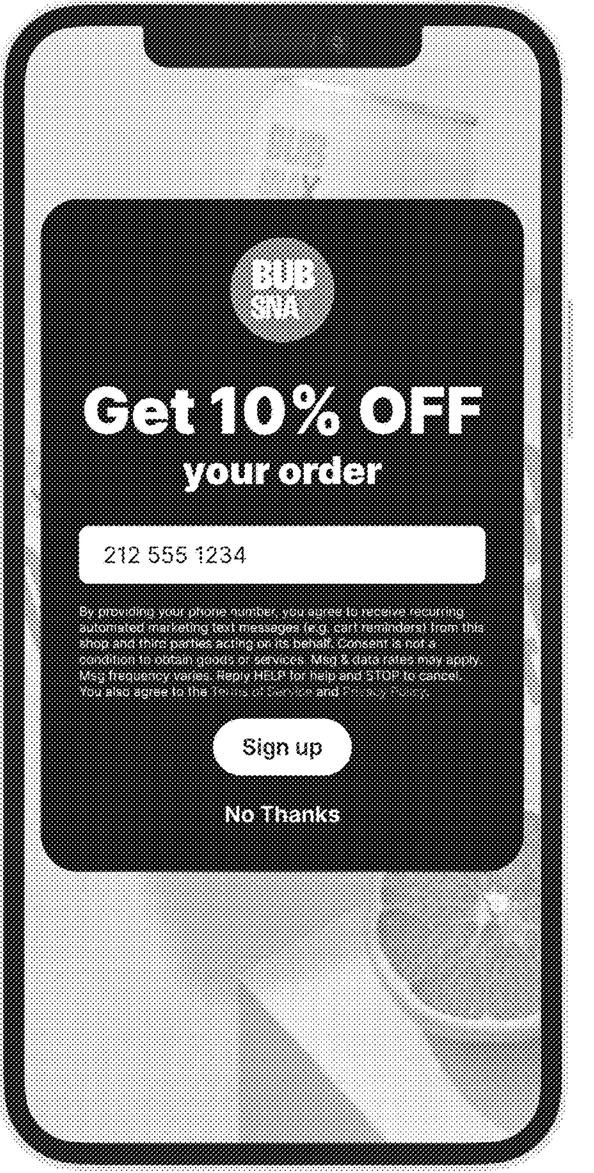
Figure 10C:
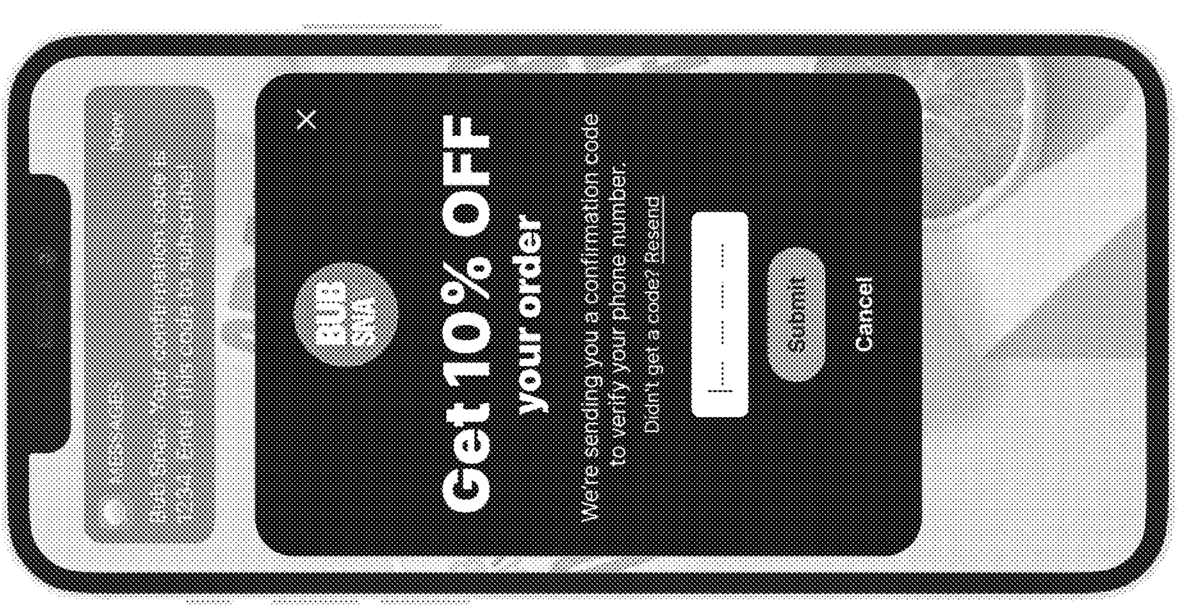
Figure 10D:
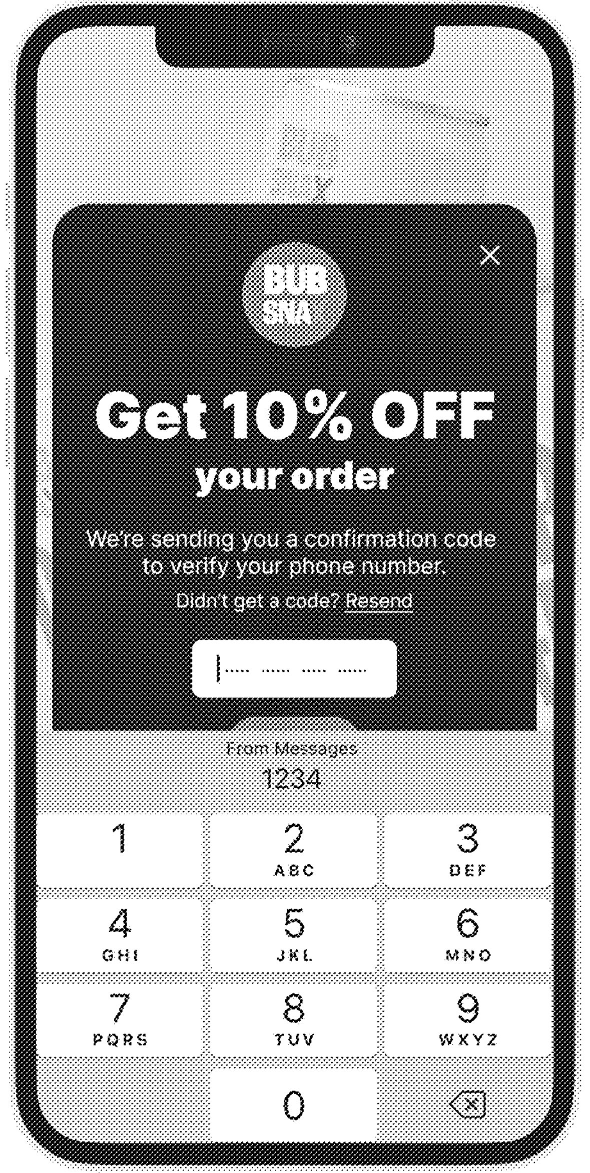
Figure 10E:
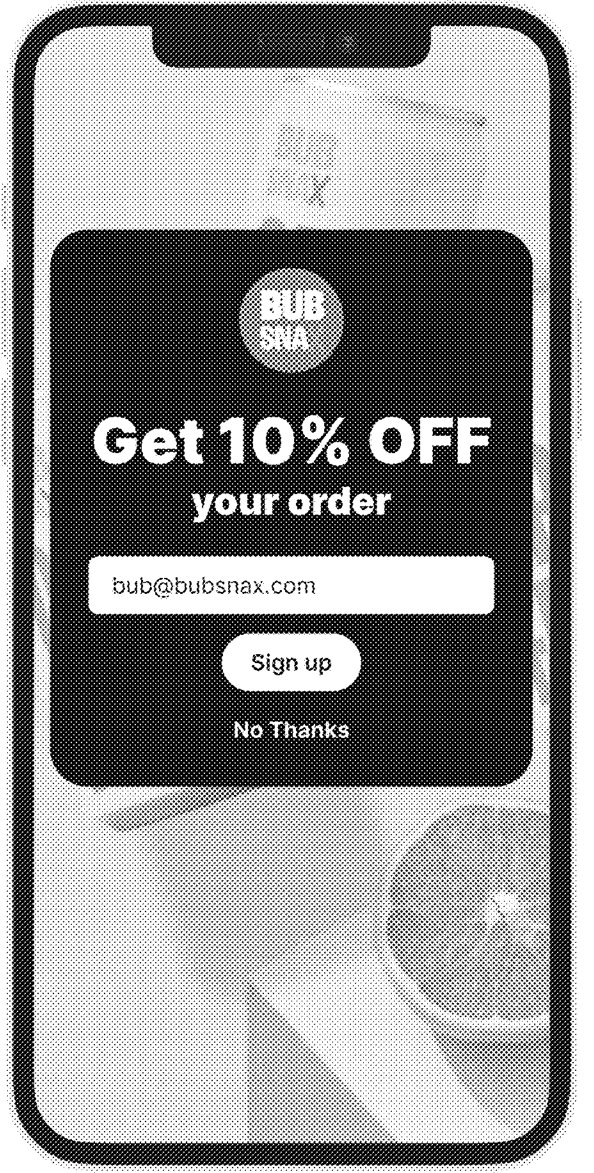
Figure 10F:
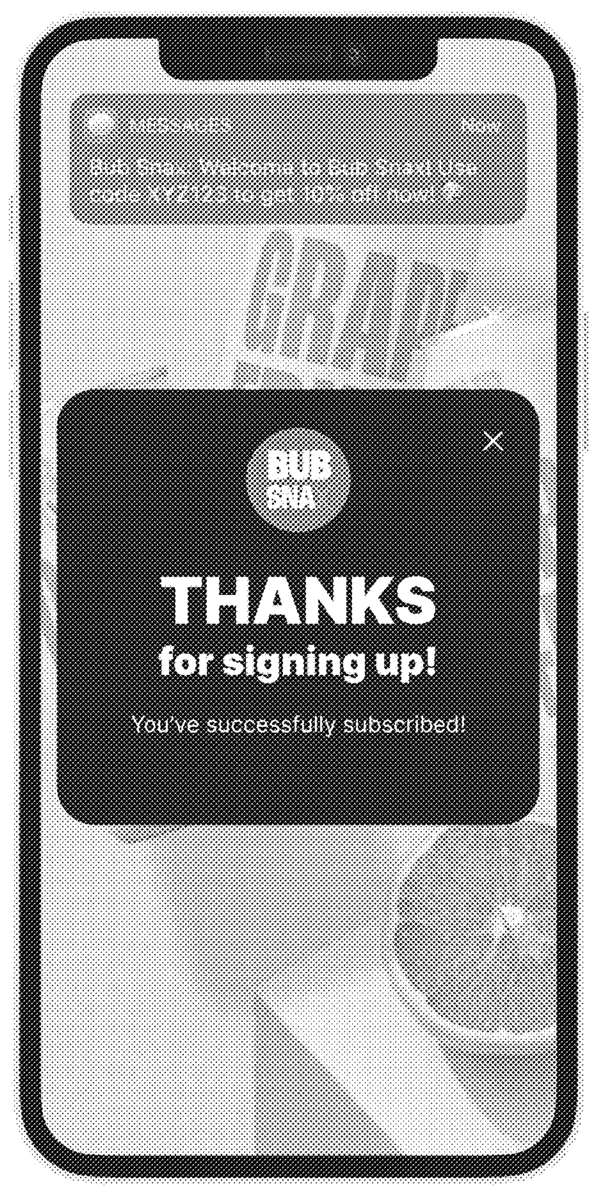
Figure 11A:
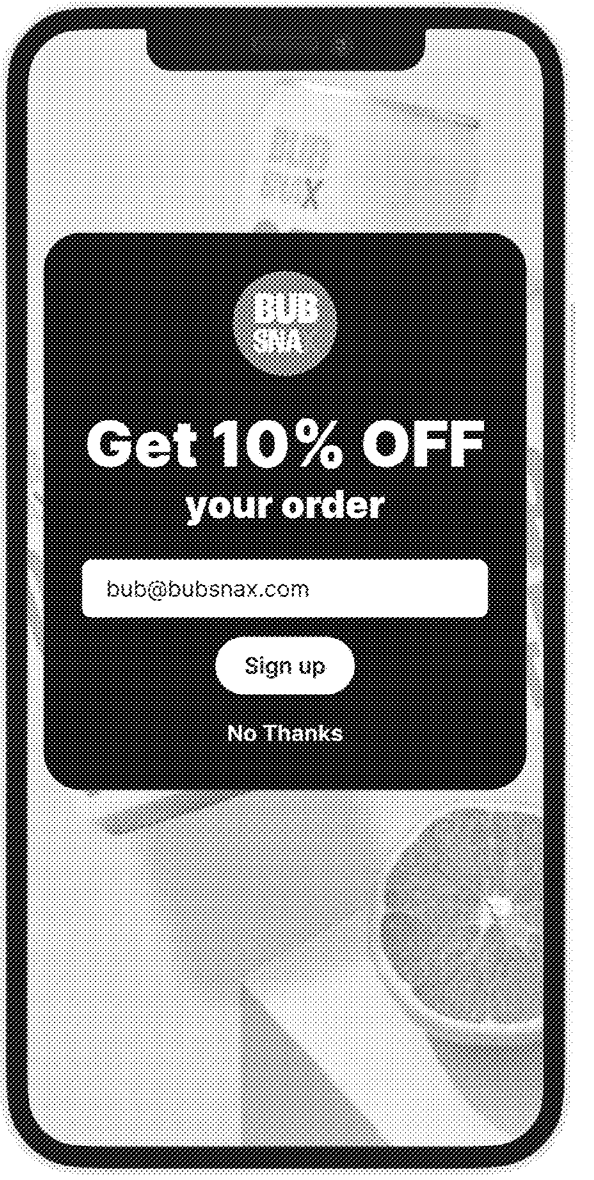
Figure 11C:
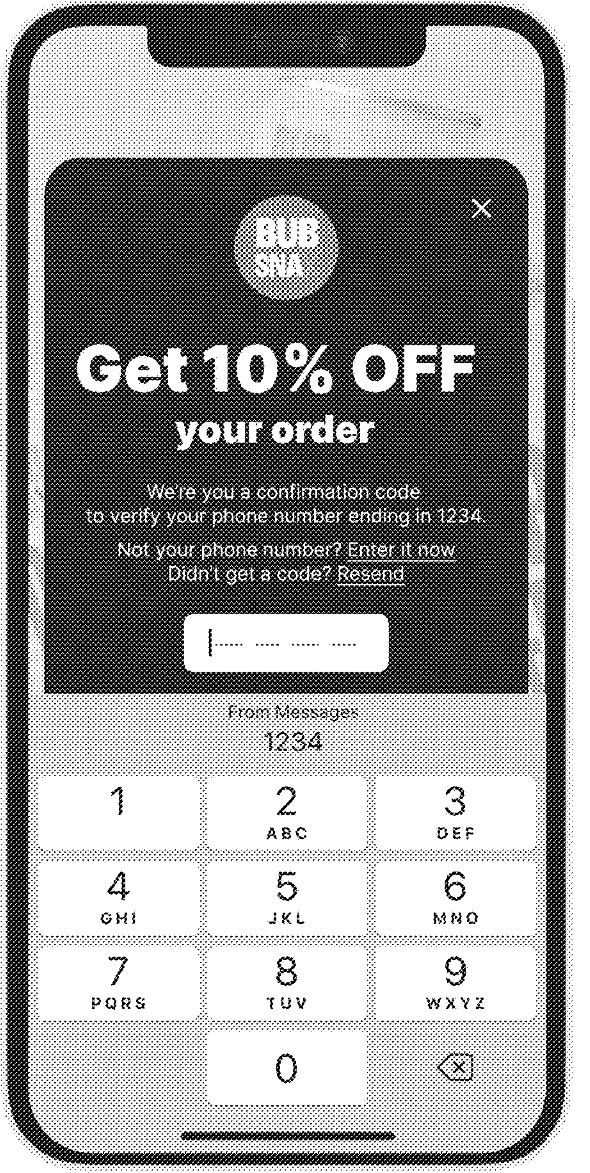
Figure 11D:
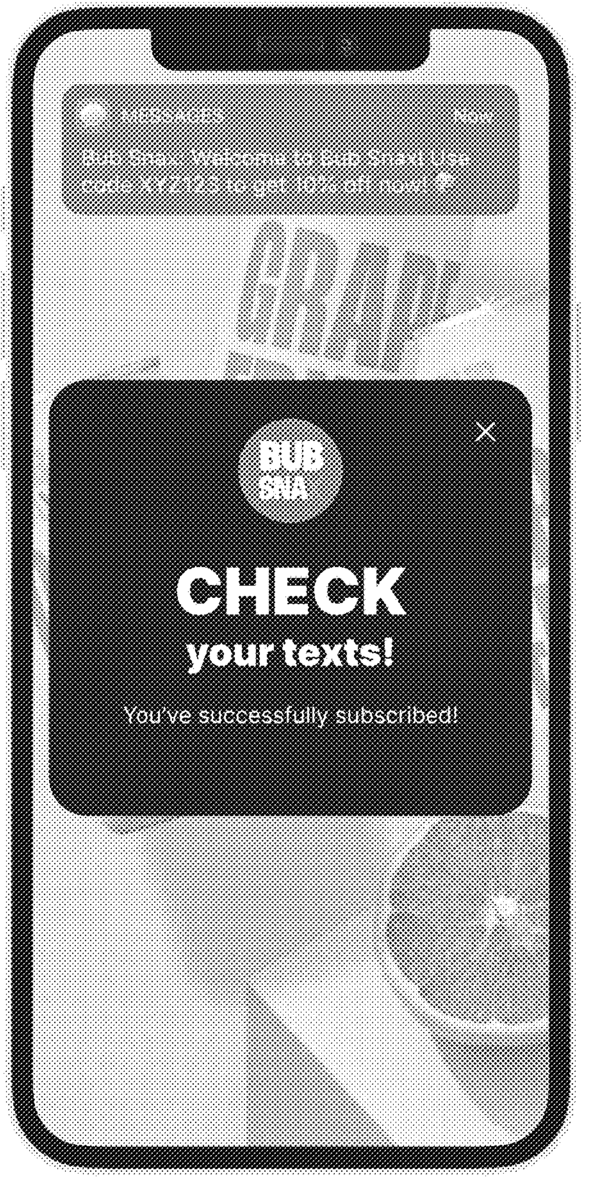
Figure 12A:
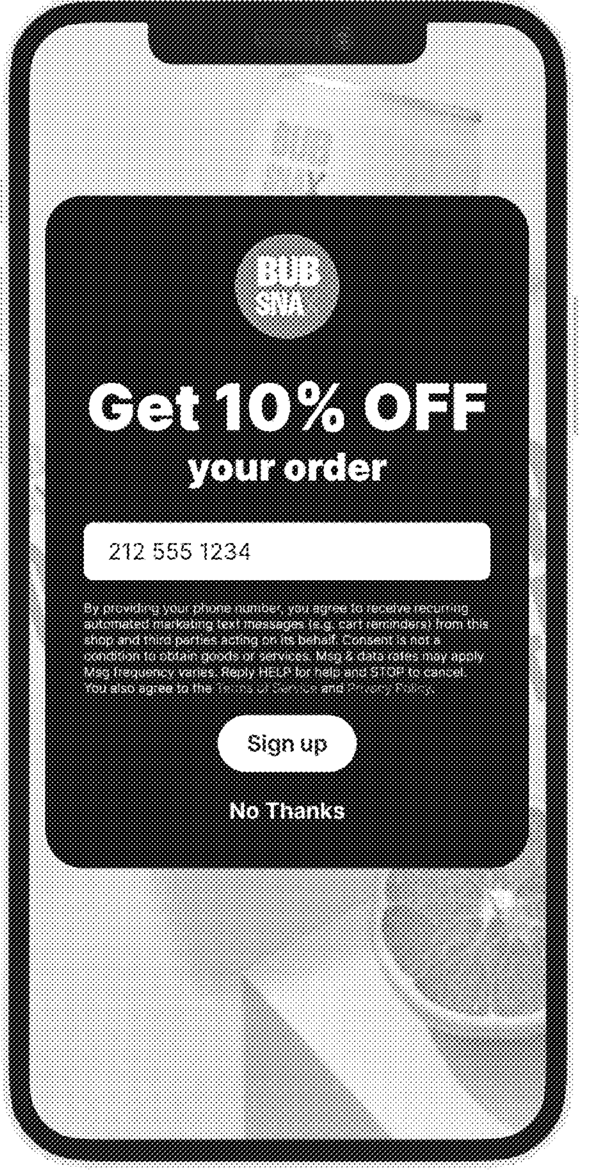
FIGS. 12A-E show another example method for content subscription across different domains.
Figure 12B:
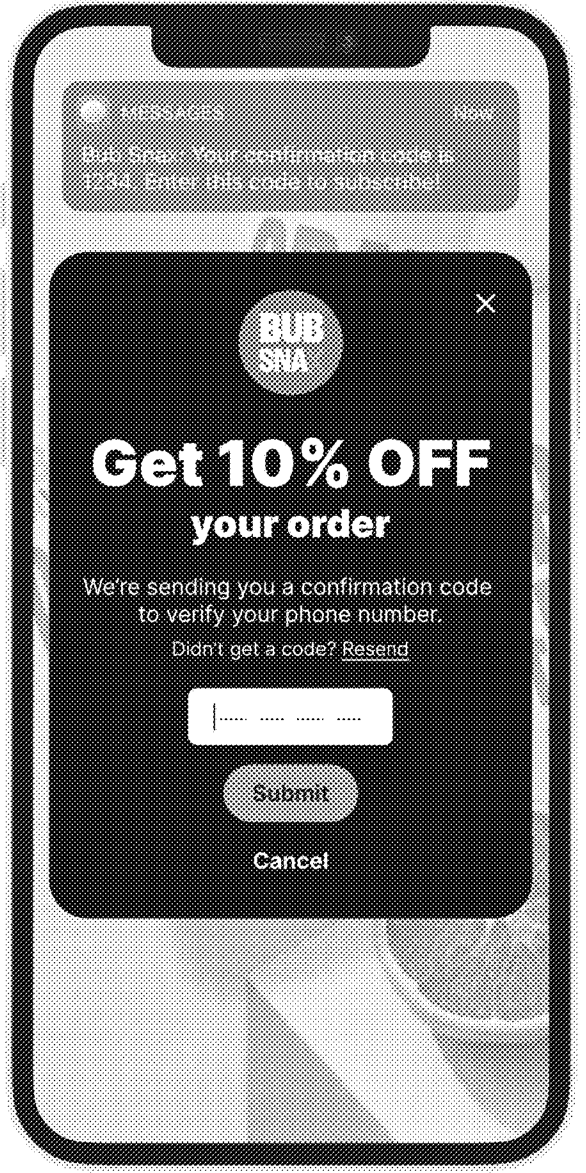
Figure 12C:
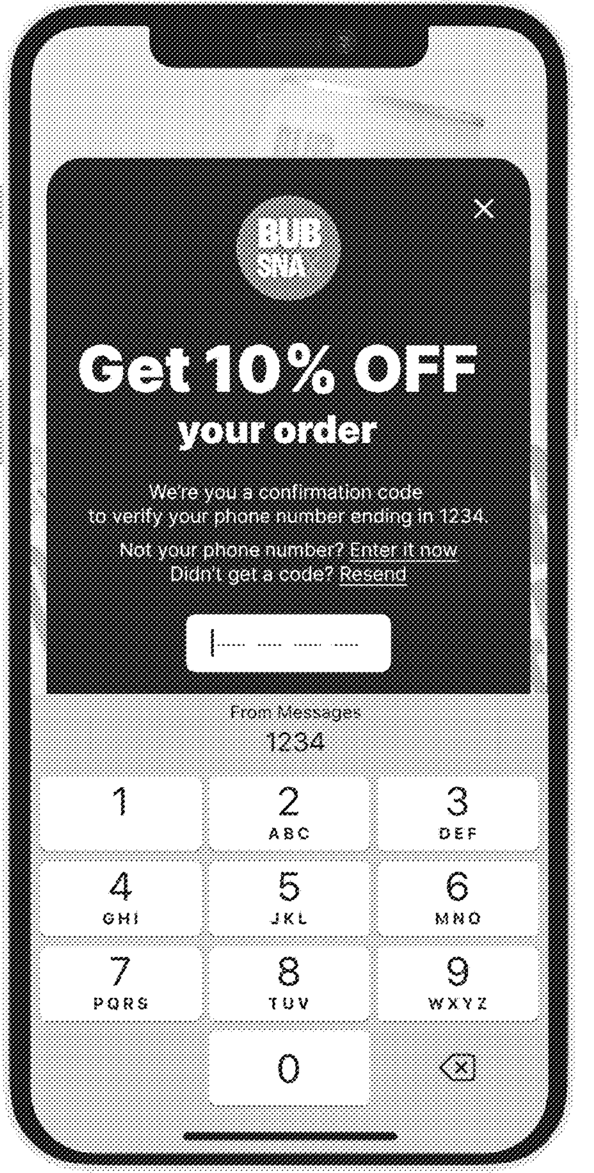
Figure 12D:
Figure 12E:
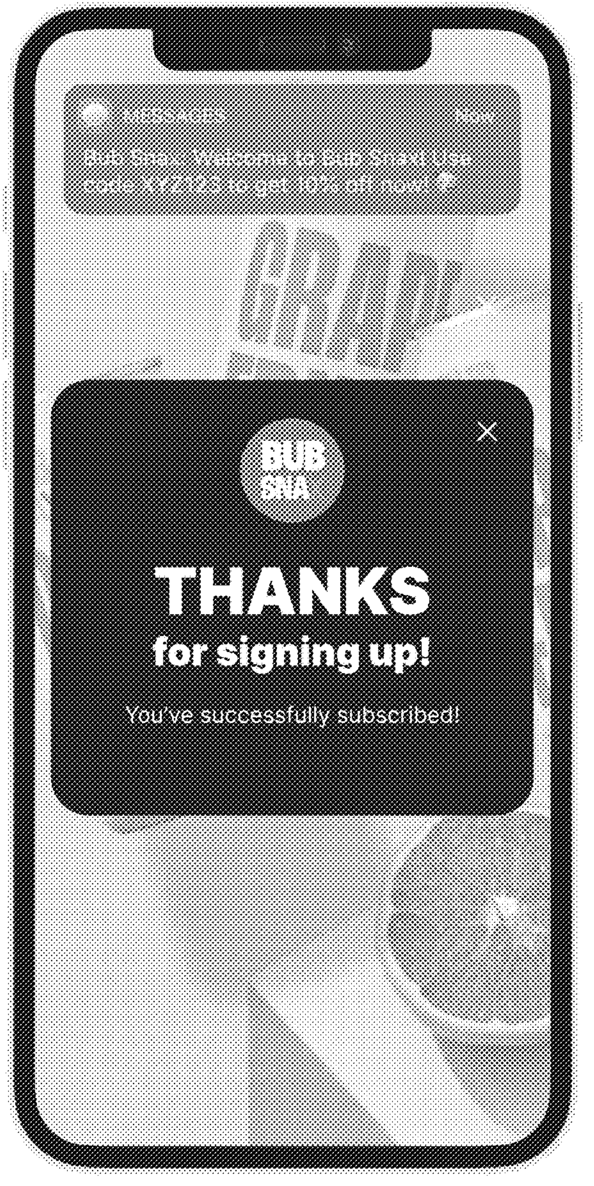
Figure 13A:
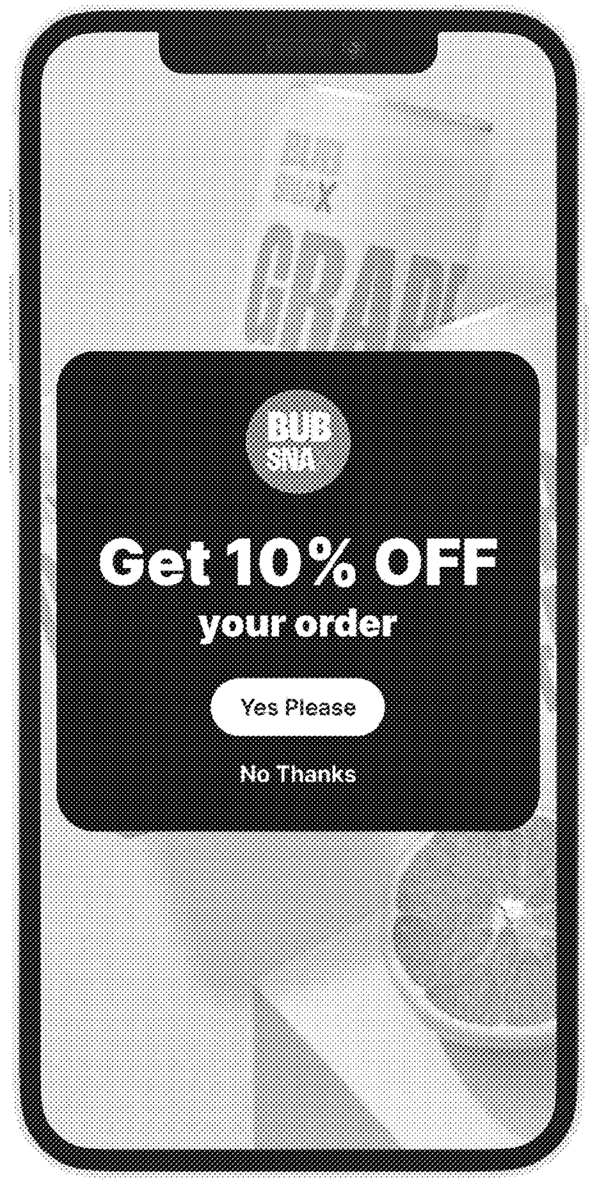
FIGS. 13A-E show another example method for content subscription across different domains.
Figure 13B:
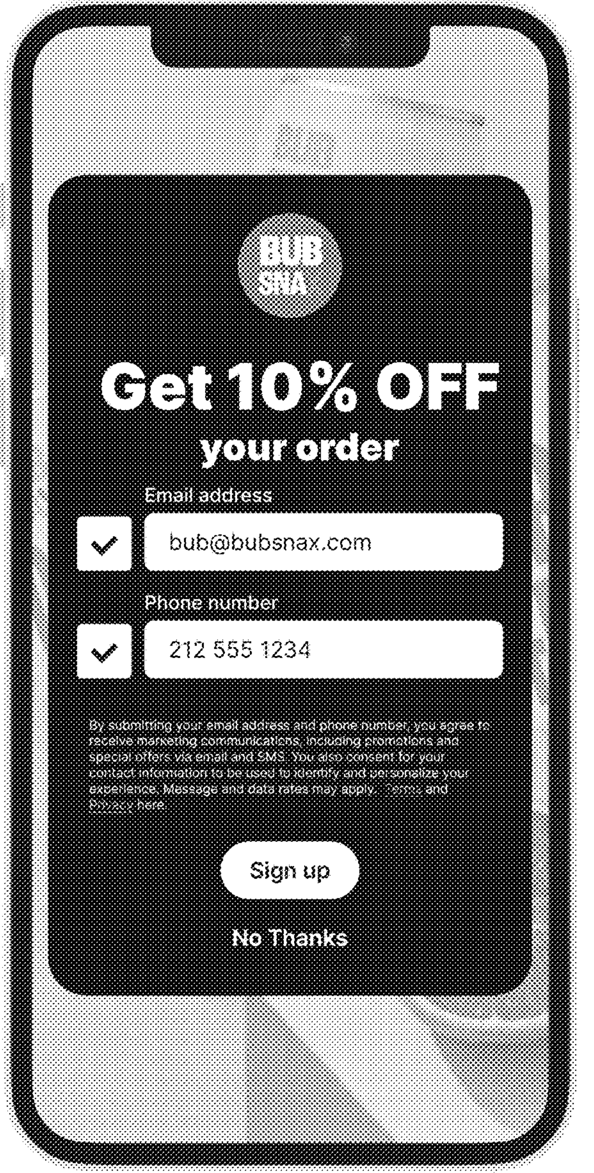
Figure 13C:
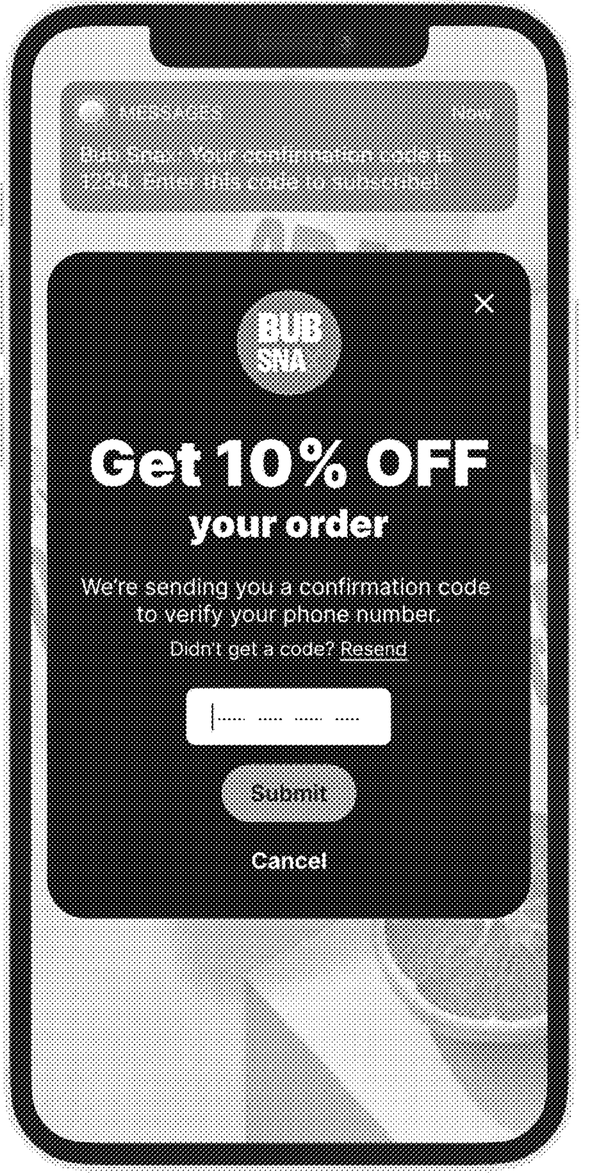
Figure 13D:
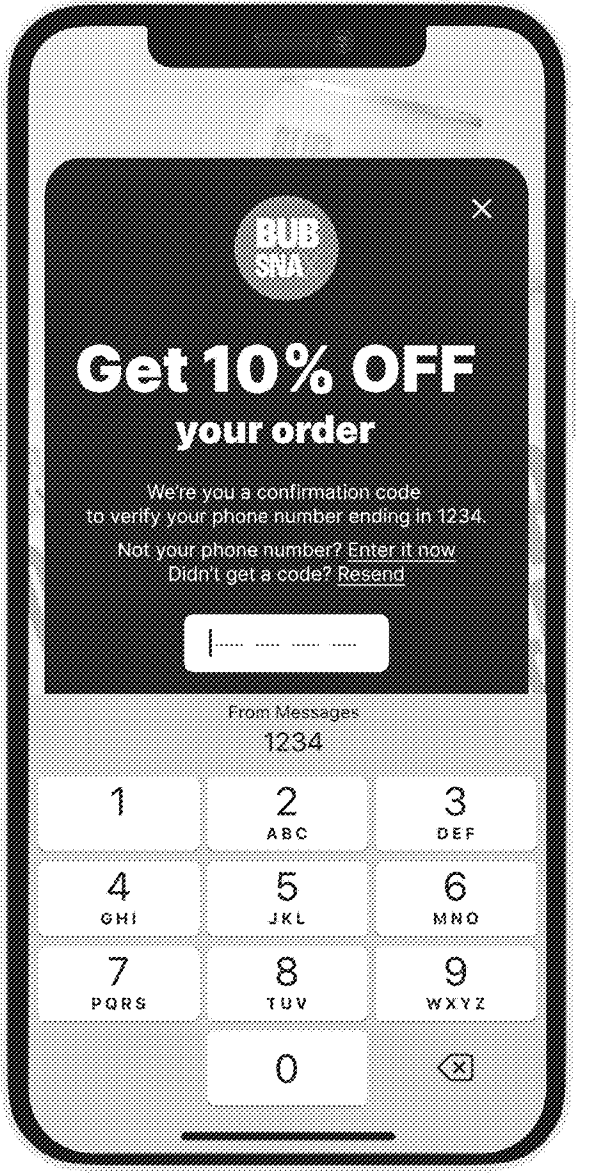
Figure 13E:
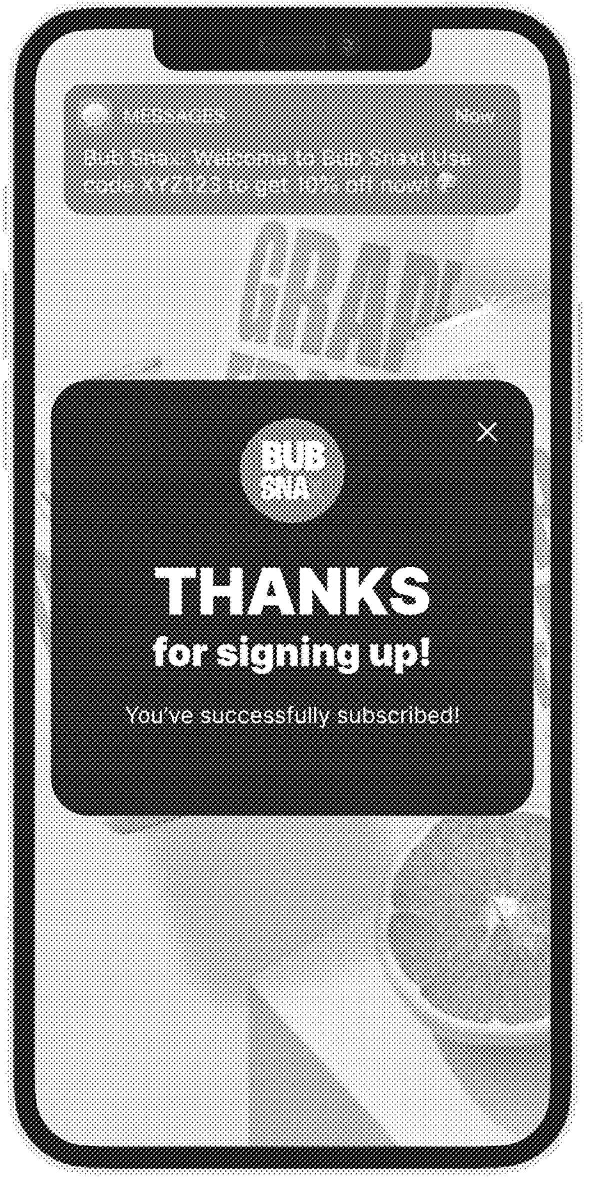

FIG. 6 shows a server-side method to auto apply rewards performed by the endpoint service, responsive to successful proof of endpoint possession. The reward is a discount coupon or cashback redeemable at a later time. This method can be an integral part of the endpoint service for content subscription described above in reference to FIG. 3.

Once the OTP received from the onsite code has been found to match the previously generated and stored OTP, the service creates a database record that specifies reward rules (step 602). The reward rules define requirements to apply the rewards, automatically or otherwise. With coupons, for example, the rules specify amount of discount, the time period when the discount may be applied, which content or other purchase items qualify for discount, a threshold purchase amount, how many times the discount may be applied per user, and/or qualifying geolocations in which the discount can be applied. With cashback, the rules specify the amount of the cashback, where it may be redeemed, and/or the time period during which it can be redeemed, e.g., after any return or exchange period has expired, but no later than six months. The reward rules are created based on input provided by the content provider, which input can be stored in popup configuration data.

Optionally, auto application of rewards can be performed by two services that have accessible endpoints at different servers. For example, the endpoint service that was called by the onsite code for content subscription and auto application of rewards runs on the content-provider-platform server 106 and calls a service to create reward rules, which in turn runs on support server 103. Here, it may be necessary to have two databases of reward rules, and both would be updated with the new record created in step 602.

As shown in FIG. 6, the server-side endpoint service that auto applies rewards generates a unique coupon code or cashback code for the generated record of reward rules (step 604). The codes are the actual ones that are redeemable. If there are two databases of reward rules, then both are updated with these codes.

The service stores the coupon or cashback code in the appropriate record on the list of endpoints subscribed to the content provider (step 606). The record now has information that includes the endpoint, content provider ID, the coupon or cashback code, and optionally content ID when the content provider offers multiple sets of content for subscription.

The service includes the discount or coupon code in the response to the calling onsite code that proof of possession and content subscription has been successfully completed (step 608). With this information, the onsite code can auto apply the discount code or the cashback code. Where onsite code operates on two domains, e.g., when iFrames elements are used, the popup onsite code would receive the information and can pass that to its parent onsite code.

Advantageously, latency can be reduced and computing process efficiencies can be improved because popup onsite code processes whose start and/or stop are conditioned on successful completion of content subscription and/or proof of possession need not rely on or wait for cookie polling, as can be the case with conventional methods. The above described process to auto apply discount code to the shopping cart (or alternatively, cashback and/or other rewards) is an example of a process that is conditioned on successful completion of proof of possession and content subscription.

Conventionally, cookie polling is customarily done when web pages are refreshed. Cookie polling can also be done independently of page refresh. Here, polling would take place periodically, e.g., every second or two, until the cookie with the subscriber ID is detected, thereby indicating successful subscription and/or proof of possession. However, cookie polling may take too long, or in some cases it never completes because for one reason or another the subscriber ID never shows up. The difficulty here is that the onsite code processes cannot reliably determine that content subscription has failed, as it may just be taking a long time to complete. During this period of uncertainty, processes are in limbo; they cannot start or stop because it is not known whether the condition prerequisite for their starting and/or stopping would occur or not.

Moreover, conventional methods for proof of possession for content subscription require the mobile application, e.g., an SMS messaging application, rather than the popup onsite code processes, to submit the OTP for verification. With conventional methods, the popup onsite code processes are out of the loop, specifically the sequence of steps that proves endpoint possession, and the most updated information about content subscription the popup onsite code processes would have is a confirmation of receipt of its call to the server-side service for content subscription. Notably, it would not have information on when the OTP was received at the mobile device or when the OTP was submitted back for verification. Hence, this conventional method imposes a period of uncertainty that can take too long or may not end, e.g., if the user does not actually hit the send button to send the OTP, which can cause processes to hangup, e.g., when they have no timeout protection. In addition, processes that may start or stop when they should not have because they relied on out-of-date cookies.

In contrast and because it is the popup onsite code processes, rather than the SMS messaging application, that sends the OTP to the server-side service for verification, and because the called service for proof of possession returns a response to the call directly to its caller, i.e., the popup onsite code processes, rather than another mobile application, the popup onsite code processes are literally in the loop that proves endpoint possession. Moreover, because the called service for proof of possession responds with either the subscriber ID or with an error code, and not with anything in between, the response enables the popup onsite code processes to dispositively determine whether proof of possession was successful or has failed. Uncertainty and limbo are thereby reduced significantly.

This removal of uncertainty is especially advantageous in a couple of use cases. As indicated, a content provider can have multiple popups. In this case, the content provider can assign a first popup to a homepage and a second, different popup to another web page of the site, e.g., a web page that lists products available for purchase. The second popup offers different content for subscription and/or different rewards. During the described period of uncertainty, for example when subscription to content specified by the first popup is completed server-side, but cookie polling has not been done and so the cookies that are actually present incorrectly indicate that subscription is still in progress, it is possible that the user navigates away from the home page to the product web page, which would result in instantiation of the second different popup, and user confusion would likely ensue. The onsite methods performed as described in this specification avoid this problem because cookies are updated as soon as content subscription is completed server-side, regardless of whether web pages have been refreshed or whether the user has responded to any text messages.

Moreover, the content provider can test alternative popups using A/B testing, which option can be configured and stored in configuration data. The idea behind A/B testing is to assess which of the two popups being tested is more effective, e.g., which one has a better conversion rate. Because of the described uncertainty, there is a chance that a single user is shown both popups being tested, which would defeat the purpose of the test. The onsite methods performed as described in this specification avoid this problem and thereby advantageously improve the reliability of A/B testing.

It may be counterintuitive to have the popup onsite code processes be in the loop to prove endpoint possession, because it is conventional wisdom to spare browsers from tasks that can be performed server-side or by other computing resources, and because industry standards encourage otherwise. However, the benefits mentioned above outweigh corresponding costs.

In implementations where messages from unknown numbers and/or from robo-senders may be filtered out of message inboxes, the system optionally implements outbound-message management to ensure that subscribed content are not filtered and thereby miss the primary inbox of the user's messaging application (and instead end up in spam folders and/or unknown-sender folders). With certain operating systems for mobile phones, iOS 26 for example, a message from an unknown sender can be routed to an unknown-sender folder, which generally reduces the message's visibility to its recipient. Filtering can: (i) prevent the inbound message from being listed in a primary inbox of the messaging application, (ii) preclude notifications that the inbound message was received, and/or (iii) exclude subsequent inbound messages from hitting the known-sender inbox, even if the user replies to the initial inbound message. The primary inbox is where the messaging application displays received messages for user consumption. Not all received messages are displayed here. For example, spam and messages from unknown senders may be filtered out from the primary inbox.

FIG. 14 shows a method for managing outbound messages to avoid filtering of content for which a user has subscribed to receive (or simply subscribed content) by having the user initiate a conversation (an ordered thread of messages between the user and the subscribed-content provider). Generally, this method ensures that the first message, in a thread between the user's phone number and the phone number from which messages are sent to provide subscribed content, is sent from the user's phone number.

Alternatively or additionally, contact cards may be leveraged to reduce the chance that subscribed content is filtered from the primary inbox. As further described below, onsite code can request user acceptance to add, to the messaging application, a contact card that specifies one or more phone numbers from which subscribed content is sent.

Other benefits of the method described here include the availability of additional information that can be actionable. For example, a user's acceptance of a contact card and/or sending an initiating message (both described below) are signals that can be used to gauge intent to engage, including intent to purchase. If there's interest, then the appropriate actions can be taken depending on the interest detected and/or inferred, e.g., invitation to join a shopping network of merchants, invitation to accept help with content selection and other shopping assistance, and/or invitation for technical support help. Help can come in the form of an AI agent having the appropriate expertise.

One notable, optional action is to update the popup with a personalized question to the user, dynamically generated based on interest detected and/or inferred, and providing an input field in the popup to receive the user's answer, which may be free form text or audio, and deep linking to the messaging app and pre-populating a message with the user's answer so that the message is ready for the user to send to the phone number from which messages are sent to provide subscribed content. The onsite code can send the user's answer to the system, including called services, for one or more analyses, including further assessments of intention to engage and intention to purchase. Alternatively, no input field is provided in the popup and the user can type the answer to the question directly into the messaging application. Here, the deep link does not prepopulate a message, but rather simply specifies the address of the message (i.e., the phone number from which messages are sent to provide subscribed content) and leaves it to the user to input whatever answer they want.

Note that options and alternatives described above in reference to FIG. 3 can apply as well for the method described here, where applicable.

The browser running on the user device executing and/or interpreting computer instructions of an HTML document displays (step 1402) a web page of the content provider.

In response to detecting one or more predetermined events, for example, the user navigating to the web page of the content provider, a mouse over content of interest, and/or a user action to put a product into a shopping cart, the processes of the parent web page performed by the browser launch one or more onsite processes to instantiate and render a popup for display (step 1404) that includes a call to action, for example, to subscribe to content. Optionally, references to and descriptions of rewards can also be rendered. The popup includes an input field to receive user input specifying an endpoint at which subscribed content is to be received, e.g., an email address or a phone number.

Optionally, there can be multiple input fields, displayed simultaneously and/or one at a time. There can be an input field for an email address and one for a phone number, where any combination of the email address and phone number can receive the subscribed content. There can be, for example, a first input field to receive an email address. Subsequent to receiving the email address, a second input field can be rendered in the popup. The second input field is configured to receive a phone number. Notably, the second input field can be pre-filled with a phone number associated with the email address, to reduce conversion friction, with some of the digits of the phone number obfuscated, to preserve privacy. If the phone number shown is correct, i.e., it is indeed the number intended to receive subscribed content, then the user can simply hit return or click on an icon to indicate an intent to subscribe to content (e.g., a submit button). Otherwise, the user can input the correct phone number, and one or more records in the system would be updated with the correct phone number once proof of possession has been successfully completed.

Note that the phone number can be retrieved based on the email address, e.g., by looking up the address and retrieving the most recently associated phone number. The lookup can be performed server-side, and the phone number retrieved by lookup can be sent to popup onsite code executing on the mobile client.

Sources of information from which lookup can be performed include, e.g., content subscription records, including those for other content, as well as customer records (which can include purchase and engagement logs). The former and latter are not necessarily the same because there may be customers who have not subscribed to content, but have otherwise provided a phone number and email, e.g., for a purchase. Moreover, the sources can be for multiple, different content creators and/or merchants. When sources are remote, lookups can be effected via API calls made by the popup onsite code processes and/or the server.

Webpixel data can also be leveraged, which can be used to find the phone number if the user is logged in a participating merchant. Also optional, the server can deanonymize browser cookies, with appropriate notice and consent, and the information acquired from deanonymization can be used to lookup the phone number from participating merchants and/or vendors who provide their marketing or ecommerce infrastructure.

Responsive to receiving the user's endpoint(s), the popup onsite code processes initiate content subscription (step 1406). Content subscription includes: (i) optionally updating the popup, which now optionally can include an input field to receive an OTP, e.g., from the user, and (ii) calling an endpoint of the server that provides content subscription service. The call to the endpoint service for content subscription can include the user's endpoint. Content subscription is conditioned on proof of endpoint possession.

Responsive to receiving the call from the popup onsite code processes, the called endpoint service for content subscription that runs server-side: (i) optionally generates a temporary record of the user endpoint in its lists of endpoints subscribed to the content provider, which status is pending, and which can include session information that proves consent, (ii) generates an OTP that is stored and linked to the user endpoint and optionally the content provider ID, and (iii) sends the OTP to the user endpoint (step 1408).

When the endpoint is a mobile number that can receive SMS messages and content being subscribed to is sent via SMS messages, the source phone number from which the OTP is sent to the endpoint is optionally a particular phone number consistently used to send and receive text messages, which consistent use mitigates problems caused by false-positive spam filtering. Sending text messages to the user from different phone numbers results, for example, in a greater chance that a SMS messaging application on the mobile device would erroneously filter the OTP message or other messages needed to complete proof of consent and/or possession as spam, which would prevent completion of complete content subscription and/or reward implementation.

Moreover, the phone number for sending the OTP (source number for OTP) can be a different one from the phone number for sending subscribed content to the user's endpoint or endpoints (source number for content). The former can be, for example, a phone number used by the service for proving endpoint possession, which can be managed by a third party to the content creator or merchant. The latter can be, for example, a phone number used by the content creator or merchant to send the subscribed content, such as marketing messages, notifications, surveys, etc., to subscribers. This use of different source numbers preserves the possibility of having the user initiate a thread between the user's phone number and the source number for content, which in turn preserves the system's outbound message management processes' ability to realize such possibility. Sending a first message from the user's phone number to the source number for content, for example, is one deterministic way for the user to initiate the thread, thereby enabling subsequent messages of the thread, those having subscribed content, to end up in the known-sender inbox.

On receipt of the OTP at the client-side application associated with the user endpoint, e.g., a SMS messaging application, the popup onsite code process-leveraging functionalities of the browser and its underlying operating system-extracts the received OTP from the messaging application and autofills the OTP input field, optionally without user action (step 1410). When user input is preferred, submission can be completed with a simple user click on the OTP displayed in a suggestion bar on top of a virtual keyboard. Here, there is no need for the user to navigate away from the browser to the mobile application to retrieve the OTP.

Alternatively, no OTP input field is displayed, and the popup onsite code process obtains the received OTP by leveraging the autofill functionality as described above, except that the popup does not display an OTP input field that needs to be filled.

Once it has the OTP, extracted programmatically or manually provided, the popup onsite code processes call a server-side endpoint service for proof of possession (step 1412*a*). The call includes the user's endpoint and the OTP code that was extracted from the client-side application associated with the user's endpoint. The call can be responsive to user input, which can be, e.g., hitting return or clicking on a submit button or other icon.

User input to initiate the call can also deep link to the client-side application associated with the user endpoint (the SMS messaging application) and prepares the application to send a pre-populated message (an initiating message, further described below) from the user's phone number to the source number for content (step 1412*b*).

Note that although deep linking can be initiated here, e.g., link generation and linking to the messaging application, the condition precedent for deep linking can be successful proof of possession and/or successful content subscription, in which case deep linking does not initiate until successful proof of possession and/or subscription. Regardless, deep linking here is neither required for proof of possession nor content subscription, but rather is implemented simply for message synchronization to mitigate the problem of subscribed content being filtered from the primary inbox of the messaging application.

Moreover, if the pre-populated message is dynamically generated rather than pre-determined, deep linking may need to wait for the called service to return dynamically generated content to include in the message. Such content can be personalized to the user, the user's segment, as well as preferences of the content creator. Notably, proof of possession may provide information about the user not otherwise available (e.g., content previously subscribed and/or merchandise previously purchased), and this information can be key to appropriate personalization of the dynamic content. As alluded to above, personalized content can include a question posed to the user via the popup to solicit answers to further help assess the user's intent, for example, intent to engage and/or the nature of the engagement of interest. Examples include: would you like technical support, would you like help with shopping, would you like to join a shopping network, and would you like to join a content subscription network. Optionally, a session with an AI agent with the appropriate expertise can be instantiated to generate these questions and engage in conversation in real time.

One way to implement the deep link is by leveraging universal resource identifiers (URIs), which can be generated server-side and/or client-side, e.g., by executing the popup onsite code in the latter case. Examples of URIs include URLs and URNs. Generally, an inspection of the client environment (e.g., user device type and operating system) is required to generate URI links that are not broken and functional (e.g., those that have compliant link formats), and so it may be advantageous to generate the link client-side rather than server side and, furthermore, generate the link dynamically in response to user opting in rather than pre-generating selectable links, i.e., links for different operating systems. Optionally, a QR code can be used to enable deep linking into a messaging application and pre-populating a message ready to be sent (so the user does not have to type in a message). Note that the QR code may need to be rendered asynchronously, in which case it may need to be wrapped in a Web component, especially if the rest of the popup onsite code executes to render synchronously. Both URI links and QR codes can be used. For example, the system can use URI links for mobile clients and QR codes for desktop clients. With the latter, the user can use a mobile phone to scan the QR code displayed on a desktop device to deep link to the phone's message application, which is especially useful if the desktop does not have a messaging application.

Responsive to the call, the called service looks up the OTP by user endpoint (step 1414), which was stored server-side in step 1408. If the generated code does not match the submitted code, the service returns an error code to the calling popup onsite code processes, which then can select other options to prove possession.

Otherwise, the called service subscribes the user's endpoint (step 1416*a*), which can be done by (i) adding to a queue a record that references the content subscription opt-in and, furthermore, a compliance message for sending (as described below in reference to FIG. 15) and/or (ii) updating any temporary record that may have been created above with a subscriber ID, which changes its status from pending to completed. The called service also notifies the calling popup onsite code processes that the user's endpoint has been subscribed (step 1416*b*), which can include returning the subscriber ID and dynamically generated content for the initiating message, to be sent from the user's phone number to the source endpoint for content. Additionally, the called service initiates one or more outbound-message management processes (step 1416*c*), which can be dependencies of the called service and/or execute as part of the called service.

The one or more outbound-message management processes synchronize the sending and receipt of two key messages, between the user's phone number and the source phone number for content, to ensure that one is sent from the user's endpoint before the other is received at the user's endpoint. Specifically, there is a message that is required by industry practice and/or law that must be sent to the user's endpoint from the source phone number for content (i.e., the compliance message mentioned above in reference to step 1412*b*). There's also a message that is sent from the user's phone number to the source phone number for content (i.e., the initiating message of steps 1412*b* and 1416*b*). The outbound-message management processes ensure that the initiating message is sent from the user's phone number to the source number for content before the compliance message is received at the user's phone number (sent from the source number for content). In this case, it is the user's phone number that initiates the thread of messages between the user's phone number and the source phone number for content, which ensures that subsequent messages from the source phone number for content are routed to the primary inbox of the user's messaging application rather than to an unknown-sender or spam folder.

One way to synchronize the two messages as described above is to use a queue (e.g., an engaged subscriber queue) with visibility timeout functionality to delay, for a set duration, sending the compliance message. The set duration is based on industry practices and/or legal requirements and generally balances these requirements with system latency, the reduction of which in turn enhances the conversion rate of content subscription by reducing the time period that a user has to wait to receive the compliance message. Examples of suitable set duration include 20 seconds, 40, second, and 60 seconds. Notably, the set duration for mobile and desktop can be different.

To implement synchronization, a record is created in the queue when proof of possession has been successful and the user's phone number is subscribed, as mentioned above in reference to step 1416*a*. Creation of the record here indicates that subscription has been effected. The record created here can be different than the one created in step 1408, although they can be linked. The record here references the user's phone number and the compliance message to be sent to the user's phone number. If an initiating message sent from the user's phone number is received server-side (via the source number for content, directly or indirectly) before the set duration expires, then the outbound-message management processes can optionally pull the record from the queue early and send the compliance message. Otherwise, the compliance message is sent at the expiration of the set duration.

Optionally, the initiating message includes one or more references (e.g., a unique ID or UID) to either or both of the records created above. The reference can be included as part of pre-populated content for the message. The UID can be generated based on a combination of the phone number and information that is unique to the above instance of the popup (the one by which the user has opted to subscribe to the proffered content) to distinguish from other instances of the popup (ones where other users opted to subscribe or ones where the user has opted to subscribe to other content of interest). In the rare occasions when the UID is deleted from the initiating message, the service (or one of its dependencies) can heuristically determine that the initiating message was responsive to content subscription via the popup. Signals for the heuristic determination includes, for example, the phone numbers associated with the message (one from which it was sent and one at which it was received), subscriptions that occurred within a time period of receipt of the initiating message and/or within a geofence associated with the initiating message, the semantic meaning of message content, and so forth. This heuristic determination can be especially advantageous when the initiating message is received after the compliance message was sent, in which case message synchronization has failed and message carrying subscribed content will likely be filtered. Here, the service can notify the user via email to check for subscribed content in a spam folder of the message application.

In one implementation, the onsite code appends a tag to the initiating message, e.g., (src: OOIE) when generating the deep link, which tag identifies the message as being one sent in response to content subscription, and which tag can be detected server side when the initiating message is received there. Advantageously, the initiating message will not be mistakenly processed server side as a request for support or for engagement with an AI agent for shopping. Unwanted responses to the initiating message are thereby avoided, even if the initiating message is sent after the set duration of the queue has elapsed (and the subscribed record is removed from the queue). Moreover, the tag can provide information additional to the message content helpful for analytics, for example, to understand who sent it, when it was sent, and why it was sent.

Figure 15:
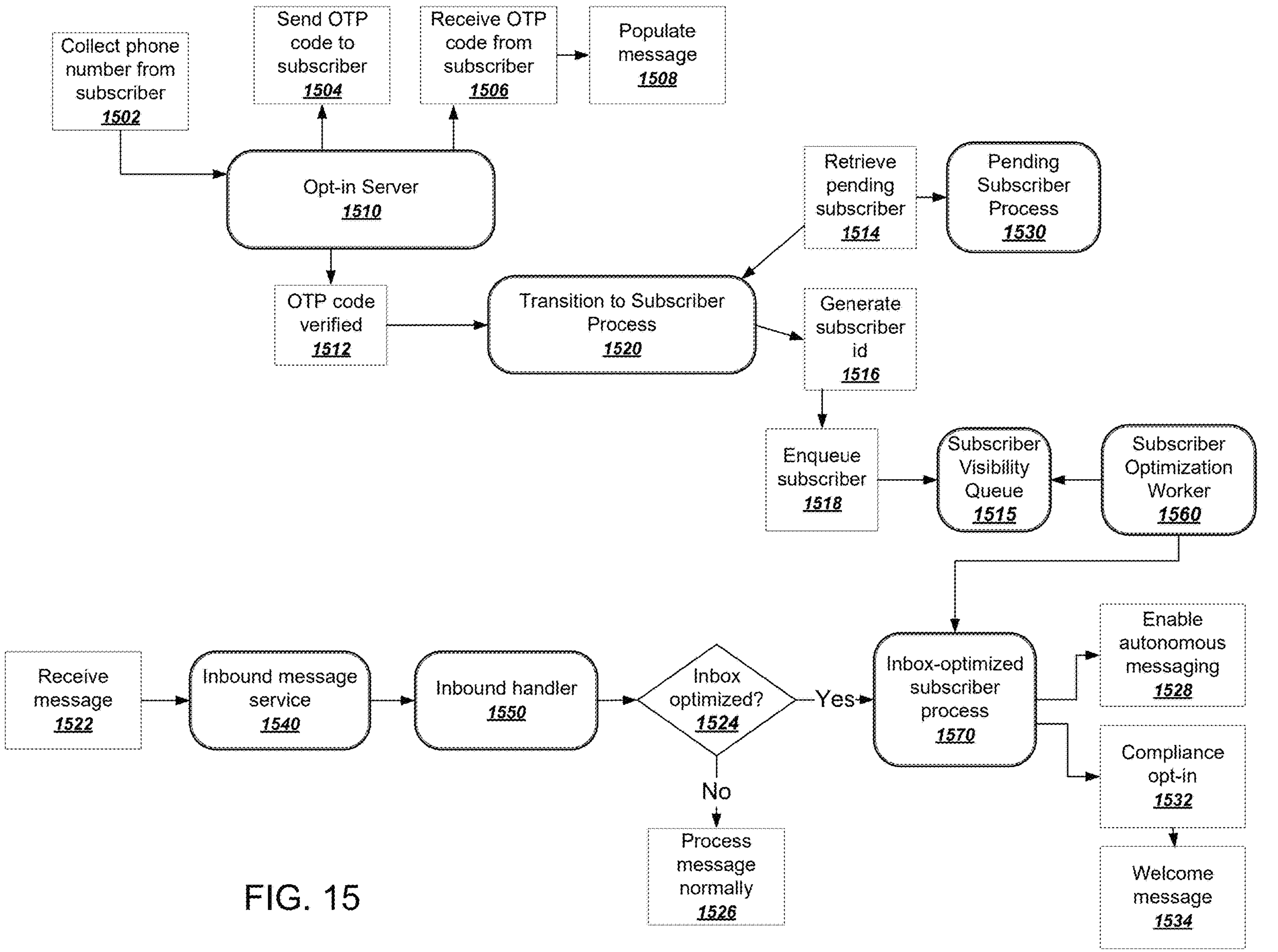
FIG. 15 shows an example implementation of message synchronization.

FIG. 15 is an example sequence-flow diagram for the above synchronization mechanism. The actions of FIG. 15 are illustrated as being performed by a number of functional components, which can be separate devices or processes executing on one or more devices. The functional components include an Opt-in Server 1510, a Transition to Subscriber Process 1520, a Pending Subscriber Process 1530, an Inbound message service 1540, an Inbound Handler 1550, and a Process Subscriber as Inbox Optimized process 1560.

At step 1502, the Opt-in server 1510 collects a phone number from a subscriber. For example, a subscriber can enter the phone number in a pop up, and pop up code can send the phone number to the opt in server 1510.

At step 1504, the Opt in server 1510 generates and sends an OTP code to the subscriber.

At step 1506, the Opt in server 1510 receives an OTP code from the subscriber. The Opt-in Server 1510 will then verify whether or not the OTP code received from the subscriber matches the OTP code sent to the subscriber.

At step 1508, if the OTP code is verified, the Opt-in Server 1510 responds to the client with a success message, and the client prepopulates a message for the subscriber to send, e.g., by navigating to an SMS app of a phone of the subscriber. In some implementations, the prepopulated message includes a code that represents a request to engage in optimization.

At step 1512, the Opt-in Server 1510 also sends an OTP code verified notification 1512 to the Transition to Subscriber Process 1520. The Transition to Subscriber Process 1520 will then initiate the process of inbox optimization for the subscriber.

At step 1514, the Transition to Subscriber Process 1520 retrieves from a Pending Subscriber Process 1530 information indicating whether the subscriber is already a pending subscriber. If so, there is no need to reinitiate the inbox optimization process. In some implementations, the Opt-in server 1510, the Transition to Subscriber Process 1520, and the Pending Subscriber Process 1530 are both part of the same monolithic server system that maintains a table and model for pending subscribers, APIs for opt-in that create pending subscribers, and OTP codes, validate codes, and transition subscribers.

If not, at step 1516, the Transition to Subscriber Process 1520 generates a subscriber id.

At step 1518, the Transition to Subscriber Process 1520 enqueues the subscriber in a subscriber visibility queue 1515. Each pending subscriber will remain in the queue for a predetermined period of time, e.g., 10, 20, 30, or 60 seconds, before compliance and welcome messages are sent. In some implementations, each subscriber is enqueued with a welcome message.

In the meantime, the new subscriber can send the prepopulated message that was generated at step 1508.

At step 1522, an Inbound message service 1540 can receive the prepopulated message from the subscriber and provide the message to an Inbound Handler (1550).

The Inbound handler 1550 can then determine whether to process the subscriber as an inbox optimized subscriber (step 1524). This can depend on the received message received message having a code matching the code of the prepopulated message generated in step 1508 as well as whether or not the subscriber is will in the subscriber visibility queue 1515. To do so, the Inbound handler 1550 can communicate with a Subscriber Optimization Worker 1560 to check the status of the Subscriber visibility queue 1515.

If the subscriber should not be processed as inbox optimized, the system can process the message normally (branch to 1526).

Otherwise, control turns to an inbox-optimized subscriber process 1570. This process will carry out various actions to set up the new inbox-optimized subscriber, including enabling autonomous messaging (step 1528), generating and sending a compliance message (step 1532), and generating and sending a welcome message with a discount offer (step 1534

The steps of FIG. 15 can be carried out in example implementations by the following components.

- MP—Message Platform, a technical infrastructure responsible for sending messages to subscribers (and executing the outbound-message management processes).
- S&A—Subscribers & Acquisition, a technical infrastructure responsible for allowing customers to subscribe to an SMS campaign (includes computing resources to performed task performed by the called service, as described in this specification).
- FB—Flow Builder, a technical infrastructure responsible for creating and managing content for subscription (e.g., marketing campaigns of merchants).
- SQS—Simple Queue Service, a product for using a queue in cloud infrastructure.
- OOIE, Onsite Opt-in Engage, the name of this component that can perform the method described in reference to FIG. 14.

Note that there are numerous alternative mechanisms suitable to implement the above-described synchronization, e.g., ETL (extract, transform, load) processes, computing framework that can handle workflows with delays and durable states such as Temporal and its analogs, and/or creating delayed service in Kafka.

Upon receipt of notification that the user's phone number has been subscribed, which can include the subscriber ID, the popup onsite code processes: (i) replace the placeholder cookie, if there is one, with one that includes the subscriber ID, thereby updating subscription status; (ii) provide any code needed to redeem the reward to the user, when there is a reward; and (iii) update information displayed in the popup to indicate successful subscription to the particular content specified in step 1404 and optionally to also indicate successful application of the optional reward specified in step 1404 (step 1418).

If the initiating message is received server-side prior to the expiration of a threshold time period (e.g., the set duration of delay), then the outbound-message management processes send the compliance message early (Yes branch of decision step 1420). Here, synchronization is successful.

If the initiating message is received server-side after the expiration of a threshold time period, the compliance message is still sent (No branch of decision step 1420). However, the outbound-message management processes flags for the system that synchronization have failed, and subscribed messages may be filtered from the inbox of the user's messaging application.

To mitigate synchronization failure, a time-sensitive notification can be sent to the user's phone number, which may be routed to a transitional inbox, but would regardless cause notification to be sent to the user. Here, the notification can flag to the user that subscribed content may have been filtered. Also optional, is prompting the user to add the source phone number for content to the user's contact list (via a contact card, for example), which action can be encouraged with rewards additional to those given for content subscription. Here, the contact card is a downloadable attachment that a content creator or merchant can add to the popup via the popup editor when configuring the popup. When a popup is instantiated and content subscription is successful, the popup can display an icon that links to the downloadable contact card, and user selection of the icon causes the user device's operating system to add the contact card to the messaging application's contact list, and messages received from the endpoint specified in the contact card then becomes message from a known sender and will not be filtered.

Note that the initiating message can be pre-determined or dynamically generated based on available signals, which for example can include signals available from a current browsing session (including browsing history and HTML parameters), engagement history of the user or the user's segment, profiles and preferences of the user or the user's segment, preferences of the content creator, etc. Optionally the initiating message can be one that has been A/B tested as described in commonly assigned patent application Ser. No. 19/193,928, entitled "Proxy Training Data for Cold-Start Continuing Text Optimization," filed on Apr. 29, 2025, which is herein incorporated by reference.

Moreover, responsive to receipt of the initiating message, the system can respond with continuing texts generated as described in commonly assigned U.S. Pat. No. 12,379,903, or commonly assigned patent application Ser. No. 19/321,150, entitled "Prompt Tuning of Policy Models by Context Objects," filed on Sep. 5, 2025, which is herein incorporated by reference.

Figures 1, 16A:
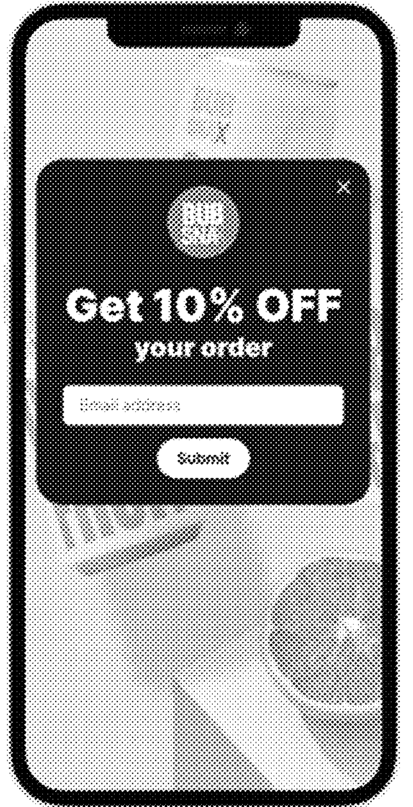
FIGS. 16A, 16B, 16C, and 16D show example user interfaces of the method of FIG. 14.
Figures 2, 16A:
Figures 3, 16A:
Figures 4, 16A:
Figures 7A, 16A:
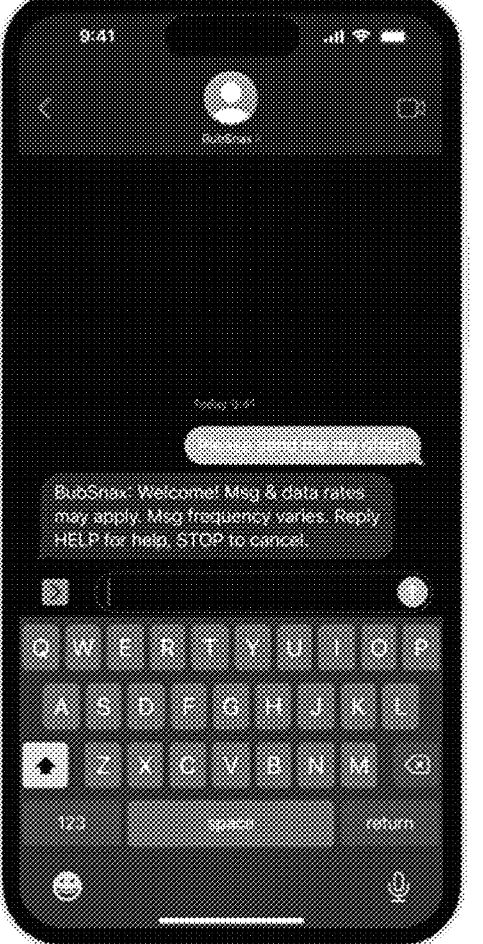
Figures 7B, 16A:
Figures 7C, 16A:
Figures 1, 16B:
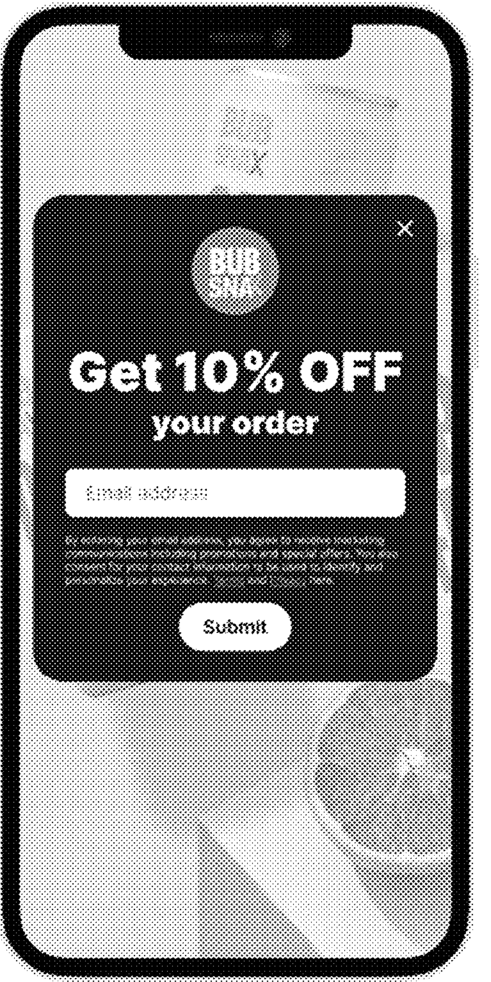
Figures 2, 16B:
Figures 3, 16B:
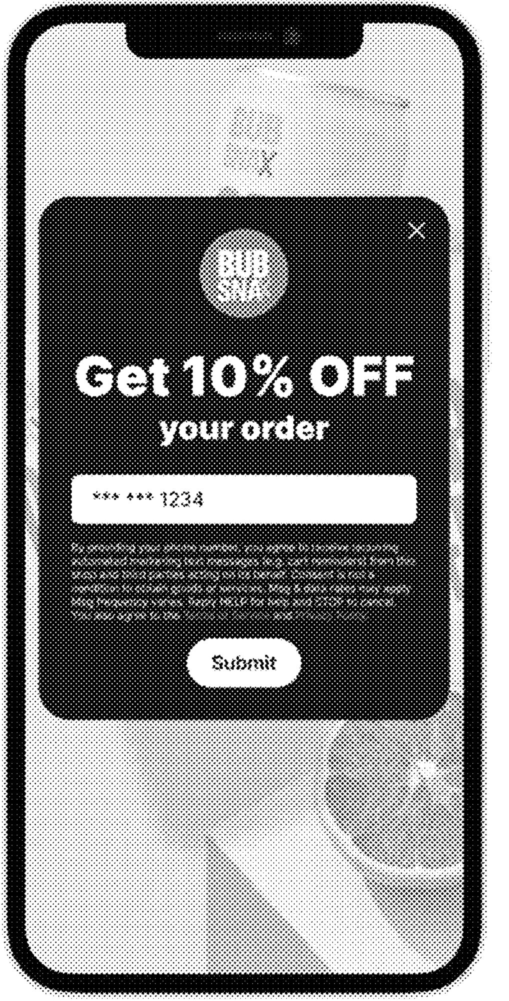
Figures 5, 16B:
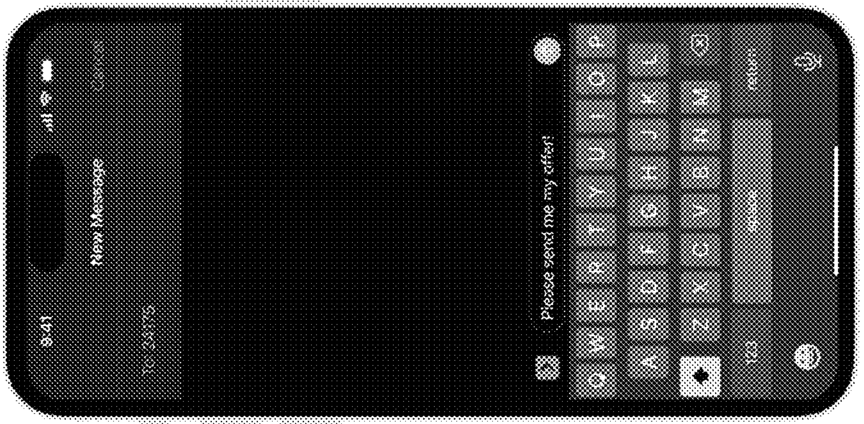
Figures 6A, 16B:
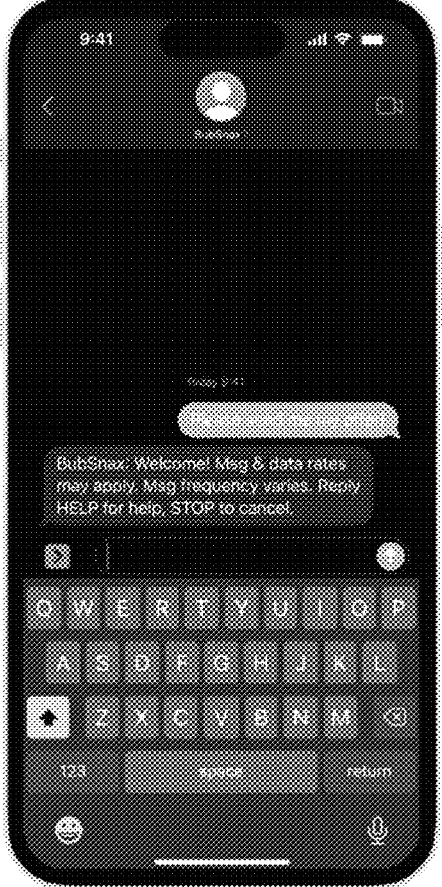
Figures 6B, 16B:
Figures 1, 16C:
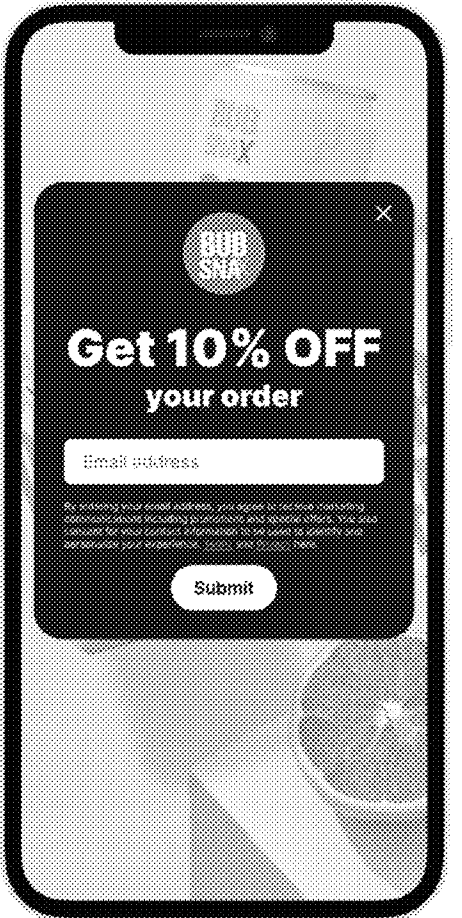
Figures 2, 16C:
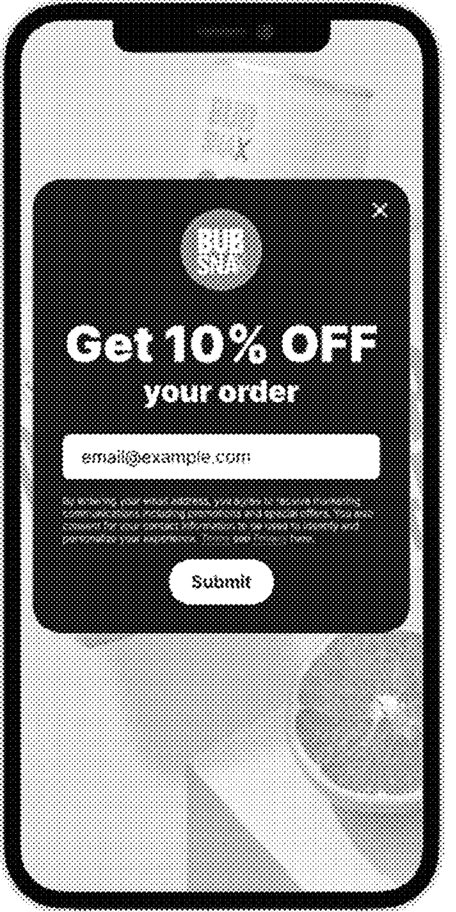
Figures 3, 16C:
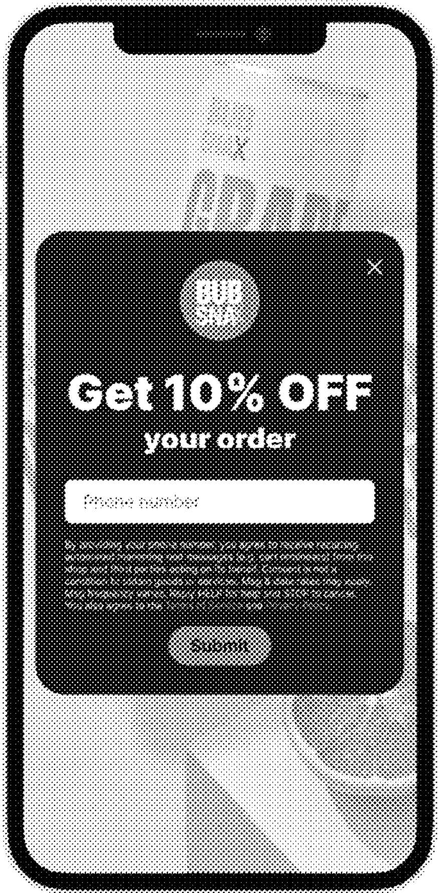
Figures 4, 16C:
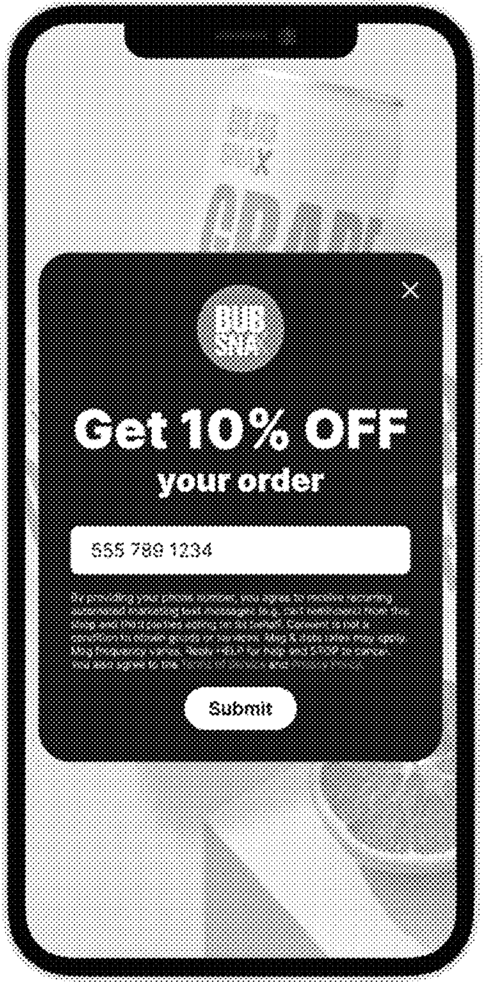
Figures 6B, 16C:
Figures 1, 16D:
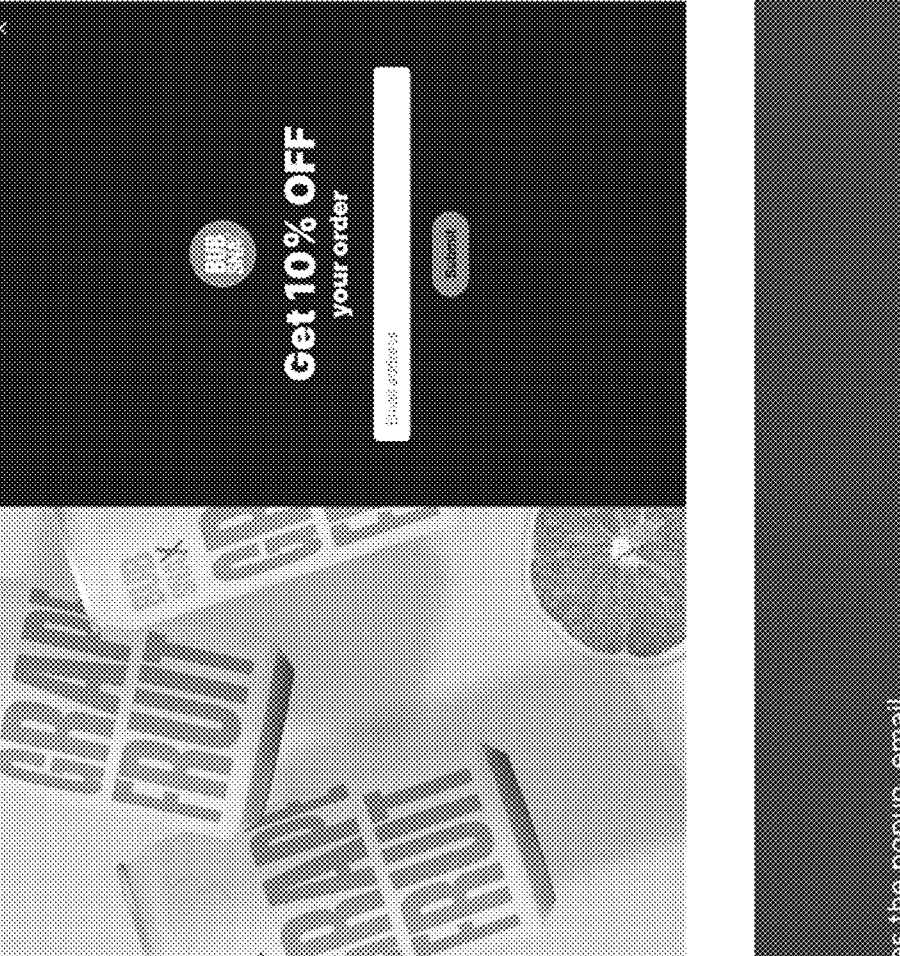
Figures 2, 16D:
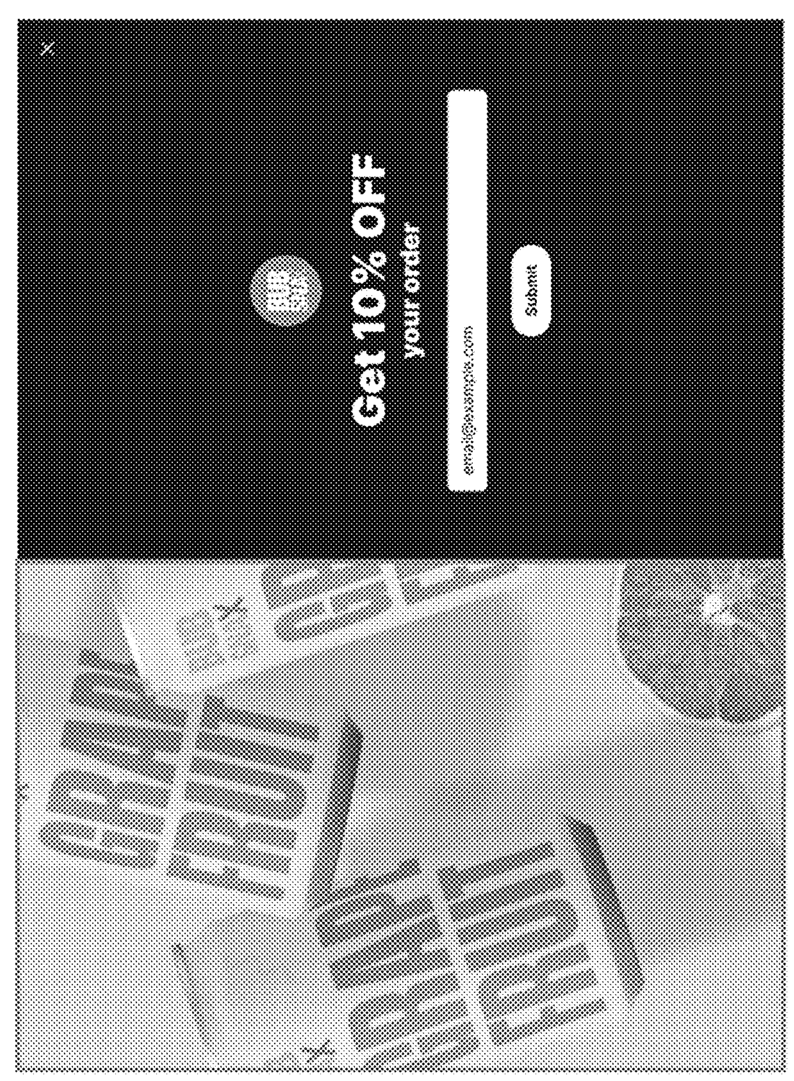
Figures 3, 16D:
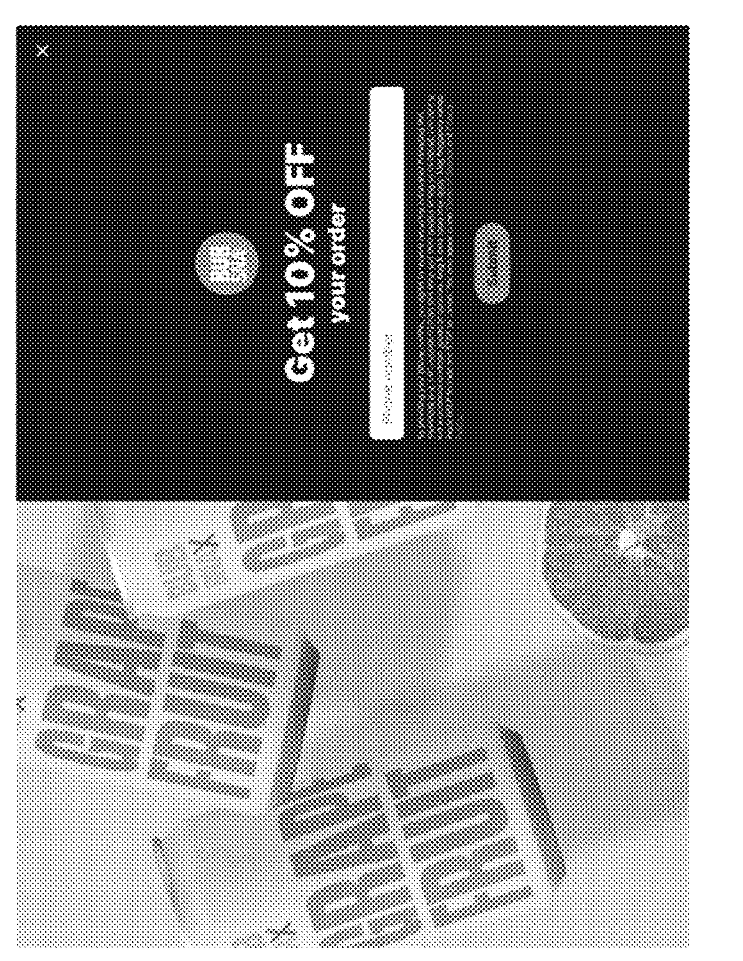
Figures 4, 16D:
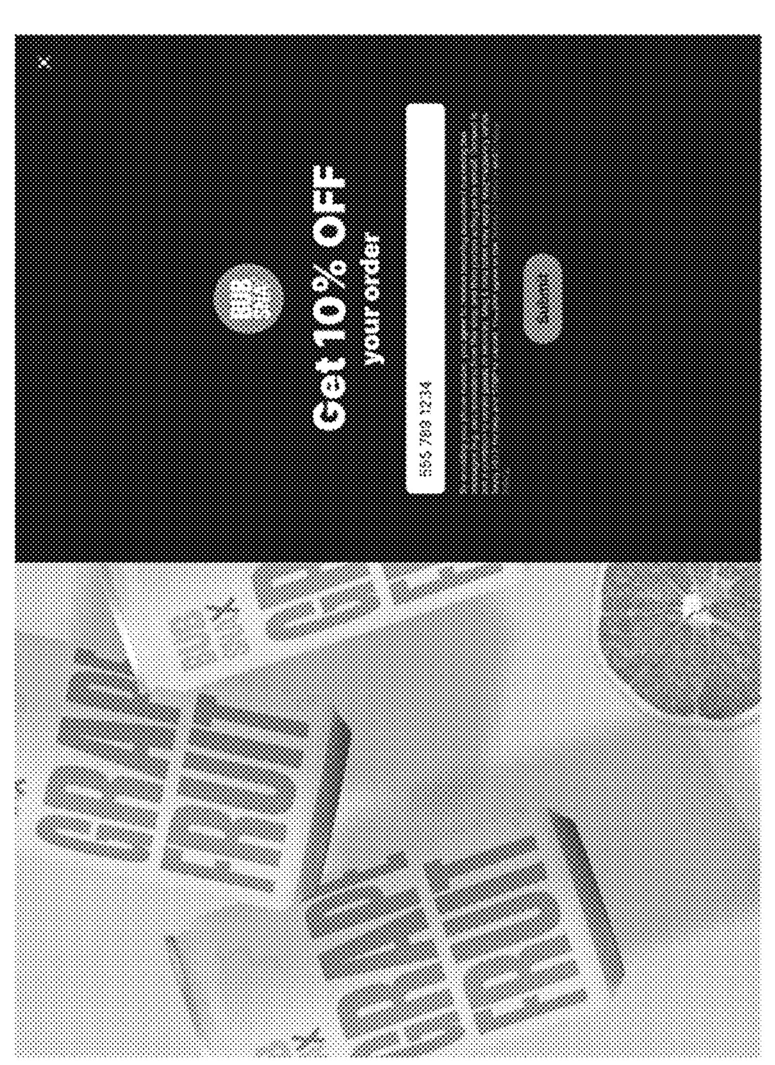
Figures 6, 16D:
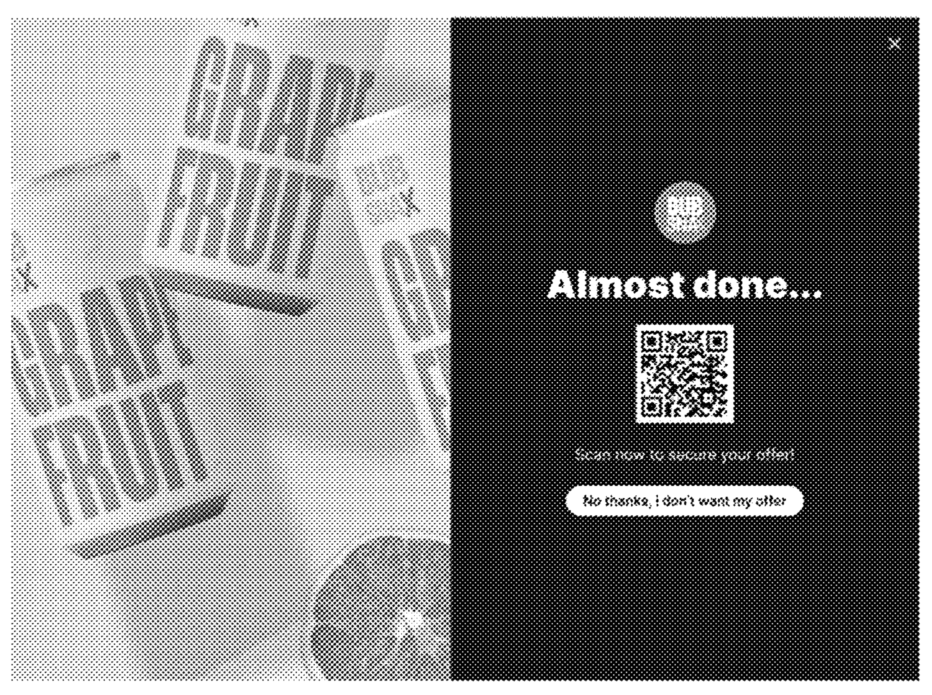
Figures 7, 16D:
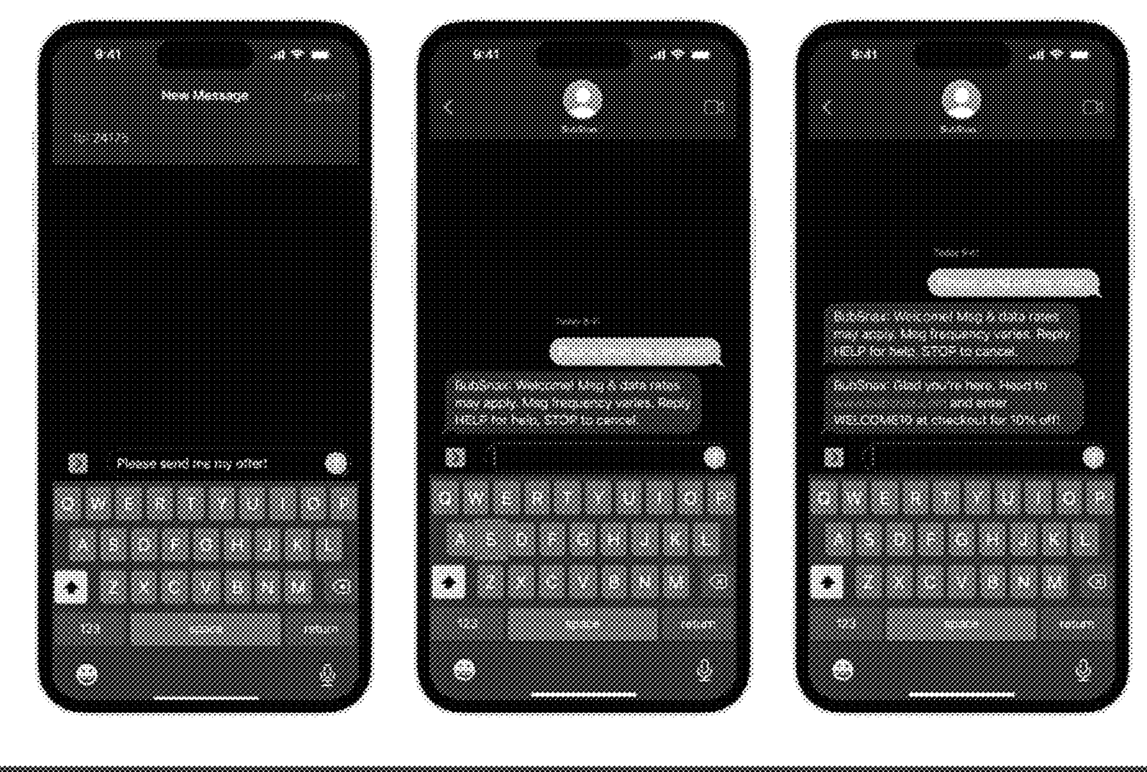

FIGS. 16A, 16B, 16C, and 16D depict example GUIs of steps of the method described in reference to FIG. 14. FIGS. 16A-C show GUIs of mobile clients, and FIG. 16D shows GUIs for a desktop client, implementing the QR code option.***

The subject matter and the actions and operations described in this specification can be implemented in digital electronic circuitry, in tangibly-embodied computer software or firmware, in computer hardware, including the structures disclosed in this specification and their structural equivalents, or in combinations of one or more of them. The subject matter and the actions and operations described in this specification can be implemented as or in one or more computer programs, e.g., one or more modules of computer program instructions, encoded on a computer program carrier, for execution by, or to control the operation of, data processing apparatus. The carrier can be a tangible non-transitory computer storage medium. Alternatively or in addition, the carrier can be an artificially-generated propagated signal, e.g., a machine-generated electrical, optical, or electromagnetic signal, that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program can be written in any form of programming language, including compiled or interpreted languages, or declarative or procedural languages; and it can be deployed in any form, including as a stand-alone program, e.g., as an app, or as a software module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or microcontrollers or a combination of them, or any other kind of central processing unit. Generally, a central processing unit will receive instructions and data from a read-only memory or a random access memory or both. The essential elements of a computer are a central processing unit for executing instructions and one or more memory devices for storing instructions and data. The central processing unit and the memory can be supplemented by, or incorporated in, special-purpose logic circuitry.

Generally, a computer will also include, or be operatively coupled to, one or more mass storage devices, and be configured to receive data from or transfer data to the mass storage devices. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, the subject matter described in this specification can be implemented on one or more computers having, or configured to communicate with, a display device, e.g., a LCD (liquid crystal display) monitor, or a virtual-reality (VR) or augmented-reality (AR) display, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback and responses provided to the user can be any form of sensory feedback, e.g., visual, auditory, speech, or tactile feedback or responses; and input from the user can be received in any form, including acoustic, speech, tactile, or eye tracking input, including touch motion or gestures, or kinetic motion or gestures or orientation motion or gestures. In addition, a computer can interact with a user by sending documents to and receiving documents from a device that is used by the user; for example, by sending web pages to a web browser on a user's device in response to requests received from the web browser, or by interacting with an app running on a user device, e.g., on a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform the operations or actions. That one or more computer programs is configured to perform particular operations or actions means that the one or more programs include instructions that, when executed by data processing apparatus, cause the apparatus to perform the operations or actions. That special-purpose logic circuitry is configured to perform particular operations or actions means that the circuitry has electronic logic that performs the operations or actions.

The subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

While this specification contains many specific implementation details, these should not be construed as limitations on the scope of what is being claimed, which is defined by the claims themselves, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this by itself should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for content subscription, the system comprising a user device and a server, user device being configured to communicate with the server, the server being implemented on one or more computers, wherein:

the user device has a first network endpoint and is configured with a web browser, wherein the web browser is configured with popup instructions operable to cause the web browser to perform popup operations comprising:

generating a popup from a parent web page, the popup including (i) a call to action to subscribe to content at the first network endpoint and (ii) an end-point input field, wherein the content has an identifier (content ID) and includes SMS messages;

in response to user input indicating acceptance of the call to action, calling a service on the server for content subscription and proof of endpoint possession, wherein one indication of acceptance is receipt of user input specifying the first network endpoint, and wherein the call to the service specifies the first network endpoint;

obtaining a one-time passcode received at the first network endpoint on the user device and sending the passcode to the service;

in response to receiving from the service an indication of successful proof of endpoint possession, deep linking to a messaging application and pre-populating a message addressed to a second network endpoint from which subscribed content is sent; and sending one or more HTML parameters extracted from the parent web page to the service, wherein the one or more HTML parameters indicate a traffic source of the parent web page; and the server is configured to implement the service and perform service operations comprising:

in response to the call from the web browser for content subscription and proof of possession, generating a one-time passcode and sending the passcode to the first network endpoint from a third network endpoint that is different from the second network endpoint;

in response to receiving a one-time passcode from the web browser, comparing the received one-time passcode with the generated one-time passcode and, if they match, creating and storing a subscription record that includes the first network endpoint and returning to the browser an indication that proof of possession has been completed; and appending the record with the one or more HTML parameters.

2. The system of claim 1, wherein the service operations further comprise:

queuing and sending a compliance message, from the second network endpoint to the first network endpoint, wherein queuing and sending are synchronized to be responsive to server-side receipt of the pre-populated message, but no later than a duration of time, whereby the second network endpoint is not filtered as being from an unknown sender by the messaging application.

3. The system of claim 1, wherein the user device has a fourth network endpoint that is different from and is associated with the first network endpoint, wherein the user input specifying the first network endpoint is a user selection of a submit icon displayed in the popup when the first network endpoint is displayed in the input field, and wherein:

popup instructions operable to cause the web browser to perform popup operations further comprising:

receiving user-input specifying the fourth network endpoint, sending the fourth network endpoint to the service, receiving from the service the first network endpoint, and displaying the first network endpoint in the input field; and the service operations further comprising:

in response to receiving the fourth network endpoint, using the fourth network endpoint to look up the first network endpoint and sending the first network endpoint to the web browser.

4. The system of claim 1, wherein service operations further comprises:

using the fourth network endpoint to look up the first network endpoint in any combination of: records of content subscription, records of content engagement, and records of purchase.

5. The system of claim 4, wherein the records are for different merchants.

6. The system of claim 4, wherein the records are for different content creators.

7. The system of claim 1, wherein:

the popup operations further comprises obtaining state information, HTML parameters, or client-environment information that are needed for the deep linking and using the obtained state information, HTML parameters, or client-environment information for the deep linking.

8. The system of claim 1, wherein the deep linking is performed via a deep link that is any combination of: a URI, URN, URL, and a QR code.

9. The system of claim 8, wherein the deep link is generated server-side.

10. The system of claim 8, wherein the deep link is generated client-side.

11. The system of claim 1, wherein the pre-populated message references a reward for sending the pre-populated message, and wherein the service operations further comprises, responsive to receiving an indication that the pre-populated message has been received at the second network endpoint, enabling the reward to be redeemed.

12. The system of claim 1, wherein the content ID is one of one or more references to the content subscribed, wherein content subscribed is associated with the popup, and wherein:

the popup operations further comprise receiving the one or more references and including the one or more references in the pre-populated message; and the service operations further comprise, responsive to receiving the pre-populated message, extracting the one or more references and using them to look up the subscription record to determine that the pre-populated message is associated with the popup.

13. The system of claim 1, wherein logic to generate the popup is generated server-side to reduce the number of system calls needed for instantiating the popup.

14. A computer-program product stored on tangible media, the product comprising:

popup instructions interpretable to cause a web browser running on a user device to perform popup operations, wherein the user device has a first network endpoint, the popup operations comprising:

generating a popup from a parent web page, the popup including (i) a call to action to subscribe to content at the first network endpoint and (ii) an end-point input field, wherein the content has an identifier (content ID) and includes SMS messages;

in response user input indicating acceptance of the call to action, calling a service on the server for content subscription and proof of endpoint possession, wherein one indication of acceptance is receipt of user input specifying the first network endpoint, and wherein the call to the service specifies the first network endpoint;

obtaining a one-time passcode received at the first network endpoint on the user device and sending the passcode to the service;

in response to receiving from the service an indication of successful proof of endpoint possession, deep linking to a messaging application and pre-populating a message addressed to a second network endpoint from which subscribed content is sent; and sending one or more HTML parameters extracted from the parent web page to the service, wherein the one or more HTML parameters indicate a traffic source of the parent web page; and instructions executable server side to perform service operations for content subscription and proof of possession, the service operations comprising: in response to the call from the web browser for content subscription and proof of possession, generating a one-time passcode and sending the passcode to the first network endpoint from a third network endpoint that is different from the second network endpoint;

in response to receiving a one-time passcode from the web browser, comparing the received one-time passcode with the generated one-time passcode and, if they match, creating and storing a subscription record that includes the first network endpoint and returning to the browser an indication that proof of possession has been completed; and appending the record with the one or more HTML parameters.

15. The computer-program product of claim 14, wherein the service operations further comprise:

queuing and sending a compliance message, from the second network endpoint to the first network endpoint, wherein queuing and sending are synchronized to be responsive to server-side receipt of the pre-populated message, but no later than a duration of time, whereby the second network endpoint is not filtered as being from an unknown sender by the messaging application.

16. The computer-program product of claim 14, wherein the user device has a fourth network endpoint that is different from and is associated with the first network endpoint, wherein the user input specifying the first network endpoint is a user selection of a submit icon displayed in the popup when the first network endpoint is displayed in the input field, and wherein:

popup instructions operable to cause the web browser to perform popup operations further comprising:

receiving user-input specifying the fourth network endpoint, sending the fourth network endpoint to the server, receiving from the server the first network endpoint, and displaying the first network endpoint in the input field; and the service operations further comprising:

in response to receiving the fourth network endpoint, looking up the first network endpoint with the fourth network endpoint and sending the first network endpoint to the web browser.

17. The computer-program product of claim 14, wherein service operations further comprises:

using the fourth network endpoint to look up the first network endpoint in any combination of: records of content subscription, records of content engagement, and records of purchase.

18. The computer-program product of claim 17, wherein the records are for different merchants.

19. The computer-program product of claim 17, wherein the records are for different content creators.

20. The computer-program product of claim 14, wherein:

the popup operations further comprises obtaining state information, HTML parameters, or client-environment information that are needed for the deep linking and using the obtained state information, HTML parameters, or client-environment information for the deep linking.

21. The computer-program product of claim 14, wherein the deep linking is performed via a deep link that is one of: a URI, URN, URL, and a QR code.

22. The computer-program product of claim 21, wherein the deep link is generated server-side.

23. The system of claim 21, wherein the deep link is generated client-side.

24. The computer-program product of claim 14, wherein the pre-populate message references a reward for sending the pre-populated message, and wherein the service operations further comprises responsive to receiving an indication that the pre-populated message has been received at the third network endpoint, sending a redeemable code for the reward.

25. The computer-program product of claim 14, wherein the content ID is one of one or more references to the content subscribed, wherein content subscribed is associated with the popup, and wherein:

the popup operations further comprise receiving the one or more references and including the one or more references in the pre-populated message; and the service operations further comprise, responsive to receiving the pre-populated message, extracting the one or more references and using them to look up the subscription record to determine that the pre-populated message is associated with the content subscribed.

26. The computer-program product of claim 14, wherein logic to generate the popup is generated server-side to reduce the number of system calls needed for the popup.

* * * * *